United States Patent
Shingu et al.

(10) Patent No.: US 12,495,474 B2
(45) Date of Patent: Dec. 9, 2025

(54) LIGHT ADJUSTMENT PROGRAM, LIGHT-EMITTING APPARATUS, AND LIGHTING DEVICE

(71) Applicant: SEMICONDUCTOR ENERGY LABORATORY CO., LTD., Atsugi (JP)

(72) Inventors: Takashi Shingu, Kanagawa (JP); Tsunenori Suzuki, Kanagawa (JP); Satoshi Seo, Kanagawa (JP); Haruki Katagiri, Kanagawa (JP); Noboru Inoue, Kanagawa (JP); Kazuhiko Fujita, Kanagawa (JP); Toshiki Sasaki, Kanagawa (JP); Hideko Yoshizumi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 121 days.

(21) Appl. No.: 18/289,069

(22) PCT Filed: May 11, 2022

(86) PCT No.: PCT/IB2022/054356
§ 371 (c)(1),
(2) Date: Oct. 31, 2023

(87) PCT Pub. No.: WO2022/243791
PCT Pub. Date: Nov. 24, 2022

(65) Prior Publication Data
US 2024/0244732 A1    Jul. 18, 2024

(30) Foreign Application Priority Data
May 21, 2021 (JP) .................. 2021-086046

(51) Int. Cl.
H05B 45/20 (2020.01)
F21V 1/14 (2006.01)
(Continued)

(52) U.S. Cl.
CPC ............. *H05B 45/20* (2020.01); *F21V 1/146* (2013.01); *H05B 47/165* (2020.01); *F21Y 2115/15* (2016.08)

(58) Field of Classification Search
CPC ...... H05B 45/20; H05B 47/165; H05B 45/59; H05B 33/06; H05B 45/10; F21V 1/146;
(Continued)

(56) References Cited

U.S. PATENT DOCUMENTS 9,127,032 B2 * 9/2015 Inoue ................... C09K 11/025
10,497,884 B2 * 12/2019 Kurihara ............. C07F 15/0033
(Continued)

FOREIGN PATENT DOCUMENTS

JP   02-044693 A   2/1990
JP   08-167481 A   6/1996
(Continued)

OTHER PUBLICATIONS

International Search Report (Application No. PCT/IB2022/054356) Dated Jul. 12, 2022.
(Continued)

*Primary Examiner* — Ryan Jager
(74) *Attorney, Agent, or Firm* — NIXON PEABODY LLP; Jeffrey L. Costellia

(57) ABSTRACT

Provided is a novel light adjustment program that can make a human feel at ease. Provided is the light adjustment program that includes the steps of obtaining basic data having 1/f fluctuation characteristics; generating first smoothed data and second smoothed data by performing moving average processing with different periods on the
(Continued)

basic data having 1/f fluctuation characteristics; generating light adjustment data by subjecting the first smoothed data and the second smoothed data to arithmetic processing; and changing luminance of a light-emitting device in time series in accordance with the light adjustment data.

17 Claims, 28 Drawing Sheets

(51) Int. Cl.
*H05B 47/165* (2020.01)
*F21Y 115/15* (2016.01)

(58) Field of Classification Search
CPC ..... F21Y 2115/15; H10K 50/11; H10K 59/13; Y02B 20/40
USPC .......................................... 315/291

See application file for complete search history.

(56) References Cited

U.S. PATENT DOCUMENTS

| 2017/0288154 A1* | 10/2017 | Seo ........................ C07F 15/004 |
| 2021/0151695 A1 | 5/2021 | Seo et al. |
| 2024/0244732 A1* | 7/2024 | Shingu .................... F21V 1/146 |

FOREIGN PATENT DOCUMENTS

| JP | 09-106891 A | 4/1997 |
| JP | 2009-004329 A | 1/2009 |
| JP | 2010-003578 A | 1/2010 |
| JP | 2012-212550 A | 11/2012 |
| JP | 2020-061969 A | 4/2020 |

OTHER PUBLICATIONS

Written Opinion (Application No. PCT/IB2022/054356) Dated Jul. 12, 2022.

Doi et al., "Experimental Investigation on Lighting Control with 1/f-Fluctuation", IEEJ Trans. C (The transactions of the Institute of Electrical Engineers of Japan.C), Mar. 20, 1997, vol. 117, No. 4, pp. 409-415.

* cited by examiner

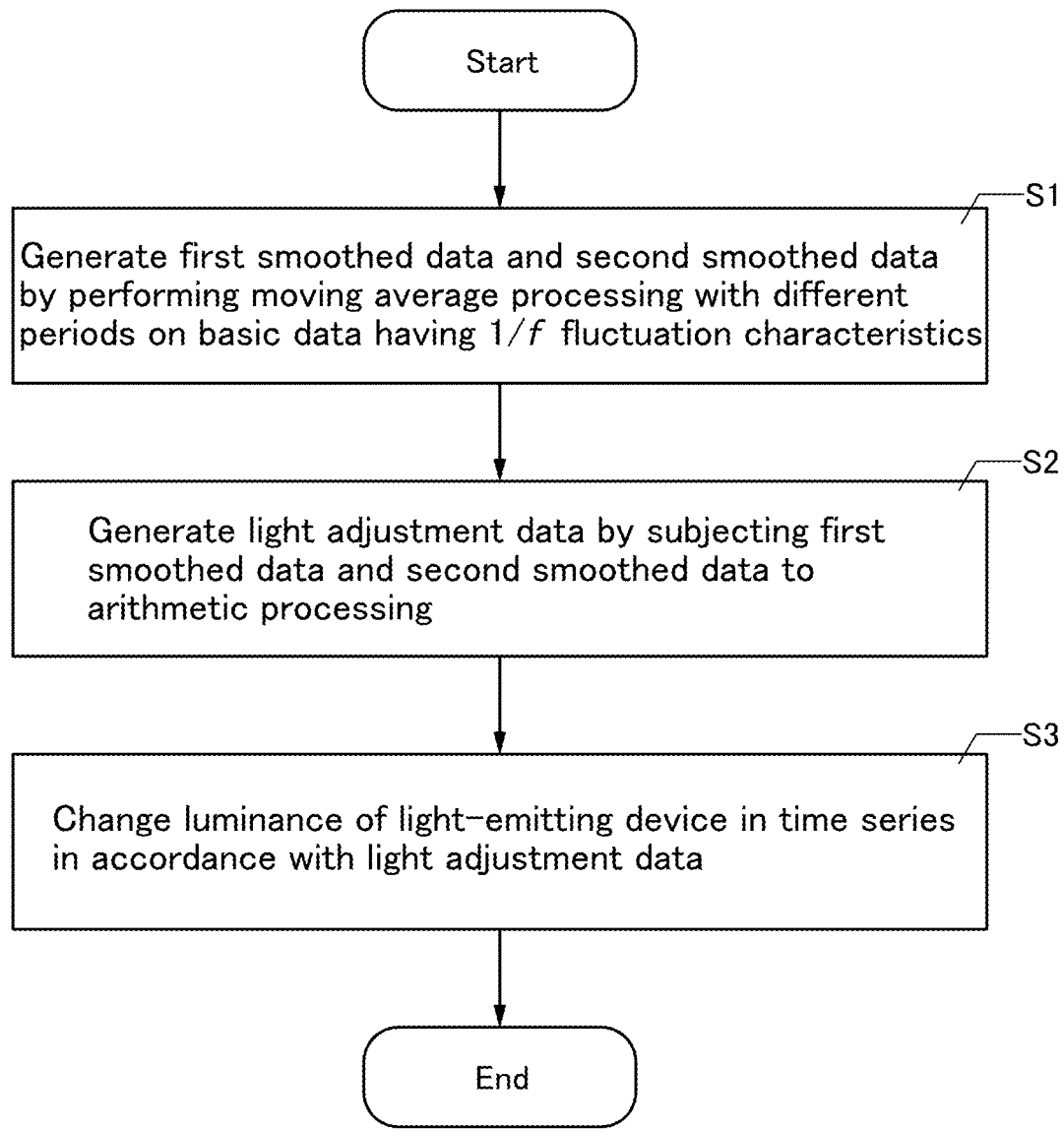

FIG. 4A
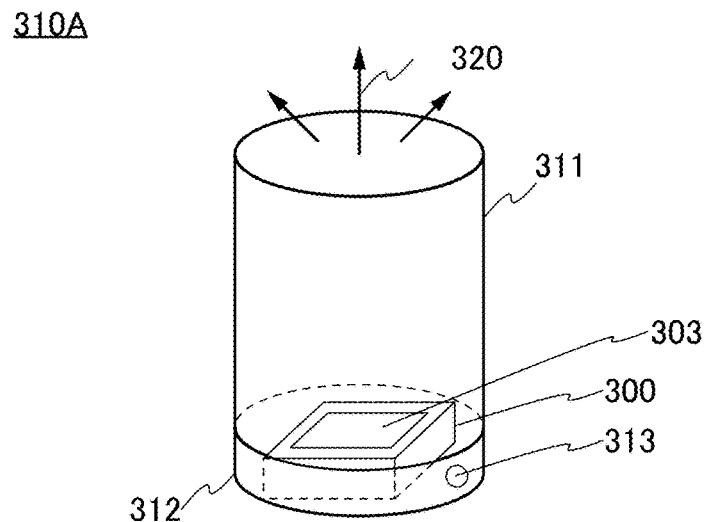
FIG. 4B
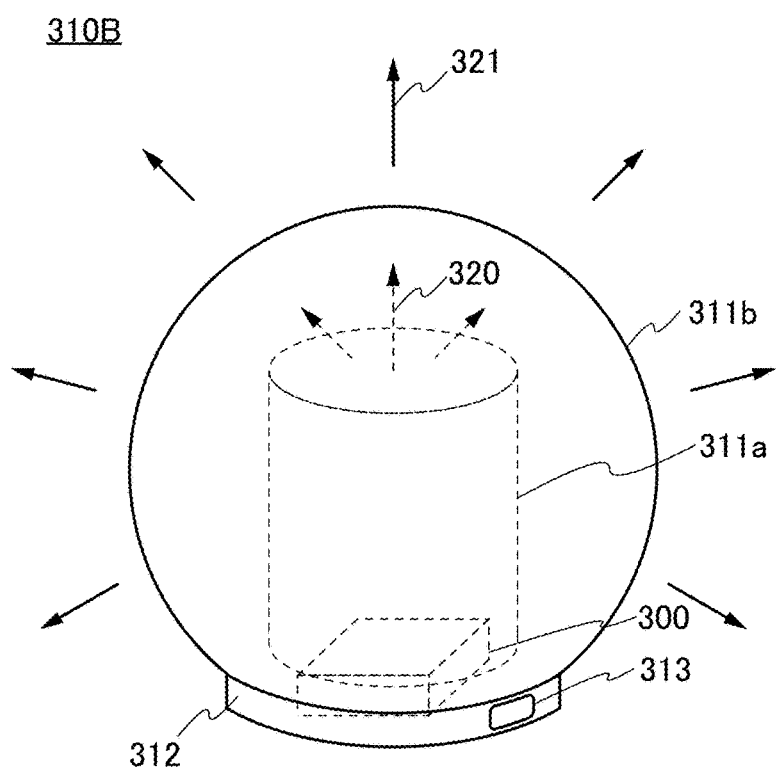
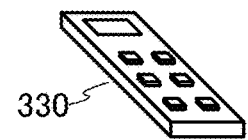

LIGHT ADJUSTMENT PROGRAM, LIGHT-EMITTING APPARATUS, AND LIGHTING DEVICE

TECHNICAL FIELD

One embodiment of the present invention relates to a light adjustment program, a light-emitting apparatus, and a lighting device. Note that one embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition of matter. Thus, more specifically, examples of the technical field of one embodiment of the present invention disclosed in this specification include a semiconductor device, a display apparatus, a light-emitting apparatus, a power storage device, a memory device, a driving method thereof, and a manufacturing method thereof.

BACKGROUND ART

Flames of a candle and a fireplace have a fluctuation which makes a human feel at ease. Lighting devices that mimic such a fluctuation of natural light have been developed. For example, Patent Document 1 discloses a lighting device in which a light output of a light source is changed on the basis of data set by quantifying the brightness of a specific part of a flame of a candle.

REFERENCE

Patent Document

[Patent Document 1] Japanese Published Patent Application No. H9-106891

SUMMARY OF THE INVENTION

Problems to be Solved by the Invention

In a conventional lighting device that mimics a fluctuation of natural light, an unnatural flicker is generated leading to a difficulty in feeling at ease in some cases, which is a problem. Another problem is that the use of a point light source causes an unevenness in light emission.

An object of one embodiment of the present invention is to provide a novel light adjustment program that can make a human feel at ease. Another object of one embodiment of the present invention is to provide a novel light adjustment program that has a relaxation effect. Another object of one embodiment of the present invention is to provide a novel light-emitting apparatus that can make a human feel at ease. Another object of one embodiment of the present invention is to provide a novel light-emitting apparatus that has a relaxation effect. Another object of one embodiment of the present invention is to provide a novel lighting device that can make a human feel at ease. Another object of one embodiment of the present invention is to provide a novel lighting device that has a relaxation effect.

Note that the description of these objects does not preclude the existence of other objects. In one embodiment of the present invention, there is no need to achieve all of these objects. Other objects will be apparent from the description of the specification, the drawings, the claims, and the like, and other objects can be derived from the description of the specification, the drawings, the claims, and the like.

Means for Solving the Problems

One embodiment of the present invention is a light adjustment program including the steps of generating first smoothed data and second smoothed data by performing moving average processing with different periods on basic data having 1/f fluctuation characteristics; generating light adjustment data by subjecting the first smoothed data and the second smoothed data to arithmetic processing; and changing luminance of a light-emitting device in time series in accordance with the light adjustment data.

One embodiment of the present invention is a light adjustment program including the steps of generating first smoothed data X and second smoothed data x by performing moving average processing with different periods on basic data having 1/f fluctuation characteristics; generating light adjustment data y by subjecting the first smoothed data X and the second smoothed data x to arithmetic processing in accordance with a formula below; and changing luminance of a light-emitting device in time series in accordance with the light adjustment data y.

$$y_i = \left[\left(\frac{X_i - X_{min}}{X_{max} - X_{min}}\right) \times (uL - LL) + LL\right] \times (1 - A) + \left(\frac{x_i - x_{min}}{x_{max} - x_{min}}\right) \times A \quad \text{[Formula 1]}$$

Note that in the formula above, $y_i$ represents i-th data of the light adjustment data y, $X_i$ represents i-th data of the first smoothed data X, $x_i$ represents i-th data of the second smoothed data x, $X_{max}$ represents a maximum value of X, $X_{min}$ represents a minimum value of X, UL represents a predetermined upper limit of an X component, LL represents a predetermined lower limit of the X component, $x_{max}$ represents a maximum value of x, $x_{min}$ represents a minimum value of x, and A represents a predetermined contribution rate.

In the light adjustment program with the above structure, a period of the moving average processing for generating the first smoothed data X is preferably longer than a period of the moving average processing for generating the second smoothed data x.

One embodiment of the present invention is a light-emitting apparatus including a light-emitting device and a light adjustment portion, and the light adjustment portion has a function of generating first smoothed data and second smoothed data by performing moving average processing with different periods on basic data having 1/f fluctuation characteristics; generating light adjustment data by subjecting the first smoothed data and the second smoothed data to arithmetic processing; and changing luminance of the light-emitting device in time series in accordance with the light adjustment data.

One embodiment of the present invention is a light-emitting apparatus including a light-emitting device and a light adjustment portion, and the light adjustment portion has a function of generating first smoothed data X and second smoothed data x by performing moving average processing with different periods on basic data having 1/f fluctuation characteristics; generating light adjustment data y by subjecting the first smoothed data and the second smoothed data to arithmetic processing in accordance with a formula below; and changing luminance of the light-emitting device in time series in accordance with the light adjustment data y.

$$y_i = \left[\left(\frac{X_i - X_{min}}{X_{max} - X_{min}}\right) \times (UL - LL) + LL\right] \times (1 - A) + \left(\frac{x_i - x_{min}}{x_{max} - x_{min}}\right) \times A \quad \text{[Formula 2]}$$

Note that in the formula above, $y_i$ represents i-th data of the light adjustment data y, $X_i$ represents i-th data of the first smoothed data X, $x_i$ represents i-th data of the second smoothed data x, $X_{max}$ represents a maximum value of X, $X_{min}$ represents a minimum value of X, UL represents a predetermined upper limit of an X component, LL represents a predetermined lower limit of the X component, $x_{max}$ represents a maximum value of x, $x_{min}$ represents a minimum value of x, and A represents a predetermined contribution rate.

In the light-emitting apparatus with the above structure, a period of the moving average processing for generating the first smoothed data is preferably longer than a period of the moving average processing for generating the second smoothed data.

In the light-emitting apparatus with any of the above structures, the light-emitting device preferably includes a first electrode, a second electrode, and an EL layer.

In the light-emitting apparatus with any of the above structures, an emission intensity of the light-emitting device at less than or equal to 495 nm in an electroluminescence spectrum is preferably less than or equal to 1% of an emission intensity at a maximum peak wavelength.

In the light-emitting apparatus with any of the above structures, a peak wavelength of the electroluminescence spectrum of the light-emitting device is at preferably greater than or equal to 590 nm and less than or equal to 625 nm, further preferably greater than or equal to 590 nm and less than or equal to 620 nm. A maximum peak wavelength is preferably greater than or equal to 590 nm and less than or equal to 625 nm, further preferably greater than or equal to 590 nm and less than or equal to 620 nm.

In the light-emitting apparatus with any of the above structures, a half width of the electroluminescence spectrum of the light-emitting device is preferably greater than or equal to 70 nm and less than or equal to 120 nm. The half width is further preferably greater than or equal to 75 nm and less than or equal to 120 nm, still further preferably greater than or equal to 80 nm and less than or equal to 120 nm, yet still further preferably greater than or equal to 85 nm and less than or equal to 120 nm, and yet still further preferably greater than or equal to 90 nm and less than or equal to 120 nm.

In the light-emitting apparatus with any of the above structures, the light-emitting device preferably has CIE chromaticity (x, y) where x is greater than or equal to 0.58 and less than or equal to 0.63 and y is greater than or equal to 0.37 and less than or equal to 0.42. Further preferably, x is greater than or equal to 0.59 and less than or equal to 0.63 and y is greater than or equal to 0.37 and less than or equal to 0.41. Still further preferably, x is greater than or equal to 0.59 and less than or equal to 0.62 and y is greater than or equal to 0.38 and less than or equal to 0.41.

One embodiment of the present invention is a lighting device that includes the light-emitting apparatus with any of the above structures and a shade including a light-transmitting material.

In addition, the scope of one embodiment of the present invention includes a light-emitting apparatus including a light-emitting device, and a lighting device including the light-emitting apparatus. Accordingly, a light-emitting apparatus in this specification refers to an image display device or a light source (including a lighting device). In addition, a light-emitting apparatus includes a module in which a light-emitting apparatus is connected to a connector such as an FPC (Flexible printed circuit) or a TCP (Tape Carrier Package), a module in which a printed wiring board is provided on the tip of a TCP, or a module in which an IC (integrated circuit) is directly mounted on a light-emitting device by a COG (Chip On Glass) method.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. In this specification, the connection relation of a transistor is sometimes described assuming for convenience that the source and the drain are fixed; actually, the names of the source and the drain interchange with each other depending on the relation of the potentials.

In this specification, a "source" of a transistor means a source region that is part of a semiconductor film functioning as an active layer or a source electrode connected to the semiconductor film. Similarly, a "drain" of a transistor means a drain region that is part of the semiconductor film or a drain electrode connected to the semiconductor film. A "gate" means a gate electrode.

In this specification, a state in which transistors are connected in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state in which a current, a voltage, or a potential can be supplied or transmitted. Accordingly, connection means not only direct connection but also indirect connection through a circuit element such as a wiring, a resistor, a diode, or a transistor that allows a current, a voltage, or a potential to be supplied or transmitted.

In this specification, even when independent components are connected to each other in a circuit diagram, there is actually a case where one conductive film has functions of a plurality of components, such as a case where part of a wiring serves as an electrode. The term "connection" in this specification also includes such a case where one conductive film has functions of a plurality of components, in its category.

Effect of the Invention

According to one embodiment of the present invention, a novel light adjustment program that can make a human feel at ease can be provided. According to another embodiment of the present invention, a novel light adjustment program that has a relaxation effect can be provided. According to another embodiment of the present invention, a novel light-emitting apparatus that can make a human feel at ease can be provided. According to another embodiment of the present invention, a novel light-emitting apparatus that has a relaxation effect can be provided. According to another embodiment of the present invention, a novel lighting device that can make a human feel at ease can be provided. According to another embodiment of the present invention, a novel lighting device that has a relaxation effect can be provided.

Note that the description of these effects does not preclude the existence of other effects. One embodiment of the present invention does not necessarily have all these effects. Other effects will be apparent from and can be derived from the description of the specification, the drawings, the claims, and the like.

BRIEF DESCRIPTION OF THE DRAWINGS

FIG. 1 is a flowchart showing a light adjustment program and a light-emitting apparatus of one embodiment of the present invention.

FIG. 4A and FIG. 4B are diagrams illustrating lighting devices of one embodiment of the present invention.

MODE FOR CARRYING OUT THE INVENTION

Figure 2A:
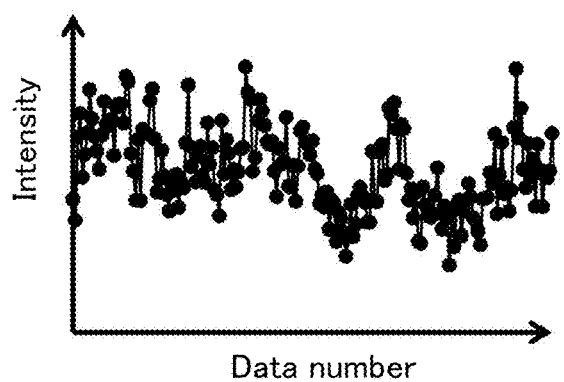
FIG. 2A, FIG. 2B, FIG. 2C, and FIG. 2D are diagrams each showing data that is processed by a light-emitting apparatus of one embodiment of the present invention.

Embodiments are described in detail with reference to the drawings. Note that the present invention is not limited to the following description, and it will be readily appreciated by those skilled in the art that modes and details of the present invention can be modified in various ways without departing from the spirit and scope of the present invention. Thus, the present invention should not be construed as being limited to the description in the following embodiments. Note that in structures of the invention described below, the same reference numerals are commonly used for the same portions or portions having similar functions in different drawings, and a repeated description thereof is omitted.

Embodiment 1

In this embodiment, a light adjustment program, a light-emitting apparatus, and a lighting device of one embodiment of the present invention will be described with reference to FIG. 1 to FIG. 3.

FIG. 1 is a flow chart showing an operation method of the light adjustment program and the light-emitting apparatus of one embodiment of the present invention.

[Step S1]

First, moving average processing with different periods is performed on basic data f having 1/f fluctuation characteristics, so that first smoothed data X and second smoothed data x are generated.

In this specification and the like, a 1/f fluctuation means a fluctuation in which the distribution of power spectral density of data is inversely proportional to a frequency f(f>0).

There is no particular limitation on the method for obtaining the basic data fhaving 1/f fluctuation characteristics. For example, basic data having 1/f fluctuation characteristics may be data generated by quantifying movement of a natural object or data artificially created using a calculation software. Furthermore, data that is generated and stored in advance may be used or data may be used at the same time the data is generated.

As the data generated by quantifying movement of a natural object, for example, data generated by quantifying wind strength, brightness of a flame, movement of waves, or the like using a sensing device can be used. As the sensing device, for example, an acceleration sensor, a camera, an illuminance sensor, a microphone, or the like can be used.

As a method for creating data using a calculation software, a method such as cellular automation, intermittent chaos, or an integral of order ½ can be used.

As the moving average processing to generate the first smoothed data X and the second smoothed data x, for example, simple moving average, weighted moving average, exponential moving average, modified moving average, or triangular moving average can be used; simple moving average is preferably used for simplicity.

In the case of simple moving average, the first smoothed data X and the second smoothed data x can be obtained in accordance with Formula (1) and Formula (2) below.

[Formulae 3]

$$X_i = \frac{1}{d_1} \sum_{k=0}^{d_1-1} f_{i-k} \quad (1)$$

$$x_i = \frac{1}{d_2} \sum_{k=0}^{d_2-1} f_{i-k} \quad (2)$$

Note that in Formula (1) and Formula (2) above, $f_i$ represents the i-th data of the basic data f having 1/f fluctuation characteristics, $X_i$ represents the i-th data of the first smoothed data X, and $x_i$ represents the i-th data of the second smoothed data x. In addition, $d_1$ represents a period (a natural number) of the moving average processing that generates the first smoothed data and $d_2$ represents a period (a natural number that is different from $d_1$) of the moving average processing that generates the second smoothed data.

Note that in this specification, a natural number is an integer greater than or equal to 1.

In Formula (1) and Formula (2) above, $d_1$ is preferably larger than $d_2$. Specifically, $d_2$ is preferably a value greater than or equal to 5% and less than or equal to 50% of $d_1$, further preferably a value greater than or equal to 10% and less than or equal to 30% of $d_1$.

When $d_1$ is larger than $d_2$, the waveform of the first smoothed data X is a smoother waveform than that of the second smoothed data x in which a long cycle component is dominant. By using two or more pieces of smoothed data that has been subjected to moving average processing with different periods (data with different cycle components) to generate light adjustment data in the following Step S3, new light adjustment data with 1/f fluctuation characteristics that can make a human feel at ease or has a relaxation effect can be generated.

Although an example in which two pieces of smoothed data (the first smoothed data X and the second smoothed data x) are generated from the basic data f having 1/f fluctuation characteristics is shown here, one embodiment of the present invention is not limited thereto. Three or more pieces of smoothed data may be generated from the basic data f having 1/f fluctuation characteristics in some cases.

[Step S2]

Next, the first smoothed data X and the second smoothed data x is subjected to arithmetic processing, so that light adjustment data y is generated.

The arithmetic processing in Step S2, for example, can be performed in accordance with Formula (3) below.

[Formula 4]

$$y_i = \left[\left(\frac{X_i - X_{min}}{X_{max} - X_{min}}\right) \times (UL - LL) + LL\right] \times (1 - A) + \left(\frac{x_i - x_{min}}{x_{max} - x_{min}}\right) \times A \quad (3)$$

Note that in Formula (3), $y_i$ represents the i-th data of the light adjustment data y, $X_i$ represents the i-th data of the first smoothed data X (hereinafter simply referred to as X), and $x_i$ represents the i-th data of the second smoothed data x (hereinafter simply referred to as x). $X_{max}$ represents the maximum value of X, $X_{min}$ represents the minimum value of X, UL represents a predetermined upper limit (greater than or equal to 0 and less than or equal to 1) of an X component, and LL represents a predetermined lower limit (greater than or equal to 0 and less than UL) of the X component. Furthermore, $x_{max}$ represents the maximum value of x and $x_{min}$ represents the minimum value of x. In addition, A represents a predetermined contribution rate (greater than or equal to 0 and less than or equal to 1, preferably greater than or equal to 0 and less than or equal to 0.5). Note that A's may be values that are different from each other.

The arithmetic processing in Step S2 may be performed in accordance with Formula (4) below. Formula (4) is different from Formula (3) in that one of a plurality of A's in the formula is A'.

[Formula 5]

$$y_i = \left[\left(\frac{X_i - X_{min}}{X_{max} - X_{min}}\right) \times (UL - LL) + LL\right] \times (1 - A') + \left(\frac{x_i - x_{min}}{x_{max} - x_{min}}\right) \times A \quad (4)$$

Note that in Formula (4), $y_i$ represents the i-th data of the light adjustment data y, $X_i$ represents the i-th data of the first smoothed data X (hereinafter simply referred to as X), and $x_i$ represents the i-th data of the second smoothed data x (hereinafter simply referred to as x). $X_{max}$ represents the maximum value of the first smoothed data X, $X_{min}$ represents the minimum value of the first smoothed data X, UL represents a predetermined upper limit (greater than or equal to 0 and less than or equal to 1) of a first smoothed data X component, and LL represents a predetermined lower limit (greater than or equal to 0 and less than UL) of the first smoothed data X component. Furthermore, $x_{max}$ represents the maximum value of the second smoothed data x and $X_{min}$ represents the minimum value of the second smoothed data x. A represents a given value greater than or equal to 0 and less than or equal to 1, preferably greater than or equal to 0 and less than or equal to 0.5, and A' represents a given value greater than or equal to 0 and less than or equal to A.

The arithmetic processing in Step S2 may be performed in accordance with Formula (5) below.

[Formula 6]

$$y_i = \left[\left(\frac{X_i - X_{min}}{X_{max} - X_{min}}\right) \times (1 - A) + \left(\frac{x_i - x_{min}}{x_{max} - x_{min}}\right) \times A\right] \times (UL - LL) + LL \quad (5)$$

Note that in Formula (5), $y_i$ represents the i-th data of the light adjustment data y, $X_i$ represents the i-th data of the first smoothed data X (hereinafter simply referred to as X), and $x_i$ represents the i-th data of the second smoothed data x (hereinafter simply referred to as x). $X_{max}$ represents the maximum value of the first smoothed data X and $X_{min}$ represents the minimum value of the first smoothed data X. Furthermore, $X_{max}$ represents the maximum value of the second smoothed data x and $x_{min}$ represents the minimum value of the second smoothed data x. A represents a given value greater than or equal to 0 and less than or equal to 1, preferably greater than or equal to 0 and less than or equal to 0.5. UL represents a predetermined upper limit (greater than or equal to 0 and less than or equal to 1) of yi, and LL represents a predetermined lower limit (greater than or equal to 0 and less than UL) of yi.

In Formulae (3) to (5) above, A and A' determine the contribution rate of the second smoothed data x for the light adjustment data y. That is, in the case where $d_1$ is larger than $d_2$, in other words, in the case where the first smoothed data X has a smoother waveform than that of the second smoothed data x in which a long cycle component is dominant, setting A and A' large increases a short cycle component of the fluctuation of the light adjustment data y, and setting A and A' small further decreases a short cycle component of the fluctuation of the light adjustment data.

By generating the light adjustment data y in the above manner, the light adjustment data y is optimized and new light adjustment data with 1/f fluctuation characteristics that can make a human feel at ease or has a relaxation effect can be generated.

Although an example in which two pieces of smoothed data (the first smoothed data X and the second smoothed data x) are subjected to arithmetic processing to generate the light adjustment data y is shown here, one embodiment of the present invention is not limited thereto. Light adjustment data may be generated by subjecting three or more pieces of smoothed data to arithmetic processing in some cases.

[Step S3]

Next, the luminance of a light-emitting device is changed in time series in accordance with the light adjustment data y.

The light-emitting device used in the light adjustment program and the light-emitting apparatus of one embodiment of the present invention are not particularly limited. For example, a light-emitting device such as a fluorescent lamp, an incandescent lamp, an LED, or an organic EL element can be used in the light adjustment program and the light-emitting apparatus of one embodiment of the present invention.

The method for changing the luminance of the light-emitting device in accordance with the light adjustment data can be selected as appropriate depending on the light-emitting device that is used. For example, phase control light adjustment, current amplitude light adjustment, or a PWM (Pulse Width Modulation) control method can be used.

In the case of the phase control method, the luminance of the light-emitting device is controlled by directly adjusting electric power supplied to the light-emitting device. Since it is possible to perform light adjustment control with only a power line, only two wirings can be provided between a light adjustment portion and the light-emitting device, enabling simple manufacture of the light-emitting apparatus.

In the case of the PWM control method, the luminance of the light-emitting device is controlled by changing the temporal ratio (duty ratio) between a lighting period and a non-lighting period. In addition to two power lines, two signal lines are necessary as wirings; however, the PWM control method is less likely to suffer from an influence of a change in power supply than the phase control method, thereby enabling stable light adjustment. Furthermore, in the PWM control method, a current flowing through the light-emitting device is constant as compared with current amplitude light adjustment, so that the emission color can be made constant. With the PWM control method, a wider dynamic range can be obtained.

In the case of the PWM control method, a flicker caused in the light emission of the light-emitting device can be inhibited by setting a higher frequency. For example, when the frequency is greater than or equal to approximately 100 Hz, a flicker caused in the light emission of the light-emitting device can be inhibited.

Although in general, changing luminance in time series using the PWM control method sometimes causes a flicker in the light emission of the light-emitting device, using the light adjustment program of one embodiment of the present invention can inhibit the flicker. Accordingly, it is possible to change luminance more naturally.

Note that with the use of the light adjustment data y generated in Step S2, new light adjustment data Y may be generated using Formula (6), and the luminance of the light-emitting device may be changed in time series in accordance with the light adjustment data Y.

[Formula 7]

$$Y = a \times y + b \quad (6)$$

Note that in Formula (6), a and b each individually represent given values.

With the above-described structure, a light adjustment program and a light-emitting apparatus that can make a human feel at ease or has a relaxation effect can be provided.

FIG. 2 shows diagrams of data obtained or generated by the light adjustment program and the light-emitting apparatus of one embodiment of the present invention. The vertical axis represents the intensity of each data and the horizontal axis represents data number. FIG. 2A shows an example of the basic data f having 1/f fluctuation characteristics obtained by the light adjustment program and the light-emitting apparatus. FIG. 2B shows an example of the first smoothed data X generated by the light adjustment program and the light-emitting apparatus. FIG. 2C shows an example of the second smoothed data x generated by the light adjustment program and the light-emitting apparatus. FIG. 2D shows an example of the light adjustment data y generated by the light adjustment program and the light-emitting apparatus.

Figure 2B:
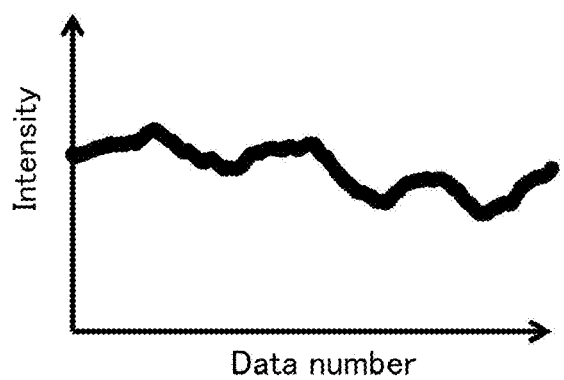
Figure 2C:
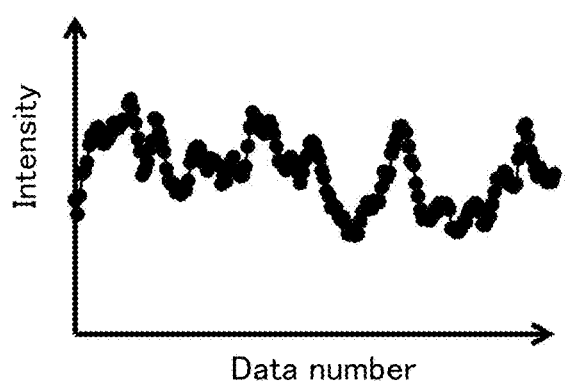

As shown in FIG. 2A, FIG. 2B, and FIG. 2C, the first smoothed data X (FIG. 2B) and the second smoothed data x (FIG. 2C) are smoothed as compared with the basic data f (FIG. 2A). Furthermore, as shown in FIG. 2B and FIG. 2C, the first smoothed data X (FIG. 2B is more strongly smoothed as compared with the second smoothed data x (FIG. 2C).

Figure 2D:
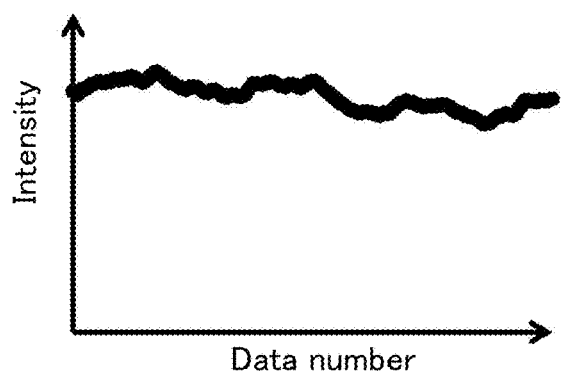

The light adjustment program and the light-emitting apparatus of one embodiment of the present invention can generate the light adjustment data y shown in FIG. 2D by combining two types of smoothed data in this manner.

Figure 3A:
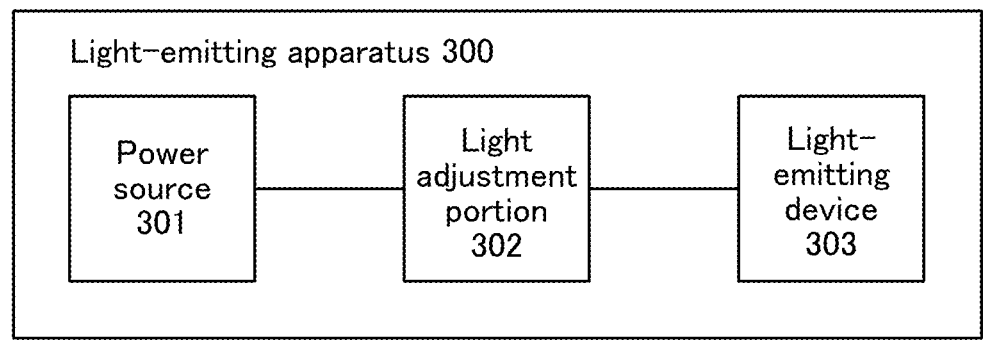
FIG. 3A and FIG. 3B are diagrams illustrating a light-emitting apparatus of one embodiment of the present invention.

FIG. 3A is a block diagram illustrating a light-emitting apparatus 300 of one embodiment of the present invention. As illustrated in FIG. 3A, the light-emitting apparatus 300 includes at least a power source 301, a light adjustment portion 302, and a light-emitting device 303.

The light adjustment portion 302 has a function of changing the luminance of the light-emitting device 303 in time series in accordance with the light adjustment data y generated in Steps S1 to S3 above.

The light adjustment portion 302 includes a memory portion, for example. The memory portion can be provided with the light adjustment program of one embodiment of the present invention. Alternatively, the light adjustment data y that is generated in advance can be stored in the memory portion.

Figure 3B:
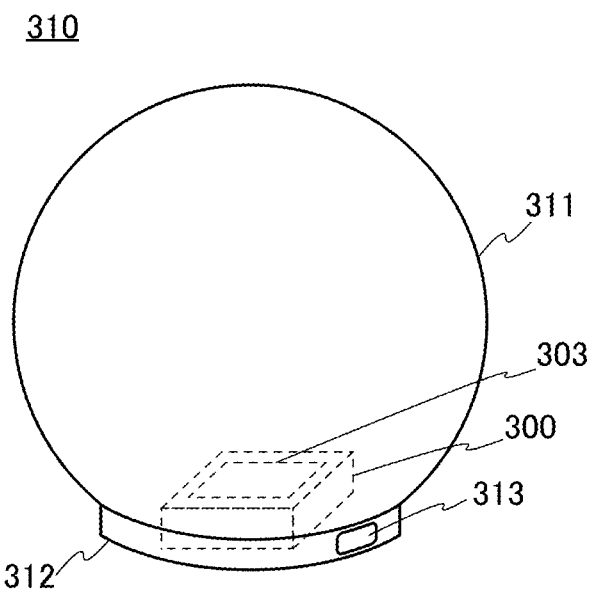

FIG. 3B is a diagram illustrating a lighting device 310 of one embodiment of the present invention. As illustrated in FIG. 3B, the lighting device 310 includes a shade 311, the light-emitting apparatus 300, a base 312, and an operation button 313. The light-emitting apparatus 300 is covered with the shade 311.

The shade 311 is formed using a light-transmitting material. Light emitted from the light-emitting apparatus 300 is scattered by the shade 311, so that light emitted from the lighting device 310 can be softer and the relaxation effect can be enhanced.

As the light-transmitting material of the shade 311, for example, a transparent resin material, a milky white resin material, a resin material mixed with a diffusion material, glass, paper, cloth, wood, a metal processed to be thin, or a ceramic can be used. Note that the materials that can be used for the shade 311 are not limited thereto. A material that has a light-transmitting property and can be formed into a shape that covers the light-emitting apparatus 300 can be used for the shade 311.

Note that in this specification and the like, the term "shade" can be replaced with "housing" or "cover" in some cases. In this specification and the like, a light-transmitting property refers to a property of transmitting at least light in a wavelength range of visible light (light with a wavelength greater than or equal to 400 nm and less than or equal to 750 nm).

FIG. 4A illustrates a lighting device 310A which is a variation example of the lighting device 310. As illustrated in FIG. 4A, the lighting device 310A includes the shade 311 having a cylindrical shape. In the lighting device 310A, the shade 311 is formed using a transparent resin material and light emitted from the light-emitting apparatus 300, while being totally reflected in the shade 311, passes through the shade 311 and light 320 is emitted to above the lighting device 310A. With such a structure, the emission direction of light can be controlled.

FIG. 4B illustrates a lighting device 310B which is a variation example of the lighting device 310A. The lighting device 310B includes a cylindrical shade 311a formed using a transparent resin material and includes a shade 311b that covers both the shade 311a and the light-emitting apparatus 300. In the lighting device 310B, light emitted from the light-emitting apparatus 300, while being totally reflected in the shade 311a, passes through the shade 311a and the light 320 is emitted to above the 311a. Furthermore, the light 320 passes through the shade 311b and light 321 is emitted. With such a structure, the lighting device can control the emission direction of light and emit softer light.

The lighting device of one embodiment of the present invention can be operated not only with the operation button 313 provided in the base 312 but also with a remote controller. FIG. 4B illustrates a remote controller 330.

The remote controller 330 may be provided with a plurality of buttons, which enable selecting the kind of fluctuation mode as well as turning on and turning off the power of the lighting device 310B. As specific examples of a fluctuation mode, a fluctuation that can be generated by the light adjustment program of one embodiment of the present invention and a sine wave can be given. A light emission mode that does not have a fluctuation may be selectable. Respective variables may be used for a plurality of the light adjustment programs of one embodiment of the present invention so that a user's preferred 1/f fluctuation can be selected from a plurality of 1/f fluctuations in which the fluctuation is changed.

It is preferable that a light-emitting device (an organic EL element) including a first electrode, a second electrode, and an EL layer be used as the light-emitting device 303. Such a light-emitting device has surface light emission, whereby light emitted from the light-emitting apparatus 300 can be soft light with no unevenness as compared with the case where a light-emitting device having point light emission is used. Accordingly, the relaxation effect of the light-emitting apparatus 300 can be enhanced. Note that an example of a light-emitting device that includes a first electrode, a second electrode, and an EL layer and that can be used for the light-emitting apparatus 300 will be described in detail in Embodiment 2.

Note that in the case where a light-emitting device including a first electrode, a second electrode, and an EL layer is used as the light-emitting device 303, the half width of the electroluminescence spectrum of the light-emitting device is preferably greater than or equal to 70 nm, further preferably greater than or equal to 75 nm. In that case, the color-rendering properties from the light-emitting apparatus 300 can be improved and light closer to natural light can be obtained. The half width of the electroluminescence spectrum of the light-emitting device is preferably less than or equal to 120 nm. In that case, light in which blue light is reduced can be obtained as described later. Accordingly, the half width of the electroluminescence spectrum of the light-emitting device is preferably greater than or equal to 70 nm and less than or equal to 120 nm. The half width of the electroluminescence spectrum of the light-emitting device is further preferably greater than or equal to 75 nm and less than or equal to 120 nm, still further preferably greater than or equal to 80 nm and less than or equal to 120 nm, yet still further preferably greater than or equal to 85 nm and less than or equal to 120 nm, and yet still further preferably greater than or equal to 90 nm and less than or equal to 120 nm.

In the case where a light-emitting device including a first electrode, a second electrode, and an EL layer is used as the light-emitting device 303, the electroluminescence spectrum of the light-emitting device has a peak wavelength at preferably greater than or equal to 590 nm and less than or equal to 625 nm, further preferably greater than or equal to 590 nm and less than or equal to 620 nm. In that case, a light-emitting device emitting light of warm colors that is closer to natural light such as light of the setting sun, a bonfire, and a candle, and light of an incandescent lamp can be obtained. Light of warm colors emitted from the setting sun, a bonfire, candle flame, an incandescent lamp, and the like stimulates a human's parasympathetic nerves and brings about a relaxation effect. Accordingly, with use of a light-emitting device whose electroluminescence spectrum has a peak wavelength greater than or equal to 590 nm and less than or equal to 625 nm (further preferably greater than or equal to 590 nm and less than or equal to 620 nm), a light-emitting apparatus that can bring about a relaxation effect for a user can be obtained.

In particular, the light-emitting device whose electroluminescence spectrum has the maximum peak wavelength of the above-described range is particularly effective. In other words, in the case where a light-emitting device including a first electrode, a second electrode, and an EL layer is used as the light-emitting device 303, the maximum peak wavelength of the electroluminescence spectrum of the light-emitting device is particularly preferably greater than or equal to 590 nm and less than or equal to 625 nm, further preferably greater than or equal to 590 nm and less than or equal to 620 nm. This enables not only obtaining a light-emitting device emitting light of warm colors that is extremely close to natural light such as light of the setting sun, a bonfire, and a candle, and light of an incandescent lamp, but also preventing a deviation of the emission colors from warm colors caused by process variation; thus, an inexpensive light-emitting device suitable for mass production can be obtained. Note that light of warm colors emitted from the setting sun, a bonfire, candle flame, an incandescent lamp, and the like stimulates a human's parasympathetic nerves and brings about a relaxation effect. Accordingly, with use of a light-emitting device whose electroluminescence spectrum has a maximum peak wavelength greater than or equal to 590 nm and less than or equal to 625 nm (further preferably greater than or equal to 590 nm and less than or equal to 620 nm), a light-emitting apparatus that can bring about an enhanced relaxation effect for a user can be obtained.

In the case where a light-emitting device including a first electrode, a second electrode, and an EL layer is used as the light-emitting device 303, it is further preferable that blue light be hardly included in the electroluminescence spectrum of the light-emitting device. Specifically, in the electroluminescence spectrum, the emission intensity of a visible light component at less than or equal to 495 nm is preferably less than or equal to $1/100$ of the emission intensity at the maximum peak wavelength.

Blue light refers to high-energy light (wavelength: 360 to 495 nm) in a range of visible light. It is said that blue light reaches the retina without being absorbed by the film or the lens, and therefore causes damage to the retina and the optic nerve. In addition, exposure to blue light late at night causes disturbance of the circadian rhythm. What makes blue light so dangerous is that light in the blue light wavelength range is less visible to human eyes. Even when exposed to intense blue light, a human cannot perceive it, and therefore damage is easily accumulated.

Thus, with use of a light-emitting device whose electroluminescence spectrum hardly includes blue light, a light-emitting apparatus that can inhibit eye fatigue of a user and can improve the quality of his or her sleep can be obtained. In view of the above, the half width of the electroluminescence spectrum of the light-emitting device is preferably less than or equal to 120 nm so that a blue light component is reduced.

The light-emitting apparatus 300 that includes the light-emitting device with the above-described structure can be used as a light-emitting apparatus for light therapy, which brings about a relaxation effect and an effect of improving the quality of sleep. That is, another embodiment of the present invention is a light-emitting apparatus for light therapy whose electroluminescence spectrum has a peak wavelength (or the maximum peak wavelength) greater than or equal to 590 nm and less than or equal to 625 nm (further preferably greater than or equal to 590 nm and less than or equal to 620 nm) and a half width greater than or equal to 70 nm and less than or equal to 120 nm (further preferably greater than or equal to 75 nm and less than or equal to 120 nm) and in which the emission intensity of a visible light component at less than or equal to 495 nm is less than or equal to $1/100$ of the emission intensity at the maximum peak wavelength of the electroluminescence spectrum. The half width further preferably ranges from 80 nm to 120 nm, still further preferably from 85 nm to 120 nm, and yet still further preferably from 90 nm to 120 nm.

In the light-emitting apparatus of one embodiment of the present invention, light emission of warm colors that stimulates a human's parasympathetic nerves and brings about a relaxation effect is preferably in a range of a specific emission color. That is, the x value of CIE chromaticity (x, y) of the above light-emitting device is preferably greater than or equal to 0.58 and less than or equal to 0.63 and the y value thereof is preferably greater than or equal to 0.37 and less than or equal to 0.42. Further preferably, x is greater than or equal to 0.59 and less than or equal to 0.63 and y is greater than or equal to 0.37 and less than or equal to 0.41. Still further preferably, x is greater than or equal to 0.59 and less than or equal to 0.62 and y is greater than or equal to 0.38 and less than or equal to 0.41.

The structures described in this embodiment can be used in an appropriate combination with any of the structures described in the other embodiments.

Embodiment 2

In this embodiment, a light-emitting device that can be used for the light-emitting apparatus of one embodiment of the present invention will be described with reference to FIG. 5A to FIG. 5E.

<<Basic Structure of Light-Emitting Device>>

Figure 5A:
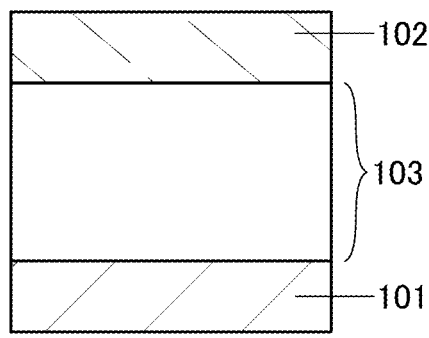
FIG. 5A, FIG. 5B, FIG. 5C, FIG. 5D, and FIG. 5E are diagrams illustrating structures of a light-emitting device according to an embodiment.

A basic structure of a light-emitting device will be described. FIG. 5A illustrates a light-emitting device including, between a pair of electrodes, an EL layer including a light-emitting layer. Specifically, the light-emitting device has a structure in which an EL layer 103 is sandwiched between a first electrode 101 and a second electrode 102.

Figure 5B:
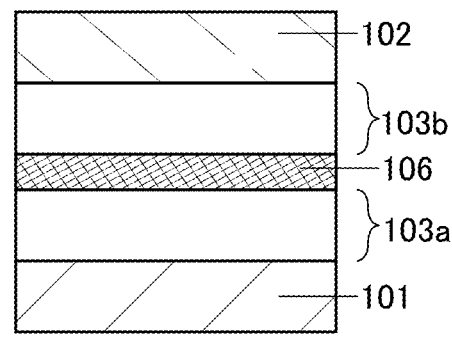

FIG. 5B illustrates a light-emitting device that has a stacked-layer structure (a tandem structure) in which a plurality of EL layers (103a and 103b, two layers in FIG.

5B) are provided between a pair of electrodes and a charge-generation layer 106 is provided between the EL layers.

The charge-generation layer 106 has a function of injecting electrons into one of the EL layers (103a or 103b) and injecting holes into the other of the EL layers (103b or 103a) when a potential difference is caused between the first electrode 101 and the second electrode 102. Thus, when a voltage is applied in FIG. 5B such that the potential of the first electrode 101 is higher than that of the second electrode 102, electrons are injected into the EL layer 103a and holes are injected into the EL layer 103b from the charge-generation layer 106.

Note that in terms of light extraction efficiency, the charge-generation layer 106 preferably has a light-transmitting property with respect to visible light (specifically, the visible light transmittance with respect to the charge-generation layer 106 is higher than or equal to 40%). Furthermore, the charge-generation layer 106 functions even when having lower conductivity than the first electrode 101 or the second electrode 102.

Figure 5C:
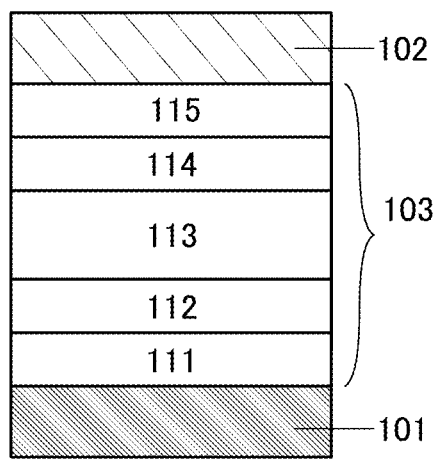

FIG. 5C illustrates a stacked-layer structure of the EL layer 103 in the light-emitting device of one embodiment of the present invention. In this case, the first electrode 101 functions as an anode and the second electrode 102 functions as a cathode. The EL layer 103 has a structure in which a hole-injection layer 111, a hole-transport layer 112, a light-emitting layer 113, an electron-transport layer 114, and an electron-injection layer 115 are sequentially stacked over the first electrode 101. Note that the light-emitting layer 113 may have a stacked-layer structure of a plurality of light-emitting layers that emit light of different colors. For example, a light-emitting layer containing a light-emitting substance that emits red light and a light-emitting layer containing a light-emitting substance that emits green light, may be stacked with or without a layer containing a carrier-transport material therebetween. Note that the stacked-layer structure of the light-emitting layer 113 is not limited to the above. For example, the light-emitting layer 113 may have a stacked-layer structure of a plurality of light-emitting layers that emit light of the same color. For example, a first light-emitting layer containing a light-emitting substance that emits red light and a second light-emitting layer containing a light-emitting substance that emits red light may be stacked with or without a layer containing a carrier-transport material therebetween. The structure in which a plurality of light-emitting layers that emit light of the same color are stacked can achieve higher reliability than a single-layer structure in some cases. Even in the case where a plurality of EL layers are provided as in the tandem structure illustrated in FIG. 5B, the layers in each EL layer are sequentially stacked from the anode side as described above. When the first electrode 101 is a cathode and the second electrode 102 is an anode, the stacking order in the EL layer 103 is reversed. Specifically, the layer 111 over the first electrode 101 serving as the cathode is an electron-injection layer; the layer 112 is an electron-transport layer; the layer 113 is a light-emitting layer; the layer 114 is a hole-transport layer; and the layer 115 is a hole-injection layer.

The light-emitting layer 113 included in the EL layers (103, 103a, and 103b) contains an appropriate combination of a plurality of substances such as a light-emitting substance, so that fluorescent light or phosphorescent light of a desired emission color can be obtained. The light-emitting layer 113 may have a stacked-layer structure in which light-emitting layers having different emission colors are stacked. In that case, the light-emitting layers that are stacked may be different in one or both of the light-emitting substance and another substance. A structure in which different emission colors can be obtained from the plurality of EL layers (103a and 103b) illustrated in FIG. 5B may be employed. Also in that case, the light-emitting layers may be different in one or both of the light-emitting substance and another substance. The light-emitting layer 113 may have a stacked-layer structure in which light-emitting layers having the same emission color are stacked. In that case, the light-emitting substance and another substance used in one of the light-emitting layers that are stacked may be different from or the same as those used in another one of the light-emitting layers. A structure in which the same emission color can be obtained from the plurality of EL layers (103a and 103b) illustrated in FIG. 5B may be employed. Also in that case, the light-emitting substance and another substance used in one of the light-emitting layers may be different from or the same as those used in another one of the light-emitting layers.

In addition, the light-emitting device of one embodiment of the present invention can have a micro optical resonator (microcavity) structure with the first electrode 101 being a reflective electrode and the second electrode 102 being a transflective electrode in FIG. 5C, for example, and light emission obtained from the light-emitting layer 113 in the EL layer 103 can be resonated between the electrodes and light emission obtained through the second electrode 102 can be intensified.

Note that when the first electrode 101 of the light-emitting device is a reflective electrode having a stacked-layer structure of a reflective conductive material and a light-transmitting conductive material (a transparent conductive film), optical adjustment can be performed by adjusting the thickness of the transparent conductive film. Specifically, when the wavelength of light obtained from the light-emitting layer 113 is $\lambda$, the optical path length (the product of the film thickness and the refractive index) between the first electrode 101 and the second electrode 102 is preferably adjusted to $m\lambda/2$ (m is a natural number) or the vicinity thereof.

To amplify desired light (wavelength: $\lambda$) obtained from the light-emitting layer 113, the optical path length from the first electrode 101 to a region where the desired light is obtained in the light-emitting layer 113 (a light-emitting region) and the optical path length from the second electrode 102 to the region where the desired light is obtained in the light-emitting layer 113 (the light-emitting region) are preferably adjusted to $(2m'+1)\lambda/4$ (m' is a natural number) or the vicinity thereof. Here, the light-emitting region refers to a region where holes and electrons are recombined in the light-emitting layer 113.

By performing such optical adjustment, the spectrum of specific monochromatic light obtained from the light-emitting layer 113 can be narrowed and light emission with high color purity can be obtained.

Note that in the above case, the optical path length between the first electrode 101 and the second electrode 102 is, to be exact, the total thickness from a reflective region in the first electrode 101 to a reflective region in the second electrode 102. However, it is difficult to precisely determine the reflective regions in the first electrode 101 and the second electrode 102; thus, it is assumed that the above effect can be sufficiently obtained with given positions in the first electrode 101 and the second electrode 102 being supposed to be reflective regions. Furthermore, the optical path length between the first electrode 101 and the light-emitting layer from which the desired light is obtained is, to be exact, the optical path length between the reflective region in the first electrode 101 and the light-emitting region in the light-emitting layer from which the desired light is obtained. However, it is difficult to precisely determine the reflective region in the first electrode 101 and the light-emitting region in the light-emitting layer from which the desired light is obtained; thus, it is assumed that the above effect can be sufficiently obtained with a given position in the first electrode 101 being supposed to be the reflective region and a given position in the light-emitting layer from which the desired light is obtained being supposed to be the light-emitting region.

Figure 5D:
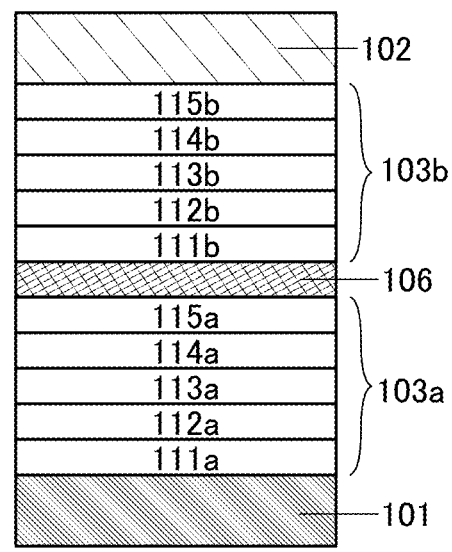

The light-emitting device illustrated in FIG. 5D is an example of the light-emitting device having the tandem structure illustrated in FIG. 5B, and includes two EL layers (103a and 103b) stacked with the charge-generation layer 106 therebetween, as illustrated in the drawing. Note that the two EL layers (103a and 103b) include respective light-emitting layers (113a and 113b), and the emission colors of the respective light-emitting layers can be combined freely. For example, the light-emitting layer 113a can emit red light and the light-emitting layer 113b can emit red light, green light, or yellow light.

Figure 5E:
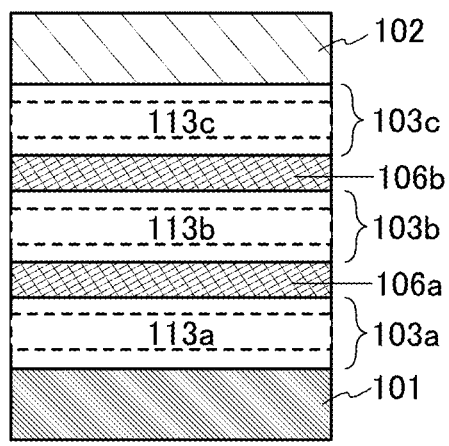

The light-emitting device illustrated in FIG. 5E is an example of the light-emitting device having the tandem structure illustrated in FIG. 5B, and includes three EL layers (103a, 103b, and 103c) stacked with the charge-generation layers (106a and 106b) therebetween, as illustrated in the drawing. Note that the three EL layers (103a, 103b, and 103c) include respective light-emitting layers (113a, 113b, and 113c), and the emission colors of the respective light-emitting layers can be combined freely. For example, the light-emitting layer 113a can emit red light, the light-emitting layer 113b can emit red light, green light, or yellow light, and the light-emitting layer 113c can emit red light.

In the above light-emitting device of one embodiment of the present invention, at least one of the first electrode 101 and the second electrode 102 is a light-transmitting electrode (a transparent electrode, a transflective electrode, or the like). In the case where the light-transmitting electrode is a transparent electrode, the visible light transmittance of the transparent electrode is higher than or equal to 40%. In the case where the light-transmitting electrode is a transflective electrode, the visible light reflectance of the transflective electrode is higher than or equal to 20% and lower than or equal to 80%, preferably higher than or equal to 40% and lower than or equal to 70%. The resistivity of these electrodes is preferably lower than or equal to $1\times10^{-2}$ Ωcm.

In the case where one of the first electrode 101 and the second electrode 102 is an electrode having a reflecting property (a reflective electrode) in the above light-emitting device of one embodiment of the present invention, the visible light reflectance of the electrode having a reflecting property is higher than or equal to 40% and lower than or equal to 100%, preferably higher than or equal to 70% and lower than or equal to 100%. The resistivity of this electrode is preferably lower than or equal to $1\times10^{-2}$ ωcm.

<<Specific Structure of Light-Emitting Device>>

Next, a specific structure of the light-emitting device of one embodiment of the present invention will be described. Here, description is made using FIG. 5D illustrating the tandem structure. The description of the structure of the EL layer can be applied to the light-emitting devices having a single structure in FIG. 5A and FIG. 5C. In the case where the light-emitting device in FIG. 5D has a microcavity structure, the first electrode 101 is formed as a reflective electrode and the second electrode 102 is formed as a transflective electrode. Thus, a single-layer structure or a stacked-layer structure can be formed using one or more kinds of desired electrode materials. Note that the second electrode 102 is formed after formation of the EL layer 103b, with the use of a material selected as described above.

<First Electrode and Second Electrode>

As materials for forming the first electrode 101 and the second electrode 102, any of the following materials can be used in an appropriate combination as long as the functions of the electrodes described above can be fulfilled. For example, a metal, an alloy, an electrically conductive compound, and a mixture of these can be used as appropriate. Specifically, In—Sn oxide (also referred to as ITO), In—Si—Sn oxide (also referred to as ITSO), In—Zn oxide, or In—W—Zn oxide can be given. It is also possible to use a metal such as aluminum (Al), titanium (Ti), chromium (Cr), manganese (Mn), iron (Fe), cobalt (Co), nickel (Ni), copper (Cu), gallium (Ga), zinc (Zn), indium (In), tin (Sn), molybdenum (Mo), tantalum (Ta), tungsten (W), palladium (Pd), gold (Au), platinum (Pt), silver (Ag), yttrium (Y), or neodymium (Nd) or an alloy containing an appropriate combination of any of these metals. It is also possible to use an element belonging to Group 1 or Group 2 in the periodic table, which is not listed above as an example (e.g., lithium (Li), cesium (Cs), calcium (Ca), or strontium (Sr)), a rare earth metal such as europium (Eu) or ytterbium (Yb), an alloy containing an appropriate combination of any of these elements, graphene, or the like.

In the light-emitting device illustrated in FIG. 5D, when the first electrode 101 is an anode, a hole-injection layer 111a and a hole-transport layer 112a of the EL layer 103a are sequentially stacked over the first electrode 101 by a vacuum evaporation method. After the EL layer 103a and the charge-generation layer 106 are formed, a hole-injection layer 111b and a hole-transport layer 112b of the EL layer 103b are sequentially stacked over the charge-generation layer 106 in a similar manner.

<Hole-Injection Layer>

The hole-injection layers (111, 111a, and 111b) inject holes from the first electrode 101 serving as the anode or the charge-generation layers (106, 106a, and 106b) to the EL layers (103, 103a, and 103b) and contain an organic acceptor material or a material with a high hole-injection property.

The organic acceptor material in one organic compound allows holes to be generated in another organic compound whose HOMO (highest occupied molecular orbital) level is close to the LUMO (lowest unoccupied molecular orbital) level of the organic acceptor material when charge separation is caused between the organic acceptor material and the organic compound. Thus, as the organic acceptor material, a compound having an electron-withdrawing group (a halogen group, a cyano group, or the like), such as a quinodimethane derivative, a chloranil derivative, or a hexaazatriphenylene derivative, can be used. For example, it is possible to use 7,7,8,8-tetracyano-2,3,5,6-tetrafluoroquinodimethane (abbreviation: $F_4$-TCNQ), 3,6-difluoro-2,5,7,7,8,8-hexacyanoquinodimethane, chloranil, 2,3,6,7,10,11-hexacyano-1,4,5,8,9,12-hexaazatriphenylene (abbreviation: HAT-CN), 1,3,4,5,7,8-hexafluorotetracyano-naphthoquinodimethane (abbreviation: F6-TCNNQ), and 2-(7-dicyanomethylene-1,3,4,5,6,8,9,10-octafluoro-7H-pyren-2-ylidene)malononitrile. Note that among organic acceptor materials, a compound in which electron-withdrawing groups are bonded to fused aromatic rings each having a plurality of heteroatoms, such as HAT-CN, is particularly preferable because it has a high acceptor property and film quality stable against heat. In addition, a [3]radialene derivative having an electron-withdrawing group (particularly a cyano group, a halogen group such as a fluoro group, or the like), which has a very high electron-accepting property, is preferable; specifically, it is possible to use α,α',α''-1,2,3-cyclopropanetriylidenetris [4-cyano-2,3,5,6-tetrafluorobenzeneacetonitrile], α,α',α''-1, 2,3-cyclopropanetriylidenetris[2,6-dichloro-3,5-difluoro-4-(trifluoromethyl)benzeneacetonitrile], α,α',α''-1,2,3-cyclopropanetriylidenetris[2,3,4,5,6-pentafluorobenzeneacetonitrile], or the like.

As the material having a high hole-injection property, an oxide of a metal belonging to Group 4 to Group 8 in the periodic table (e.g., a transition metal oxide such as molybdenum oxide, vanadium oxide, ruthenium oxide, tungsten oxide, or manganese oxide) can be used. Specific examples include molybdenum oxide, vanadium oxide, niobium oxide, tantalum oxide, chromium oxide, tungsten oxide, manganese oxide, and rhenium oxide. Among these oxides, molybdenum oxide is preferable because it is stable in the air, has a low hygroscopic property, and is easily handled. It is also possible to use a phthalocyanine-based compound such as phthalocyanine (abbreviation: $H_2Pc$) or copper phthalocyanine (abbreviation: CuPc).

In addition to the above materials, it is also possible to use an aromatic amine compound, which is a low molecular compound, such as 4,4',4''-tris(N,N-diphenylamino)triphenylamine (abbreviation: TDATA), 4,4',4''-tris[N-(3-methylphenyl)-N-phenylamino]triphenylamine (abbreviation: MTDATA), 4,4'-bis[N-(4-diphenylaminophenyl)-N-phenylamino]biphenyl (abbreviation: DPAB), N,N-bis{4-[bis (3-methylphenyl)amino]phenyl}-N,N-diphenyl-(1,1'-biphenyl)-4,4'-diamine (abbreviation: DNTPD), 1,3,5-tris[N-(4-diphenylaminophenyl)-N-phenylamino]benzene (abbreviation: DPA3B), 3-[N-(9-phenylcarbazol-3-yl)-N-phenylamino]-9-phenylcarbazole (abbreviation: PCzPCA1), 3,6-bis[N-(9-phenylcarbazol-3-yl)-N-phenylamino]-9-phenylcarbazole (abbreviation: PCzPCA2), or 3-[N-(1-naphthyl)-N-(9-phenylcarbazol-3-yl)amino]-9-phenylcarbazole (abbreviation: PCzPCN1).

It is also possible to use a high molecular compound (an oligomer, a dendrimer, a polymer, or the like) such as poly(N-vinylcarbazole) (abbreviation: PVK), poly(4-vinyltriphenylamine) (abbreviation: PVTPA), poly[N-(4-{N'-[4-(4-diphenylamino)phenyl]phenyl-N'-phenylamino}phenyl) methacrylamide] (abbreviation: PTPDMA), or poly[N,N-bis (4-butylphenyl)-N,N-bis(phenyl)benzidine] (abbreviation: Poly-TPD). Alternatively, it is also possible to use a high molecular compound to which acid is added, such as poly (3,4-ethylenedioxythiophene)/poly(styrenesulfonic acid) (abbreviation: PEDOT/PSS) or polyaniline/poly(styrenesulfonic acid) (PAni/PSS).

As the material with a high hole-injection property, a mixed material containing a hole-transport material and the above-described organic acceptor material (an electron-accepting material) can be used. In that case, the organic acceptor material extracts electrons from the hole-transport material, so that holes are generated in the hole-injection layer 111 and the holes are injected into the light-emitting layer 113 through the hole-transport layer 112. Note that the hole-injection layer 111 may be formed as a single layer formed of a mixed material containing a hole-transport material and an organic acceptor material (an electron-accepting material), or may be formed by stacking a layer containing a hole-transport material and a layer containing an organic acceptor material (an electron-accepting material).

The hole-transport material is preferably a substance having a hole mobility higher than or equal to $1 \times 10^{-6}$ $cm^2/Vs$ in the case where the square root of the electric field strength [V/cm] is 600. Note that other substances can be used as long as they have a hole-transport property higher than an electron-transport property.

As the hole-transport material, materials having a high hole-transport property, such as a compound having a π-electron rich heteroaromatic ring (e.g., a carbazole derivative, a furan derivative, or a thiophene derivative) and an aromatic amine (an organic compound having an aromatic amine skeleton), are preferable.

Examples of the above carbazole derivative (an organic compound having a carbazole ring) include a bicarbazole derivative (e.g., a 3,3'-bicarbazole derivative) and an aromatic amine having a carbazolyl group.

Specific examples of the bicarbazole derivative (e.g., a 3,3'-bicarbazole derivative) include 3,3'-bis(9-phenyl-9H-carbazole) (abbreviation: PCCP), 9,9'-bis(biphenyl-4-yl)-3, 3'-bi-9H-carbazole (abbreviation: BisBPCz), 9,9'-bis(1,1'-biphenyl-3-yl)-3,3'-bi-9H-carbazole (abbreviation: BismBPCz), 9-(1,1'-biphenyl-3-yl)-9'-(1,1'-biphenyl-4-yl)-9H,9'H-3,3'-bicarbazole (abbreviation: mBPCCBP), and 9-(2-naphthyl)-9'-phenyl-9H,9'H-3,3'-bicarbazole (abbreviation: βNCCP).

Specific examples of the above aromatic amine having a carbazolyl group include 4-phenyl-4'-(9-phenyl-9H-carbazol-3-yl)triphenylamine (abbreviation: PCBA1BP), N-(4-biphenyl)-N-(9,9-dimethyl-9H-fluoren-2-yl)-9-phenyl-9H-carbazol-3-amine (abbreviation: PCBiF), N-(1,1'-biphenyl-4-yl)-N-[4-(9-phenyl-9H-carbazol-3-yl)phenyl]-9,9-dimethyl-9H-fluoren-2-amine (abbreviation: PCBBiF), 4,4'-diphenyl-4''-(9-phenyl-9H-carbazol-3-yl)triphenylamine (abbreviation: PCBBi1BP), 4-(1-naphthyl)-4'-(9-phenyl-9H-carbazol-3-yl)triphenylamine (abbreviation: PCBANB), 4,4'-di(1-naphthyl)-4''-(9-phenyl-9H-carbazol-3-yl)triphenylamine (abbreviation: PCBNBB), 4-phenyldiphenyl-(9-phenyl-9H-carbazol-3-yl)amine (abbreviation: PCA1BP), N,N-bis(9-phenylcarbazol-3-yl)-N,N-diphenylbenzene-1,3-diamine (abbreviation: PCA2B), N,N',N''-triphenyl-N,N', N''-tris(9-phenylcarbazol-3-yl)benzene-1,3,5-triamine (abbreviation: PCA3B), 9,9-dimethyl-N-phenyl-N-[4-(9-phenyl-9H-carbazol-3-yl)phenyl]fluoren-2-amine (abbreviation: PCBAF), N-phenyl-N-[4-(9-phenyl-9H-carbazol-3-yl)phenyl]spiro-9,9'-bifluoren-2-amine (abbreviation: PCBASF), 3-[N-(9-phenylcarbazol-3-yl)-N-phenylamino]-9-phenylcarbazole (abbreviation: PCzPCA1), 3,6-bis[N-(9-phenylcarbazol-3-yl)-N-phenylamino]-9-phenylcarbazole (abbreviation: PCzPCA2), 3-[N-(1-naphthyl)-N-(9-phenylcarbazol-3-yl)amino]-9-phenylcarbazole (abbreviation: PCzPCN1), 3-[N-(4-diphenylaminophenyl)-N-phenylamino]-9-phenylcarbazole (abbreviation: PCzDPA1), 3,6-bis[N-(4-diphenylaminophenyl)-N-phenylamino]-9-phenylcarbazole (abbreviation: PCzDPA2), 3,6-bis[N-(4-diphenylaminophenyl)-N-(1-naphthyl)amino]-9-phenylcarbazole (abbreviation: PCZTPN2), 2-[N-(9-phenylcarbazol-3-yl)-N-phenylamino]spiro-9,9'-bifluorene (abbreviation: PCASF), N-[4-(9H-carbazol-9-yl)phenyl]-N-(4-phenyl) phenylaniline (abbreviation: YGA1BP), N,N-bis[4-(carbazol-9-yl)phenyl]-N,N-diphenyl-9,9-dimethylfluorene-2,7-diamine (abbreviation: YGA2F), and 4,4',4''-tris(carbazol-9-yl)triphenylamine (abbreviation: TCTA).

In addition to the above, other examples of the carbazole derivative include 3-[4-(9-phenanthryl)-phenyl]-9-phenyl-9H-carbazole (abbreviation: PCPPn), 3-[4-(1-naphthyl)-phenyl]-9-phenyl-9H-carbazole (abbreviation: PCPN), 1,3-bis(N-carbazolyl)benzene (abbreviation: mCP), 4,4'-di(N-carbazolyl)biphenyl (abbreviation: CBP), 3,6-bis(3,5-diphenylphenyl)-9-phenylcarbazole (abbreviation: CzTP), 1,3,5-tris[4-(N-carbazolyl)phenyl]benzene (abbreviation: TCPB), and 9-[4-(10-phenyl-9-anthracenyl)phenyl]-9H-carbazole (abbreviation: CzPA).

Specific examples of the furan derivative (the organic compound having a furan ring) include 4,4',4"-(benzene-1,3,5-triyl)tri(dibenzofuran) (abbreviation: DBF3P-II) and 4-{3-[3-(9-phenyl-9H-fluoren-9-yl)phenyl]phenyl}dibenzofuran (abbreviation: mmDBFFLBi-II).

Specific examples of the thiophene derivative (the organic compound having a thiophene ring) include organic compounds having a thiophene ring such as 4,4',4"-(benzene-1,3,5-triyl)tri(dibenzothiophene) (abbreviation: DBT3P-II), 2,8-diphenyl-4-[4-(9-phenyl-9H-fluoren-9-yl)phenyl]dibenzothiophene (abbreviation: DBTFLP-III), and 4-[4-(9-phenyl-9H-fluoren-9-yl)phenyl]-6-phenyldibenzothiophene (abbreviation: DBTFLP-IV).

Specific examples of the aromatic amine include 4,4'-bis[N-(1-naphthyl)-N-phenylamino]biphenyl (abbreviation: NPB or α-NPD), N,N-bis(3-methylphenyl)-N,N-diphenyl-[1,1'-biphenyl]-4,4'-diamine (abbreviation: TPD), 4,4'-bis[N-(spiro-9,9'-bifluoren-2-yl)-N-phenylamino]biphenyl (abbreviation: BSPB), 4-phenyl-4'-(9-phenylfluoren-9-yl)triphenylamine (abbreviation: BPAFLP), 4-phenyl-3'-(9-phenylfluoren-9-yl)triphenylamine (abbreviation: mBPAFLP), N-(4-biphenyl)-N-{4-[(9-phenyl)-9H-fluoren-9-yl]-phenyl}-9,9-dimethyl-9H-fluoren-2-amine (abbreviation: FBiFLP), N,N,N,N-tetrakis(4-biphenyl)-1,1-biphenyl-4,4'-diamine (abbreviation: BBA2BP), N,N-bis(9,9-dimethyl-9H-fluoren-2-yl)-9,9'-spirobi[9H-fluoren]-4-amine (abbreviation: SF$_4$FAF), N-(9,9-dimethyl-9H-fluoren-2-yl)-N-{9,9-dimethyl-2-[N'-phenyl-N'-(9,9-dimethyl-9H-fluoren-2-yl)amino]-9H-fluoren-7-yl}phenylamine (abbreviation: DFLADFL), N-(9,9-dimethyl-2-diphenylamino-9H-fluoren-7-yl)diphenylamine (abbreviation: DPNF), 2-[N-(4-diphenylaminophenyl)-N-phenylamino]spiro-9,9'-bifluorene (abbreviation: DPASF), 2,7-bis[N-(4-diphenylaminophenyl)-N-phenylamino]-spiro-9,9'-bifluorene (abbreviation: DPA2SF), 4,4',4"-tris[N-(1-naphthyl)-N-phenylamino]triphenylamine (abbreviation: 1'-TNATA), 4,4',4"-tris(N,N-diphenylamino)triphenylamine (abbreviation: TDATA), 4,4',4"-tris[N-(3-methylphenyl)-N-phenylamino]triphenylamine (abbreviation: m-MTDATA), N,N-di(p-tolyl)-N,N'-diphenyl-p-phenylenediamine (abbreviation: DTDPPA), 4,4'-bis[N-(4-diphenylaminophenyl)-N-phenylamino]biphenyl (abbreviation: DPAB), DNTPD, 1,3,5-tris[N-(4-diphenylaminophenyl)-N-phenylamino]benzene (abbreviation: DPA3B), N-(4-biphenyl)-6,N-diphenylbenzo[b]naphtho[1,2-d]furan-8-amine (abbreviation: BnfABP), N,N-bis(4-biphenyl)-6-phenylbenzo[b]naphtho[1,2-d]furan-8-amine (abbreviation: BBABnf), 4,4'-bis(6-phenylbenzo[b]naphtho[1,2-d]furan-8-yl)-4"-phenyltriphenylamine (abbreviation: BnfBB1BP), N,N-bis(4-biphenyl)benzo[b]naphtho[1,2-d]furan-6-amine (abbreviation: BBABnf(6)), N,N-bis(4-biphenyl)benzo[b]naphtho[1,2-d]furan-8-amine (abbreviation: BBABnf(8)), N,N-bis(4-biphenyl)benzo[b]naphtho[2,3-d]furan-4-amine (abbreviation: BBABnf(II)(4)), N,N-bis[4-(dibenzofuran-4-yl)phenyl]-4-amino-p-terphenyl (abbreviation: DBfBB1TP), N-[4-(dibenzothiophen-4-yl)phenyl]-N-phenyl-4-biphenylamine (abbreviation: ThBA1BP), 4-(2-naphthyl)-4',4"-diphenyltriphenylamine (abbreviation: BBAβNB), 4-[4-(2-naphthyl)phenyl]-4',4"-diphenyltriphenylamine (abbreviation: BBAβNBi), 4,4'-diphenyl-4"-(6; 1'-binaphthyl-2-yl)triphenylamine (abbreviation: BBAαNβNB), 4,4'-diphenyl-4"-(7;1'-binaphthyl-2-yl)triphenylamine (abbreviation: BBAαNβNB-03), 4,4'-diphenyl-4"-(7-phenyl)naphthyl-2-yltriphenylamine (abbreviation: BBAPβNB-03), 4,4'-diphenyl-4"-(6;2'-binaphthyl-2-yl)triphenylamine (abbreviation: BBA(βN2)B), 4,4'-diphenyl-4"-(7;2'-binaphthyl-2-yl)triphenylamine (abbreviation: BBA(βN2)B-03), 4,4'-diphenyl-4"-(4;2'-binaphthyl-1-yl)triphenylamine (abbreviation: BBAβNαNB), 4,4'-diphenyl-4"-(5;2'-binaphthyl-1-yl)triphenylamine (abbreviation: BBAβNαNB-02), 4-(4-biphenylyl)-4'-(2-naphthyl)-4"-phenyltriphenylamine (abbreviation: TPBiAβNB), 4-(3-biphenylyl)-4'-[4-(2-naphthyl)phenyl]-4"-phenyltriphenylamine (abbreviation: mTPBiAβNBi), 4-(4-biphenylyl)-4'-[4-(2-naphthyl)phenyl]-4"-phenyltriphenylamine (abbreviation: TPBiAβNBi), 4-phenyl-4'-(1-naphthyl)-triphenylamine (abbreviation: αNBA1BP), 4,4'-bis(1-naphthyl)triphenylamine (abbreviation: αNBB1BP), 4,4'-diphenyl-4"-[4'-(carbazol-9-yl)biphenyl-4-yl]triphenylamine (abbreviation: YGTBi1BP), 4'-[4-(3-phenyl-9H-carbazol-9-yl)phenyl]tris(1,1'-biphenyl-4-yl)amine (abbreviation: YGTBi1BP-02), 4-[4'-(carbazol-9-yl)biphenyl-4-yl]-4'-(2-naphthyl)-4"-phenyltriphenylamine (abbreviation: YGTBiβNB), bis-biphenyl-4'-(carbazol-9-yl)biphenylamine (abbreviation: YGBBi1BP), N-[4-(9-phenyl-9H-carbazol-3-yl)phenyl]-N-[4-(1-naphthyl)phenyl]-9,9'-spirobi[9H-fluoren]-2-amine (abbreviation: PCBNBSF), N,N-bis([1,1'-biphenyl]-4-yl)-9,9'-spirobi[9H-fluoren]-2-amine (abbreviation: BBASF), N,N-bis([1,1'-biphenyl]-4-yl)-9,9'-spirobi[9H-fluoren]-4-amine (abbreviation: BBASF(4)), N-(1,1'-biphenyl-2-yl)-N-(9,9-dimethyl-9H-fluoren-2-yl)-9,9'-spirobi[9H-fluoren]-4-amine (abbreviation: OFBiSF), N-(4-biphenyl)-N-(9,9-dimethyl-9H-fluoren-2-yl)dibenzofuran-4-amine (abbreviation: FrBiF), N-[4-(1-naphthyl)phenyl]-N-[3-(6-phenyldibenzofuran-4-yl)phenyl]-1-naphthylamine (abbreviation: mPDBfBNBN), 4-phenyl-4'-[4-(9-phenylfluoren-9-yl)phenyl]triphenylamine (abbreviation: BPAFLBi), N,N-bis(9,9-dimethyl-9H-fluoren-2-yl)-9,9'-spirobi-9H-fluoren-4-amine, N,N-bis(9,9-dimethyl-9H-fluoren-2-yl)-9,9'-spirobi-9H-fluoren-3-amine, N,N-bis(9,9-dimethyl-9H-fluoren-2-yl)-9,9'-spirobi-9H-fluoren-2-amine, and N,N-bis(9,9-dimethyl-9H-fluoren-2-yl)-9,9'-spirobi-9H-fluoren-1-amine.

It is also possible to use a high molecular compound (an oligomer, a dendrimer, a polymer, or the like) such as poly(N-vinylcarbazole) (abbreviation: PVK), poly(4-vinyltriphenylamine) (abbreviation: PVTPA), poly[N-(4-{N'-[4-(4-diphenylamino)phenyl]phenyl-N-phenylamino}phenyl)methacrylamide] (abbreviation: PTPDMA), or poly[N,N-bis(4-butylphenyl)-N,N-bis(phenyl)benzidine] (abbreviation: Poly-TPD) as a hole-transport material. Alternatively, it is also possible to use a high molecular compound to which acid is added, such as poly(3,4-ethylenedioxythiophene)/poly(styrenesulfonic acid) (abbreviation: PEDOT/PSS) or polyaniline/poly(styrenesulfonic acid) (PAni/PSS).

Note that the hole-transport material is not limited to the above, and one or a combination of various known materials may be used as the hole-transport material.

Note that the hole-injection layers (111, 111a, and 111b) can be formed by any of various known film formation methods, and can be formed by a vacuum evaporation method, for example.

<Hole-Transport Layer>

The hole-transport layers (112, 112a, and 112b) transport the holes, which are injected from the first electrode 101 by the hole-injection layers (111, 111a, and 111b), to the light-emitting layers (113, 113a, and 113b). Note that the hole-transport layers (112, 112a, and 112b) are each a layer containing a hole-transport material. Thus, for the hole-transport layers (112, 112a, and 112b), a hole-transport material that can be used for the hole-injection layers (111, 111a, and 111b) can be used.

Note that in the light-emitting device of one embodiment of the present invention, the organic compound used for the hole-transport layers (112, 112a, and 112b) can also be used for the light-emitting layers (113, 113a, and 113b). The same organic compound is preferably used for the hole-transport layers (112, 112a, and 112b) and the light-emitting layers (113, 113a, and 113b), in which case holes can be efficiently transported from the hole-transport layers (112, 112a, and 112b) to the light-emitting layers (113, 113a, and 113b).

<Light-Emitting Layer>

The light-emitting layers (113, 113a, and 113b) each contain a light-emitting substance. As the light-emitting substance that can be used for the light-emitting layers (113, 113a, and 113b), a substance that exhibits an emission color of green, yellowish green, yellow, orange, red, or the like can be used as appropriate. When different light-emitting substances are used for a plurality of light-emitting layers, different emission colors can be exhibited. Furthermore, a stacked-layer structure in which one light-emitting layer contains different light-emitting substances may be employed.

The light-emitting layers (113, 113a, and 113b) may each contain one or more kinds of organic compounds (a host material and the like) in addition to a light-emitting substance (a guest material).

In the case where a plurality of host materials are used in the light-emitting layers (113, 113a, and 113b), a second host material that is additionally used is preferably a substance having a larger energy gap than those of a known guest material and a first host material. Preferably, the lowest singlet excitation energy level (S1 level) of the second host material is higher than the S1 level of the first host material, and the lowest triplet excitation energy level (T1 level) of the second host material is higher than the T1 level of the guest material. Furthermore, the lowest triplet excitation energy level (T1 level) of a second host material 3 is preferably higher than the T1 level of the first host material. With such a structure, an exciplex can be formed by the two kinds of host materials. In order to form an exciplex efficiently, it is particularly preferable to combine a compound that easily accepts holes (a hole-transport material) and a compound that easily accepts electrons (an electron-transport material). With the structure, high efficiency, a low voltage, and a long lifetime can be achieved at the same time.

The organic compound used as the host material (including the first host material and the second host material) may be any of the hole-transport materials usable for the hole-transport layers (112, 112a, and 112b) described above, electron-transport materials usable for electron-transport layers (114, 114a, and 114b) described later, and the like as long as they satisfy requirements for the host material used in the light-emitting layer, and may be an exciplex formed by a plurality of kinds of organic compounds (the first host material and the second host material). An exciplex (also referred to as Exciplex) whose excited state is formed by a plurality of kinds of organic compounds has an extremely small difference between the S1 level and the T1 level and functions as a TADF material that can convert triplet excitation energy into singlet excitation energy. As a combination of the plurality of kinds of organic compounds forming an exciplex, for example, it is preferable that one have a π-electron deficient heteroaromatic ring and the other have a π-electron rich heteroaromatic ring. A phosphorescent substance such as an iridium-, rhodium-, or platinum-based organometallic complex or a metal complex may be used as one compound of the combination for forming an exciplex.

The light-emitting substance that can be used for the light-emitting layers (113, 113a, and 113b) is not particularly limited, and a light-emitting substance that converts singlet excitation energy into light emission in a visible light range or a light-emitting substance that converts triplet excitation energy into light emission in a visible light range can be used.

<<Light-Emitting Substance That Converts Singlet Excitation Energy Into Light Emission>>

The following substances emitting fluorescent light (fluorescent substances) can be given as the light-emitting substance that can be used for the light-emitting layers (113, 113a, and 113b) and convert singlet excitation energy into light emission. Examples include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative. A pyrene derivative is particularly preferable because it has a high emission quantum yield. Specific examples of pyrene derivatives include N,N'-bis(3-methylphenyl)-N,N'-bis[3-(9-phenyl-9H-fluoren-9-yl)phenyl]pyrene-1,6-diamine (abbreviation: 1,6mMemFLPAPrn), (N,N'-diphenyl-N,N'-bis[4-(9-phenyl-9H-fluoren-9-yl)phenyl]pyrene-1,6-diamine) (abbreviation: 1,6FLPAPrn), N,N'-bis(dibenzofuran-2-yl)-N,N'-diphenylpyrene-1,6-diamine (abbreviation: 1,6FrAPrn), N,N'-bis(dibenzothiophen-2-yl)-N,N'-diphenylpyrene-1,6-diamine (abbreviation: 1,6ThAPrn), N,N'-(pyrene-1,6-diyl)bis[(N-phenylbenzo[b]naphtho[1,2-d]furan)-6-amine] (abbreviation: 1,6BnfAPrn), N,N'-(pyrene-1,6-diyl)bis[(N-phenylbenzo[b]naphtho[1,2-d]furan)-8-amine] (abbreviation: 1,6BnfAPrn-02), and N,N'-(pyrene-1,6-diyl)bis[(6, N-diphenylbenzo[b]naphtho[1,2-d]furan)-8-amine] (abbreviation: 1,6BnfAPrn-03).

In addition, it is possible to use 5,6-bis[4-(10-phenyl-9-anthryl)phenyl]-2,2'-bipyridine (abbreviation: PAP2BPy), 5,6-bis[4'-(10-phenyl-9-anthryl)biphenyl-4-yl]-2,2'-bipyridine (abbreviation: PAPP2BPy), N,N'-bis[4-(9H-carbazol-9-yl)phenyl]-N,N'-diphenylstilbene-4,4'-diamine (abbreviation: YGA2S), 4-(9H-carbazol-9-yl)-4'-(10-phenyl-9-anthryl)triphenylamine (abbreviation: YGAPA), 4-(9H-carbazol-9-yl)-4'-(9,10-diphenyl-2-anthryl)triphenylamine (abbreviation: 2YGAPPA), N,9-diphenyl-N-[4-(10-phenyl-9-anthryl)phenyl]-9H-carbazol-3-amine (abbreviation: PCAPA), 4-(10-phenyl-9-anthryl)-4'-(9-phenyl-9H-carbazol-3-yl)triphenylamine (abbreviation: PCBAPA), 4-[4-(10-phenyl-9-anthryl)phenyl]-4'-(9-phenyl-9H-carbazol-3-yl)triphenylamine (abbreviation: PCBAPBA), perylene, 2,5,8,11-tetra-tert-butylperylene (abbreviation: TBP), N,N''-(2-tert-butylanthracene-9,10-diyldi-4,1-phenylene)bis[N,N',N'-triphenyl-1,4-phenylenediamine] (abbreviation: DPABPA), N,9-diphenyl-N-[4-(9,10-diphenyl-2-anthryl)phenyl]-9H-carbazol-3-amine (abbreviation: 2PCAPPA), N-[4-(9,10-diphenyl-2-anthryl)phenyl]-N,N',N'-triphenyl-1,4-phenylenediamine (abbreviation: 2DPAPPA), or the like.

Other examples include N-[9,10-bis(1,1'-biphenyl-2-yl)-2-anthryl]-N,9-diphenyl-9H-carbazol-3-amine (abbreviation: 2PCABPhA), N-(9,10-diphenyl-2-anthryl)-N,N',N'-triphenyl-1,4-phenylenediamine (abbreviation: 2DPAPA), N-[9,10-bis(1,1'-biphenyl-2-yl)-2-anthryl]-N,N',N'-triphenyl-1,4-phenylenediamine (abbreviation: 2DPABPhA), 9,10-bis(1,1'-biphenyl-2-yl)-N-[4-(9H-carbazol-9-yl)phenyl]-N-phenylanthracen-2-amine (abbreviation: 2YGABPhA), N,N,9-triphenylanthracen-9-amine (abbreviation: DPhAPhA), coumarin 545T, N,N'-diphenylquinacridone (abbreviation: DPQd), rubrene, 5,12-bis(1,1'-biphenyl-4-yl)-6,11-diphenyltetracene (abbreviation: BPT), 2-(2-{2-[4-(dimethylamino)phenyl]ethenyl}-6-methyl-4H-pyran-4-ylidene)propanedinitrile (abbreviation: DCM1), 2-{2-methyl-6-[2-(2,3,6,7-tetrahydro-1H,5H-benzo[ij]quinolizin-9-yl)ethenyl]-4H-pyran-4-ylidene}propanedinitrile (abbreviation: DCM2), N,N,N',N'-tetrakis(4-methylphenyl)tetracene-5,11-diamine (abbreviation: p-mPhTD), 7,14-diphenyl-N,N,N',N'-tetrakis(4-methylphenyl)acenaphtho[1,2-a]fluoranthene-3,10-diamine (abbreviation: p-mPhAFD), 2-{2-isopropyl-6-[2-(1,1,7,7-tetramethyl-2,3,6,7-tetrahydro-1H,5H-benzo[ij]quinolizin-9-yl)ethenyl]-4H-pyran-4-ylidene}propanedinitrile (abbreviation: DCJTI), 2-{2-tert-butyl-6-[2-(1,1,7,7-tetramethyl-2,3,6,7-tetrahydro-1H,5H-benzo[ij]quinolizin-9-yl)ethenyl]-4H-pyran-4-ylidene}propanedinitrile (abbreviation: DCJTB), 2-(2,6-bis{2-[4-(dimethylamino)phenyl]ethenyl}-4H-pyran-4-ylidene)propanedinitrile (abbreviation: BisDCM), 2-{2,6-bis[2-(8-methoxy-1,1,7,7-tetramethyl-2,3,6,7-tetrahydro-1H,5H-benzo[ij]quinolizin-9-yl)ethenyl]-4H-pyran-4-ylidene} propanedinitrile (abbreviation: BisDCJTM), 1,6BnfAPrn-03, 3,10-bis[N-(9-phenyl-9H-carbazol-2-yl)-N-phenylamino]naphtho[2,3-b; 6,7-b']bisbenzofuran (abbreviation: 3,10PCA2Nbf(IV)-02), and 3,10-bis[N-(dibenzofuran-3-yl)-N-phenylamino]naphtho[2,3-b;6,7-b'] bisbenzofuran (abbreviation: 3,10FrA2Nbf(IV)-02). In particular, pyrenediamine compounds such as 1,6FLPAPrn, 1,6mMemFLPAPrn, and 1,6BnfAPrn-03 can be used, for example. Among the above, a propanedinitrile compound is particularly suitable to obtain electroluminescence having a peak wavelength greater than or equal to 590 nm at 620 nm.

<<Light-Emitting Substance That Converts Triplet Excitation Energy Into Light Emission>>

Next, as examples of the light-emitting substance that converts triplet excitation energy into light emission and can be used for the light-emitting layer 113, a substance that emits phosphorescent light (a phosphorescent substance) and a thermally activated delayed fluorescent (TADF) material that exhibits thermally activated delayed fluorescence can be given.

A phosphorescent substance refers to a compound that exhibits phosphorescence but does not exhibit fluorescence at a temperature higher than or equal to low temperatures (e.g., 77 K) and lower than or equal to room temperature (i.e., higher than or equal to 77 K and lower than or equal to 313 K). The phosphorescent substance preferably contains a metal element with large spin-orbit interaction, and can be an organometallic complex, a metal complex (platinum complex), a rare earth metal complex, or the like. Specifically, a transition metal element is preferable and it is particularly preferable that a platinum group element (ruthenium (Ru), rhodium (Rh), palladium (Pd), osmium (Os), iridium (Ir), or platinum (Pt)), especially iridium, be contained, in which case the transition probability relating to direct transition between the singlet ground state and the triplet excited state can be increased.

<<Phosphorescent Substance (From 495 nm to 590 nm: Green or Yellow)>>

As examples of a phosphorescent substance that exhibits green or yellow emission and whose emission spectrum has a peak wavelength greater than or equal to 495 nm and less than or equal to 590 nm, the following substances can be given.

The examples include organometallic iridium complexes having a pyrimidine ring, such as tris(4-methyl-6-phenylpyrimidinato)iridium(III) (abbreviation: [Ir(mppm)$_3$]), tris(4-t-butyl-6-phenylpyrimidinato)iridium(III) (abbreviation: [Ir(tBuppm)$_3$]), (acetylacetonato)bis(6-methyl-4-phenylpyrimidinato)iridium(III) (abbreviation: [Ir(mppm)$_2$(acac)]), (acetylacetonato)bis(6-tert-butyl-4-phenylpyrimidinato)iridium(III) (abbreviation: [Ir(tBuppm)$_2$(acac)]), (acetylacetonato)bis[6-(2-norbornyl)-4-phenylpyrimidinato]iridium(III) (abbreviation: [Ir(nbppm)$_2$(acac)]), (acetylacetonato)bis[5-methyl-6-(2-methylphenyl)-4-phenylpyrimidinato]iridium(III) (abbreviation: [Ir(mpmppm)$_2$(acac)]), (acetylacetonato)bis{4,6-dimethyl-2-[6-(2,6-dimethylphenyl)-4-pyrimidinyl-κN3]phenyl-κC}iridium(III) (abbreviation: [Ir(dmppm-dmp)$_2$(acac)]), and (acetylacetonato)bis(4,6-diphenylpyrimidinato)iridium (III) (abbreviation: [Ir(dppm)$_2$(acac)]); organometallic iridium complexes having a pyrazine ring, such as (acetylacetonato)bis(3,5-dimethyl-2-phenylpyrazinato)iridium (III) (abbreviation: [Ir(mppr-Me)$_2$(acac)]) and (acetylacetonato)bis(5-isopropyl-3-methyl-2-phenylpyrazinato)iridium (III) (abbreviation: [Ir(mppr-iPr)$_2$(acac)]); organometallic iridium complexes having a pyridine ring, such as tris(2-phenylpyridinato-N,C$^{2'}$)iridium(III) (abbreviation: [Ir(ppy)$_3$]), bis(2-phenylpyridinato-N,C$^{2'}$)iridium(III) acetylacetonate (abbreviation: [Ir(ppy)$_2$(acac)]), bis(benzo[h]quinolinato)iridium(III) acetylacetonate (abbreviation: [Ir(bzq)$_2$(acac)]), tris(benzo[h]quinolinato)iridium(III) (abbreviation: [Ir(bzq)$_3$]), tris(2-phenylquinolinato-N,C$^{2'}$)iridium(III) (abbreviation: [Ir(pq)$_3$]), bis(2-phenylquinolinato-N,C$^{2'}$)iridium(III) acetylacetonate (abbreviation: [Ir(pq)$_2$(acac)]), bis[2-(2-pyridinyl-κN)phenyl-κC][2-(4-phenyl-2-pyridinyl-κN)phenyl-κN)phenyl-κC]iridium(III) (abbreviation: [Ir(ppy)$_2$(4dppy)]), bis[2-(2-pyridinyl-κN)phenyl-κC][2-(4-methyl-5-phenyl-2-pyridinyl-κN)phenyl-κC], [2-d$_3$-methyl-8-(2-pyridinyl-κN)benzofuro[2,3-b]pyridine-κC]bis[2-(5-d$_3$-methyl-2-pyridinyl-κN$^2$)phenyl-κC]iridium(III) (abbreviation: Ir(5mppy-d$_3$)$_2$(mbfpypy-d$_3$)), [2-(methyl-d$_3$)-8-[4-(1-methylethyl-1-d)-2-pyridinyl-κN] benzofuro2, [3-b]pyridin-7-yl-κC]bis[5-(methyl-d$_3$)-2-[5-(methyl-d$_3$)-2-pyridinyl-κN]phenyl-κC]iridium(III) (abbreviation: Ir(5mtpy-d$_6$)$_2$(mbfpypy-iPr-d$_4$)), [2-d$_3$-methyl-(2-pyridinyl-κN)benzofuro[2,3-b]pyridine-κC]bis [2-(2-pyridinyl-κN)phenyl-κC]iridium(III) (abbreviation: Ir(ppy)$_2$(mbfpypy-d$_3$)), and [2-(4-methyl-5-phenyl-2-pyridinyl-κN)phenyl-κC]bis[2-(2-pyridinyl-κN)phenyl-κC] iridium(III) (abbreviation: Ir(ppy)$_2$(mdppy)); organometallic complexes such as bis(2,4-diphenyl-1,3-oxazolato-N,C$^{2'}$) iridium(III) acetylacetonate (abbreviation: [Ir(dpo)$_2$(acac)]), bis{2-[4'-(perfluorophenyl)phenyl]pyridinato-N, C$^{2'}$}iridium(III) acetylacetonate (abbreviation: [Ir(p-PF-ph)$_2$(acac)]), and bis(2-phenylbenzothiazolato-N,C$^{2'}$) iridium(III) acetylacetonate (abbreviation: [Ir(bt)$_2$(acac)]); and rare earth metal complexes such as tris(acetylacetonato) (monophenanthroline)terbium(III) (abbreviation: [Tb(acac)$_3$(Phen)]).

<<Phosphorescent Substance (from 570 nm to 750 nm: Yellow or Red)>>

As examples of a phosphorescent substance that exhibits yellow or red emission and whose emission spectrum has a peak wavelength greater than or equal to 570 nm and less than or equal to 750 nm, the following substances can be given.

The examples include organometallic complexes having a pyrimidine ring, such as (diisobutyrylmethanato)bis[4,6-bis (3-methylphenyl)pyrimidinato]iridium(III) (abbreviation: [Ir(5mdppm)$_2$(dibm)]), bis[4,6-bis(3-methylphenyl)pyrimidinato](dipivaloylmethanato)iridium(III)(abbreviation: [Ir (5mdppm)$_2$(dpm)]), (dipivaloylmethanato)bis[4,6-di(naphthalen-1-yl)pyrimidinato]iridium(III) (abbreviation: [Ir (d1npm)$_2$(dpm)]), and bis[2-(2-quinolinyl-κN)phenyl-κC] [2-(6-phenyl-4-pyrimidinyl-κN$^3$)phenyl-κC]iridium(III)

(abbreviation: [Ir(pqn)₂(dppm)]); organometallic complexes having a pyrazine ring, such as (acetylacetonato)bis(2,3,5-triphenylpyrazinato)iridium(III) (abbreviation: [Ir(tppr)₂(acac)]), bis(2,3,5-triphenylpyrazinato)(dipivaloylmethanato)iridium(III) (abbreviation: [Ir(tppr)₂(dpm)]), bis{4,6-dimethyl-2-[3-(3,5-dimethylphenyl)-5-phenyl-2-pyrazinyl-κN]phenyl-κC}(2,6-dimethyl-3,5-heptanedionato-κ²O,O')iridium(III) (abbreviation: [Ir(dmdppr-P)₂(dibm)]), bis{4,6-dimethyl-2-[5-(4-cyano-2,6-dimethylphenyl)-3-(3,5-dimethylphenyl)-2-pyrazinyl-κN]phenyl-κC}(2,2,6,6-tetramethyl-3,5-heptanedionato-κ²O,O')iridium(III) (abbreviation: [Ir(dmdppr-dmCP)₂(dpm)]), bis[2-(5-(2,6-dimethylphenyl)-3-(3,5-dimethylphenyl)-2-pyrazinyl-κN)-4,6-dimethylphenyl-κC](2,2',6,6'-tetramethyl-3,5-heptadionato-K²O,O')iridium(III) (abbreviation: [Ir(dmdppr-dmp)₂(dpm)]), (acetylacetonato)bis[2-methyl-3-phenylquinoxalinato-N,C²']iridium(III) (abbreviation: [Ir(mpq)₂(acac)]), (acetylacetonato)bis(2,3-diphenylquinoxalinato-N,C²')iridium(III) (abbreviation: [Ir(dpq)₂(acac)]), and (acetylacetonato)bis[2,3-bis(4-fluorophenyl)quinoxalinato]iridium(III) (abbreviation: [Ir(Fdpq)₂(acac)]); organometallic complexes having a pyridine ring, such as tris(1-phenylisoquinolinato-N,C²')iridium(III) (abbreviation: [Ir(piq)₃]), bis(1-phenylisoquinolinato-N,C²')iridium(III) acetylacetonate (abbreviation: [Ir(piq)₂(acac)]), and bis[4,6-dimethyl-2-(2-quinolinyl-κN)phenyl-κC](2,4-pentanedionato-κ²O,O')iridium(III) (abbreviation: [Ir(dmpqn)₂(acac)]); platinum complexes such as 2,3,7,8,12,13,17,18-octaethyl-21H,23H-porphyrin platinum(II) (abbreviation: [PtOEP]); and rare earth metal complexes such as tris(1,3-diphenyl-1,3-propanedionato)(monophenanthroline)europium(III) (abbreviation: [Eu(DBM)₃(Phen)]) and tris[1-(2-thenoyl)-3,3,3-trifluoroacetonato](monophenanthroline)europium(III) (abbreviation: [Eu(TTA)₃(Phen)]). Among the above, an organometallic complex including either one or both a pyrimidine ring or a pyrazine ring is suitable to obtain electroluminescence having a peak wavelength greater than or equal to 590 nm at 620 nm. In addition, among the organometallic complex having a pyridine ring, an organometallic complex including a quinoline ring is particularly suitable to obtain electroluminescence having a peak wavelength greater than or equal to 590 nm at 620 nm. Among this, an emission intensity at less than or equal to 495 nm is low for an organometallic complex including both a ligand having a pyrimidine ring or a pyrazine ring and a ligand having a quinoline ring, and thus suitable to obtain electroluminescence having a half width greater than or equal to 90 nm and less than or equal to 120 nm.

<<TADF Material>>

Any of materials shown below can be used as the TADF material. The TADF material refers to a material that has a small difference (preferably, less than or equal to 0.2 eV) between the S1 level and the T1 level, enables up-conversion of a triplet excited state into a singlet excited state (reverse intersystem crossing) using a little thermal energy, and efficiently exhibits light emission (fluorescence) from the singlet excited state. The thermally activated delayed fluorescence is efficiently obtained under the condition where the difference in energy between the triplet excited energy level and the singlet excited energy level is greater than or equal to 0 eV and less than or equal to 0.2 eV, preferably greater than or equal to 0 eV and less than or equal to 0.1 eV. Delayed fluorescence by the TADF material refers to light emission having a spectrum similar to that of normal fluorescence and an extremely long lifetime. The lifetime is $1\times10^{-6}$ seconds or longer, preferably $1\times10^{-3}$ seconds or longer.

Examples of the TADF material include fullerene, a fullerene derivative, an acridine derivative such as proflavine, and eosin. Other examples include a metal-containing porphyrin such as a porphyrin containing magnesium (Mg), zinc (Zn), cadmium (Cd), tin (Sn), platinum (Pt), indium (In), or palladium (Pd). Examples of the metal-containing porphyrin include a protoporphyrin-tin fluoride complex (abbreviation: $SnF_2$(Proto IX)), a mesoporphyrin-tin fluoride complex (abbreviation: $SnF_2$(Meso IX)), a hematoporphyrin-tin fluoride complex (abbreviation: $SnF_2$(Hemato IX)), a coproporphyrin tetramethyl ester-tin fluoride complex (abbreviation: $SnF_2$(Copro III-4Me)), an octaethylporphyrin-tin fluoride complex (abbreviation: $SnF_2$(OEP)), an etioporphyrin-tin fluoride complex (abbreviation: $SnF_2$(Etio I)), and an octaethylporphyrin-platinum chloride complex (abbreviation: $PtCl_2OEP$).

[Chemical Formulae 1]

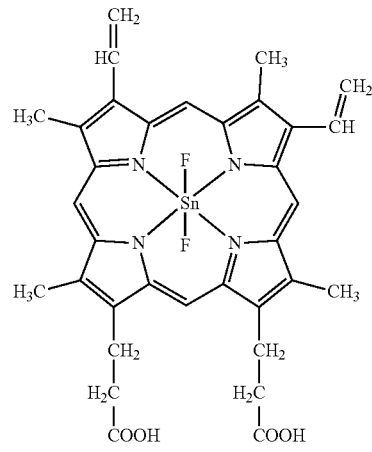

SnF₂(Proto IX)

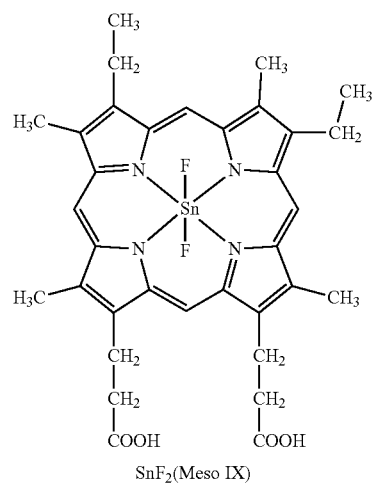

SnF₂(Meso IX)

-continued

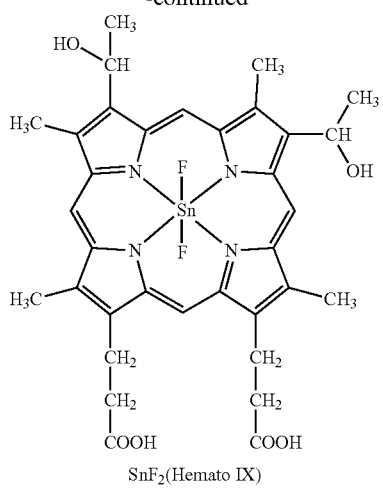

SnF₂(Hemato IX)

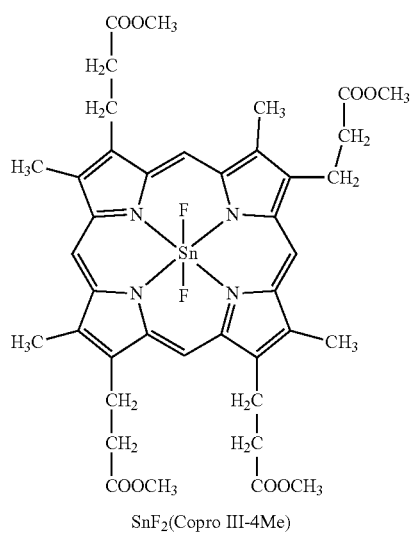

SnF₂(Copro III-4Me)

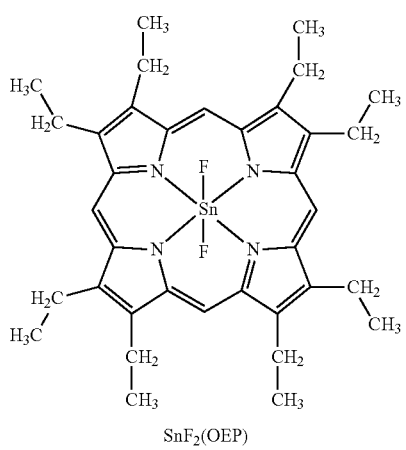

SnF₂(OEP)

-continued

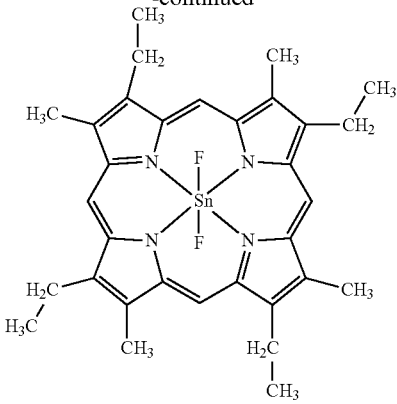

SnF₂(Etio I)

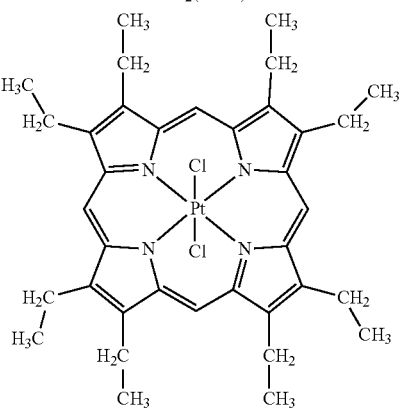

PtCl₂OEP

Alternatively, a heteroaromatic compound that includes a π-electron rich heteroaromatic compound and a π-electron deficient heteroaromatic compound, such as 2-(biphenyl-4-yl)-4,6-bis(12-phenylindolo[2,3-a]carbazol-11-yl)-1,3,5-triazine (abbreviation: PIC-TRZ), 2-{4-[3-(N-phenyl-9H-carbazol-3-yl)-9H-carbazol-9-yl]phenyl}-4,6-diphenyl-1,3,5-triazine (abbreviation: PCCzPTzn), 2-[4-(10H-phenoxazin-10-yl)phenyl]-4,6-diphenyl-1,3,5-triazine (abbreviation: PXZ-TRZ), 3-[4-(5-phenyl-5,10-dihydrophenazin-10-yl)phenyl]-4,5-diphenyl-1,2,4-triazole (abbreviation: PPZ-3TPT), 3-(9,9-dimethyl-9H-acridin-10-yl)-9H-xanthen-9-one (abbreviation: 10 ACRXTN), bis[4-(9,9-dimethyl-9,10-dihydroacridine)phenyl]sulfone (abbreviation: DMAC-DPS), 10-phenyl-10H,10'H-spiro[acridin-9,9'-anthracen]-10'-one (abbreviation: ACRSA), 4-(9'-phenyl-3,3'-bi-9H-carbazol-9-yl)benzofuro[3,2-d]pyrimidine (abbreviation: 4PCCzBfpm), 4-[4-(9'-phenyl-3,3'-bi-9H-carbazol-9-yl)phenyl]benzofuro[3,2-d]pyrimidine (abbreviation: 4PCCzPBfpm), or 9-[3-(4,6-diphenyl-1,3,5-triazin-2-yl)phenyl]-9'-phenyl-2,3'-bi-9H-carbazole (abbreviation: mPCCzPTzn-02), may be used.

Note that a substance in which a π-electron rich heteroaromatic compound is directly bonded to a π-electron deficient heteroaromatic compound is particularly preferable because both the donor property of the π-electron rich heteroaromatic compound and the acceptor property of the π-electron deficient heteroaromatic compound are improved and the energy difference between the singlet excited state and the triplet excited state becomes small. As the TADF material, a TADF material (TADF 100) that is in a thermal equilibrium state between a singlet excited state and a triplet excited state may be used. Since such a TADF material enables a short emission lifetime (excitation lifetime), an efficiency decrease of a light-emitting element in a high-luminance region can be inhibited.
[Chemical Formulae 2]
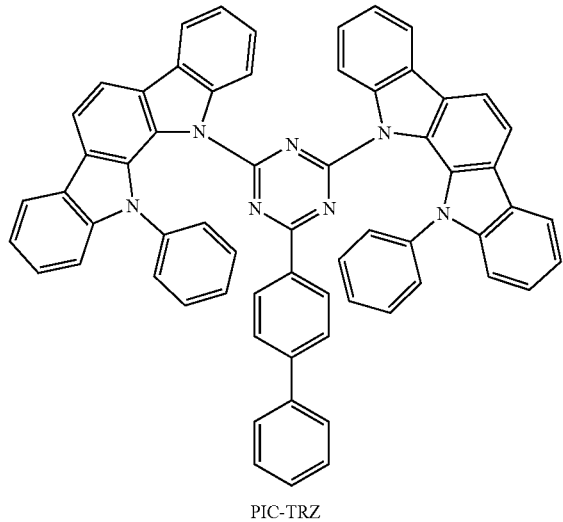
PIC-TRZ
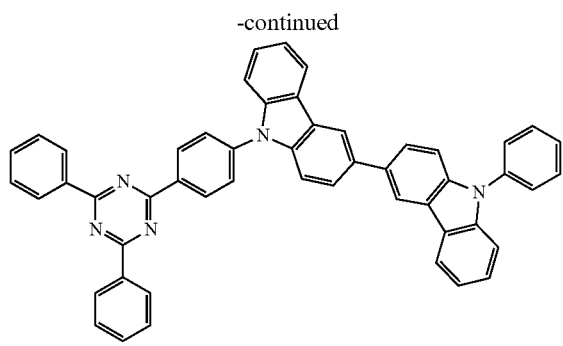
PCCzPTzn
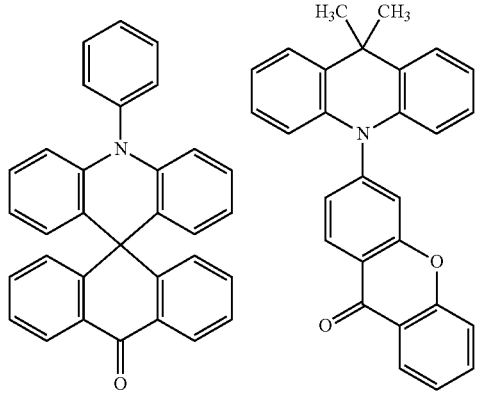
ACRSA    ACRXTN
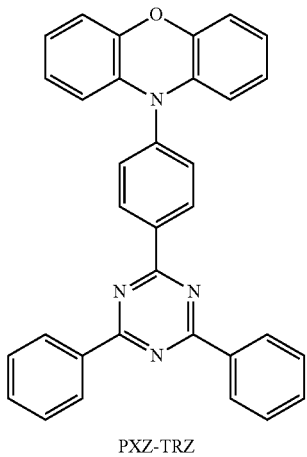
PXZ-TRZ
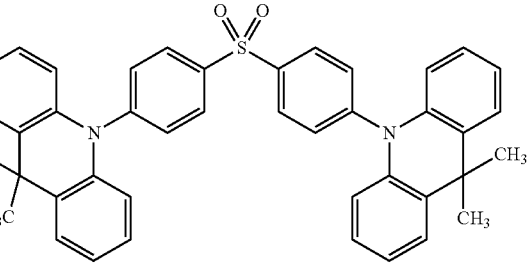
DMAC-DPS
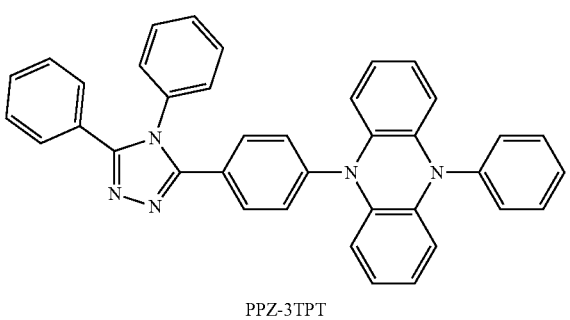
PPZ-3TPT
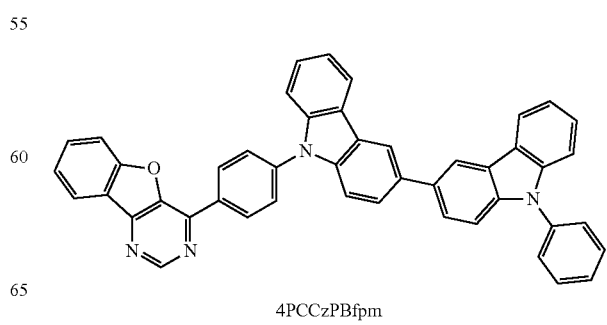
4PCCzPBfpm

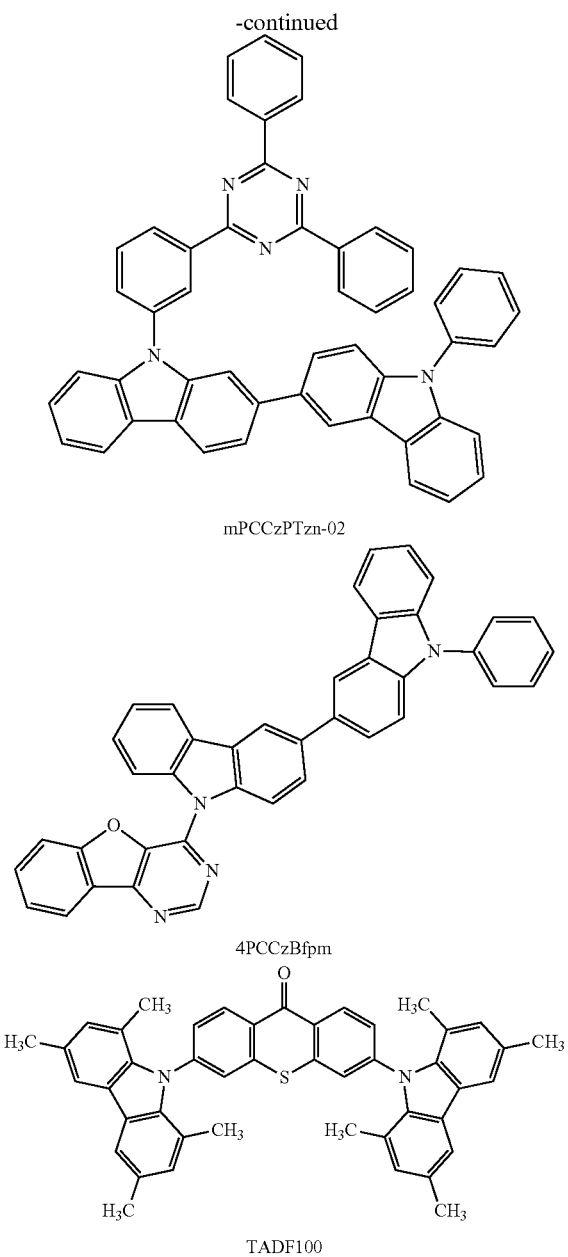

mPCCzPTzn-02

4PCCzBfpm

TADF100

In addition to the above, another example of a material having a function of converting triplet excitation energy into light emission is a nanostructure of a transition metal compound having a perovskite structure. In particular, a nanostructure of a metal-halide perovskite material is preferable. The nanostructure is preferably a nanoparticle or a nanorod.

As the organic compounds (the host material and the like) used in combination with any of the above light-emitting substances (guest material) in the light-emitting layers (113, 113a, 113b, and 113c), one or more kinds of substances having a larger energy gap than the light-emitting substance (the guest material) are selected to be used.

<<Host Material for Fluorescence>>

In the case where the light-emitting substance used in the light-emitting layers (113, 113a, 113b, and 113c) is a fluorescent substance, an organic compound (a host material) used in combination with the fluorescent substance is preferably an organic compound that has a high energy level in a singlet excited state and has a low energy level in a triplet excited state or an organic compound having a fluorescence quantum yield. Therefore, the hole-transport material (described above) or the electron-transport material (described below) shown in this embodiment, for example, can be used as long as they are organic compounds that satisfy such a condition.

In terms of a preferable combination with the light-emitting substance (fluorescent substance), examples of the organic compound (host material), some of which overlap with the above specific examples, include fused polycyclic aromatic compounds such as an anthracene derivative, a tetracene derivative, a phenanthrene derivative, a pyrene derivative, a chrysene derivative, and a dibenzo[g,p]chrysene derivative.

Specific examples of the organic compound (the host material) preferably used in combination with a fluorescent substance include 9-phenyl-3-[4-(10-phenyl-9-anthryl)phenyl]-9H-carbazole (abbreviation: PCzPA), 3,6-diphenyl-9-[4-(10-phenyl-9-anthryl)phenyl]-9H-carbazole (abbreviation: DPCzPA), 3-[4-(1-naphthyl)-phenyl]-9-phenyl-9H-carbazole (abbreviation: PCPN), 9,10-diphenylanthracene (abbreviation: DPAnth), N,N-diphenyl-9-[4-(10-phenyl-9-anthryl)phenyl]-9H-carbazol-3-amine (abbreviation: CzAIPA), 4-(10-phenyl-9-anthryl)triphenylamine (abbreviation: DPhPA), YGAPA, PCAPA, N,9-diphenyl-N-{4-[4-(10-phenyl-9-anthryl)phenyl]phenyl}-9H-carbazol-3-amine (abbreviation: PCAPBA), N-(9,10-diphenyl-2-anthryl)-N,9-diphenyl-9H-carbazol-3-amine (abbreviation: 2PCAPA), 6,12-dimethoxy-5,11-diphenylchrysene, N,N,N',N',N'',N'',N''',N'''-octaphenyldibenzo[g,p]chrysene-2,7,10,15-tetraamine (abbreviation: DBC1), 9-[4-(10-phenyl-9-anthracenyl)phenyl]-9H-carbazole (abbreviation: CzPA), 7-[4-(10-phenyl-9-anthryl)phenyl]-7H-dibenzo[c,g]carbazole (abbreviation: cgDBCzPA), 6-[3-(9,10-diphenyl-2-anthryl)phenyl]-benzo[b]naphtho[1,2-d]furan (abbreviation: 2mBnfPPA), 9-phenyl-10-{4-(9-phenyl-9H-fluoren-9-yl)biphenyl-4'-yl}anthracene (abbreviation: FLPPA), 9,10-bis(3,5-diphenylphenyl)anthracene (abbreviation: DPPA), 9,10-di(2-naphthyl)anthracene (abbreviation: DNA), 2-tert-butyl-9,10-di(2-naphthyl)anthracene (abbreviation: t-BuDNA), 9-(1-naphthyl)-10-(2-naphthyl)anthracene (abbreviation: α,βADN), 2-(10-phenylanthracen-9-yl)dibenzofuran, 2-(10-phenyl-9-anthracenyl)-benzo[b]naphtho[2,3-d]furan (abbreviation: Bnf(II)PhA), 9-(1-naphthyl)-10-[4-(2-naphthyl)phenyl]anthracene (abbreviation: αN-βNPAnth), 9-(2-naphthyl)-10-[3-(2-naphthyl)phenyl]anthracene (abbreviation: βN-mβNPAnth), 1-[4-(10-[1,1'-biphenyl]-4-yl-9-anthracenyl)phenyl]-2-ethyl-1H-benzimidazole (abbreviation: EtBImPBPhA), 9,9'-bianthryl (abbreviation: BANT), 9,9'-(stilbene-3,3'-diyl)diphenanthrene (abbreviation: DPNS), 9,9'-(stilbene-4,4'-diyl)diphenanthrene (abbreviation: DPNS2), 1,3,5-tri(1-pyrenyl)benzene (abbreviation: TPB3), and 5,12-diphenyltetracene, 5,12-bis(biphenyl-2-yl)tetracene.

<<Host Material for Phosphorescence>>

In the case where the light-emitting substance used for the light-emitting layers (113, 113a, 113b, and 113c) is a phosphorescent substance, an organic compound having triplet excitation energy (energy difference between a ground state and a triplet excited state) which is higher than that of the light-emitting substance is preferably selected as the organic compound (the host material) used in combination with the phosphorescent substance. Note that in the case where a plurality of organic compounds (e.g., a first host material and a second host material (or an assist material)) are used in combination with a light-emitting substance in order to form an exciplex, the plurality of organic compounds are preferably mixed with the phosphorescent substance.

Such a structure makes it possible to efficiently obtain light emission utilizing ExTET (Exciplex-Triplet Energy Transfer), which is energy transfer from an exciplex to a light-emitting substance. Note that a combination of the plurality of organic compounds that easily forms an exciplex is preferably employed, and it is particularly preferable to combine a compound that easily accepts holes (a hole-transport material) and a compound that easily accepts electrons (an electron-transport material).

In terms of a preferable combination with the light-emitting substance (phosphorescent substance), examples of the organic compounds (the host material and the assist material), some of which overlap with the above specific examples, include an aromatic amine (an organic compound having an aromatic amine skeleton), a carbazole derivative (an organic compound having a carbazole ring), a dibenzothiophene derivative (an organic compound having a dibenzothiophene ring), a dibenzofuran derivative (an organic compound having a dibenzofuran ring), an oxadiazole derivative (an organic compound having an oxadiazole ring), a triazole derivative (an organic compound having a triazole ring), a benzimidazole derivative (an organic compound having a benzimidazole ring), quinoxaline (an organic compound having a quinoxaline ring), a dibenzoquinoxaline derivative (an organic compound having a dibenzoquinoxaline ring), a pyrimidine derivative (an organic compound having a pyrimidine ring), a triazine derivative (an organic compound having a triazine ring), a pyridine derivative (an organic compound having a pyridine ring), a bipyridine derivative (an organic compound having a bipyridine ring), a phenanthroline derivative (an organic compound having a phenanthroline ring), a furodiazine derivative (an organic compound having a furodiazine ring), and zinc- or aluminum-based metal complexes.

Among the above organic compounds, specific examples of the aromatic amine and the carbazole derivative, which are organic compounds having a high hole-transport property, are the same as the specific examples of the hole-transport materials described above, and those materials are preferable as the host material.

Among the above organic compounds, specific examples of the dibenzothiophene derivative and the dibenzofuran derivative, which are organic compounds having a high hole-transport property, include 4-{3-[3-(9-phenyl-9H-fluoren-9-yl)phenyl]phenyl}dibenzofuran (abbreviation: mmDBFFLBi-II), 4,4',4"-(benzene-1,3,5-triyl)tri(dibenzofuran) (abbreviation: DBF3P-II), DBT3P-II, 2,8-diphenyl-4-[4-(9-phenyl-9H-fluoren-9-yl)phenyl]dibenzothiophene (abbreviation: DBTFLP-III), 4-[4-(9-phenyl-9H-fluoren-9-yl)phenyl]-6-phenyldibenzothiophene (abbreviation: DBTFLP-IV), and 4-[3-(triphenylen-2-yl)phenyl]dibenzothiophene (abbreviation: mDBTPTp-II), and these materials are preferable as the host material.

Other examples of preferable host materials include metal complexes having an oxazole-based or thiazole-based ligand, such as bis[2-(2-benzoxazolyl)phenolato]zinc(II) (abbreviation: ZnPBO) and bis[2-(2-benzothiazolyl)phenolato]zinc(II) (abbreviation: ZnBTZ).

Among the above organic compounds, specific examples of the oxadiazole derivative, the triazole derivative, the benzimidazole derivative, the quinoxaline derivative, the dibenzoquinoxaline derivative, the quinazoline derivative, the phenanthroline derivative, and the like, which are organic compounds having a high electron-transport property, include an organic compound including a heteroaromatic ring having a polyazole ring such as 2-(4-biphenylyl)-5-(4-tert-butylphenyl)-1,3,4-oxadiazole (abbreviation: PBD), 1,3-bis[5-(p-tert-butylphenyl)-1,3,4-oxadiazol-2-yl]benzene (abbreviation: OXD-7), 9-[4-(5-phenyl-1,3,4-oxadiazol-2-yl)phenyl]-9H-carbazole (abbreviation: CO11), 3-(4-biphenylyl)-4-phenyl-5-(4-tert-butylphenyl)-1,2,4-triazole (abbreviation: TAZ), 2,2',2"-(1,3,5-benzenetriyl)tris(1-phenyl-1H-benzimidazole) (abbreviation: TPBI), 2-[3-(dibenzothiophen-4-yl)phenyl]-1-phenyl-1H-benzimidazole (abbreviation: mDBTBIm-II), and 4,4'-bis(5-methylbenzoxazol-2-yl)stilbene (abbreviation: BzOs), an organic compound including a heteroaromatic ring having a pyridine ring such as bathophenanthroline (abbreviation: Bphen), bathocuproine (abbreviation: BCP), 2,9-di(naphthalen-2-yl)-4,7-diphenyl-1,10-phenanthroline (abbreviation: NBphen), and 2,2-(1,3-phenylene)bis[9-phenyl-1,10-phenanthroline] (abbreviation: mPPhen2P), 2-[3-(dibenzothiophen-4-yl)phenyl]dibenzo[f,h]quinoxaline (abbreviation: 2mDBTPDBq-II), 2-[3'-(dibenzothiophen-4-yl)biphenyl-3-yl]dibenzo[f,h]quinoxaline (abbreviation: 2mDBTBPDBq-II), 2-[3'-(9H-carbazol-9-yl)biphenyl-3-yl]dibenzo[f,h]quinoxaline (abbreviation: 2mCzBPDBq), 2-[4-(3,6-diphenyl-9H-carbazol-9-yl)phenyl]dibenzo[f,h]quinoxaline (abbreviation: 2CzPDBq-III), 7-[3-(dibenzothiophen-4-yl)phenyl]dibenzo[f,h]quinoxaline (abbreviation: 7mDBTPDBq-II), 6-[3-(dibenzothiophen-4-yl)phenyl]dibenzo[f,h]quinoxaline (abbreviation: 6mDBTPDBq-II), 2-{4-[9,10-di(2-naphthyl)-2-anthryl]phenyl}-1-phenyl-1H-benzimidazole (abbreviation: ZADN), and 2-[4'-(9-phenyl-9H-carbazol-3-yl)-3,1'-biphenyl-1-yl]dibenzo[f,h]quinoxaline (abbreviation: 2mpPCBPDBq). These materials are preferable as the host material.

Among the above organic compounds, specific examples of the pyridine derivative, the diazine derivative (including the pyrimidine derivative, the pyrazine derivative, and the pyridazine derivative), the triazine derivative, the furodiazine derivative, which are organic compounds having a high electron-transport property, include an organic compound including a heteroaromatic ring having a diazine ring such as 4,6-bis[3-(phenanthren-9-yl)phenyl]pyrimidine (abbreviation: 4,6mPnP2Pm), 4,6-bis[3-(4-dibenzothienyl)phenyl]pyrimidine (abbreviation: 4,6mDBTP2Pm-II), 4,6-bis[3-(9H-carbazol-9-yl)phenyl]pyrimidine (abbreviation: 4,6mCzP2Pm), 2-{4-[3-(N-phenyl-9H-carbazol-3-yl)-9H-carbazol-9-yl]phenyl}-4,6-diphenyl-1,3,5-triazine (abbreviation: PCCzPTzn), 9-[3-(4,6-diphenyl-1,3,5-triazin-2-yl)phenyl]-9'-phenyl-2,3'-bi-9H-carbazole (abbreviation: mPCCzPTzn-02), 3,5-bis[3-(9H-carbazol-9-yl)phenyl]pyridine (abbreviation: 35DCzPPy), 1,3,5-tri[3-(3-pyridyl)phenyl]benzene (abbreviation: TmPyPB), 9,9'-[pyrimidine-4,6-diylbis(biphenyl-3,3'-diyl)]bis(9H-carbazole) (abbreviation: 4,6mCzBP2Pm), 2-[3'-(9,9-dimethyl-9H-fluoren-2-yl)-1,1'-biphenyl-3-yl]-4,6-diphenyl-1,3,5-triazine (abbreviation: mFBPTzn), 8-(1,1'-biphenyl-4-yl)-4-[3-(dibenzothiophen-4-yl)phenyl]-[1]benzofuro[3,2-d]pyrimidine (abbreviation: 8BP-4mDBtPBfpm), 9-[3'-(dibenzothiophen-4-yl)biphenyl-3-yl]naphtho[1',2':4,5]furo[2,3-b]pyrazine (abbreviation: 9mDBtBPNfpr), 9-[(3'-dibenzothiophen-4-yl)biphenyl-4-yl]naphtho[1',2':4,5]furo[2,3-b]pyrazine (abbreviation: 9pmDBtBPNfpr), 5-[3-(4,6-diphenyl-1,3,5-triazin-2-yl)phenyl]-7,7-dimethyl-5H,7H-indeno[2,1-b]carbazole (abbreviation: mINc(II)PTzn), 2-[3'-(triphenylen-2-yl)-1,1'-biphenyl-3-yl]-4,6-diphenyl-1,3,5-triazine (abbreviation: mTpBPTzn), 2-[(1,1'-biphenyl)-4-yl]-4-phenyl-6-[9,9'-spirobi(9H-fluoren)-2-yl]-1,3,5-triazine (abbreviation: BP-SFTzn), 2,6-bis(4-naphthalen-1-ylphenyl)-4-[4-(3- pyridyl)phenyl]pyrimidine (abbreviation: 2,4NP-6PyPPm), 9-[4-(4,6-diphenyl-1,3,5-triazin-2-yl)-2-dibenzothiophenyl]-2-phenyl-9H-carbazole (abbreviation: PCDBfTzn), 2-[1,1'-biphenyl]-3-yl-4-phenyl-6-(8-[1,1':4', 1''-terphenyl]-4-yl-1-dibenzofuranyl)-1,3,5-triazine (abbreviation: mBP-TPDBfTzn), 6-(1,1'-biphenyl-3-yl)-4-[3,5-bis(9H-carbazol-9-yl)phenyl]-2-phenylpyrimidine (abbreviation: 6mBP-4Cz2PPm), and 4-[3,5-bis(9H-carbazol-9-yl)phenyl]-2-phenyl-6-(1,1'-biphenyl-4-yl)pyrimidine (abbreviation: 6BP-4Cz2PPm), and these materials are preferable as the host material.

Among the above organic compounds, specific examples of metal complexes that are organic compounds having a high electron-transport property include zinc- and aluminum-based metal complexes, such as tris(8-quinolinolato) aluminum(III) (abbreviation: Alq), tris(4-methyl-8-quinolinolato)aluminum(III) (abbreviation: Almq$_3$), bis(10-hydroxybenzo[h]quinolinato)beryllium(II) (abbreviation: BeBq$_2$), bis(2-methyl-8-quinolinolato)(4-phenylphenolato) aluminum(III) (abbreviation: BAlq), and bis(8-quinolinolato)zinc(II) (abbreviation: Znq), and metal complexes having a quinoline ring or a benzoquinoline ring, and these materials are preferable as the host material.

Furthermore, high molecular compounds such as poly(2,5-pyridinediyl) (abbreviation: PPy), poly[(9,9-dihexylfluorene-2,7-diyl)-co-(pyridine-3,5-diyl)] (abbreviation: PF-Py), and poly[(9,9-dioctylfluorene-2,7-diyl)-co-(2,2'-bipyridine-6,6'-diyl)] (abbreviation: PF-BPy), and the like are preferable as the host material.

Furthermore, an organic compound having a bipolar property, i.e., both a high hole-transport property and a high electron-transport property, and including a diazine ring such as 9-phenyl-9'-(4-phenyl-2-quinazolinyl)-3,3'-bi-9H-carbazole (abbreviation: PCCzQz), 2-[4'-(9-phenyl-9H-carbazol-3-yl)-3,1'-biphenyl-1-yl]dibenzo[f,h]quinoxaline (abbreviation: 2mpPCBPDBq), 5-[3-(4,6-diphenyl-1,3,5-triazin-2yl)phenyl]-7,7-dimethyl-5H,7H-indeno[2,1-b] carbazole (abbreviation: mINc(II)PTzn), 11-(4-[1,1'-niphenyl]-4-yl-6-phenyl-1,3,5-triazin-2-yl)-11,12-dihydro-12-phenyl-indolo[2,3-a]carbazole (abbreviation: BP-Icz(II) Tzn), or 7-[4-(9-phenyl-9H-carbazol-2-yl)quinazolin-2-yl]-7H-dibenzo[c,g]carbazole (abbreviation: PC-cgDBCzQz) can be used as the host material.

<Electron-Transport Layer>

The electron-transport layers (114, 114a, and 114b) transport the electrons, which are injected from the second electrode 102 and the charge-generation layers (106, 106a, and 106b) by the electron-injection layers (115, 115a, and 115b) described later, to the light-emitting layers (113, 113a, and 113b). It is preferable that the electron-transport materials used in the electron-transport layers (114, 114a, and 114b) be substances with an electron mobility higher than or equal to $1\times10^{-6}$ cm$^2$/Vs in the case where the square root of the electric field strength [V/cm] is 600. Note that other substances can also be used as long as they have an electron-transport property higher than a hole-transport property. Each of the electron-transport layers (114, 114a, and 114b) functions even in the form of a single layer but may have a stacked-layer structure of two or more layers. Note that since the above-described mixed material has heat resistance, performing a photolithography step over the electron-transport layer including such a material can inhibit the influence of a thermal process on the device characteristics.

<<Electron-Transport Material>>

As the electron-transport material that can be used for the electron-transport layers (114, 114a, and 114b), an organic compound with a high electron-transport property can be used; for example, a heteroaromatic compound can be used. The heteroaromatic compound refers to a cyclic compound containing at least two different kinds of elements in a ring. Examples of cyclic structures include a three-membered ring, a four-membered ring, a five-membered ring, a six-membered ring, and the like, among which a five-membered ring and a six-membered ring are particularly preferable; the elements contained in the heteroaromatic compound are preferably one or more of nitrogen, oxygen, sulfur, and the like, as well as carbon. In particular, a heteroaromatic compound containing nitrogen (a nitrogen-containing heteroaromatic compound) is preferable, and any of materials having a high electron-transport property (electron-transport materials), such as a nitrogen-containing heteroaromatic compound and a π-electron deficient heteroaromatic compound including the nitrogen-containing heteroaromatic compound, is preferably used.

The heteroaromatic compound is an organic compound including at least one heteroaromatic ring.

Note that the heteroaromatic ring includes any one of a pyridine ring, a diazine ring, a triazine ring, a polyazole ring, an oxazole ring, a thiazole ring, and the like. A heteroaromatic ring having a diazine ring includes a heteroaromatic ring having a pyrimidine ring, a pyrazine ring, a pyridazine ring, or the like. A heteroaromatic ring having a polyazole ring includes a heteroaromatic ring having an imidazole ring, a triazole ring, or an oxadiazole ring.

The heteroaromatic ring includes a fused heteroaromatic ring having a fused ring structure. Examples of the fused heteroaromatic ring include a quinoline ring, a benzoquinoline ring, a quinoxaline ring, a dibenzoquinoxaline ring, a quinazoline ring, a benzoquinazoline ring, a dibenzoquinazoline ring, a phenanthroline ring, a furodiazine ring, and a benzimidazole ring.

Examples of a heteroaromatic compound including carbon and one or more of nitrogen, oxygen, sulfur, and the like and having a five-membered ring structure include a heteroaromatic compound having an imidazole ring, a heteroaromatic compound having a triazole ring, a heteroaromatic compound having an oxazole ring, a heteroaromatic compound having an oxadiazole ring, a heteroaromatic compound having a thiazole ring, and a heteroaromatic compound having a benzimidazole ring.

Examples of a heteroaromatic compound including carbon and one or more of nitrogen, oxygen, sulfur, and the like and having a six-membered ring structure include a heteroaromatic compound having a heteroaromatic ring such as a pyridine ring, a diazine ring (a pyrimidine ring, a pyrazine ring, a pyridazine ring, or the like), a triazine ring, or a polyazole ring. Other examples include a heteroaromatic compound having a bipyridine structure and a heteroaromatic compound having a terpyridine structure, although they are included in examples of a heteroaromatic compound in which pyridine rings are connected.

Examples of the heteroaromatic compound having a fused ring structure including the above six-membered ring structure as a part include a heteroaromatic compound having a fused heteroaromatic ring such as a quinoline ring, a benzoquinoline ring, a quinoxaline ring, a dibenzoquinoxaline ring, a phenanthroline ring, a furodiazine ring (including a structure in which an aromatic ring is fused to the furan ring of a furodiazine ring), or a benzimidazole ring.

Specific examples of the above-described heteroaromatic compound having a five-membered ring structure (e.g., a polyazole ring (including an imidazole ring, a triazole ring, and an oxadiazole ring), an oxazole ring, a thiazole ring, or a benzimidazole ring) include 2-(4-biphenylyl)-5-(4-tert-butylphenyl)-1,3,4-oxadiazole (abbreviation: PBD), 1,3-bis [5-(p-tert-butylphenyl)-1,3,4-oxadiazol-2-yl]benzene (abbreviation: OXD-7), 9-[4-(5-phenyl-1,3,4-2-yl)phenyl]-9H-carbazole (abbreviation: CO11), 3-(4-biphenylyl)-4-phenyl-5-(4-tert-butylphenyl)-1,2,4-triazole (abbreviation: TAZ), 3-(4-tert-butylphenyl)-4-(4-ethylphenyl)-5-(4-biphenylyl)-1,2,4-triazole (abbreviation: p-EtTAZ), 2,2',2"-(1,3,5-benzenetriyl)tris(1-phenyl-1H-benzimidazole) (abbreviation: TPBI), 2-[3-(dibenzothiophen-4-yl)phenyl]-1-phenyl-1H-benzimidazole (abbreviation: mDBTBIm-II), and 4,4'-bis(5-methylbenzoxazol-2-yl)stilbene (abbreviation: BzOs).

Specific examples of the above-described heteroaromatic compound having a six-membered ring structure (including a heteroaromatic ring having a pyridine ring, a diazine ring, a triazine ring, or the like) include a heteroaromatic compound including a heteroaromatic ring having a pyridine ring, such as 3,5-bis[3-(9H-carbazol-9-yl)phenyl]pyridine (abbreviation: 35DCzPPy) or 1,3,5-tri[3-(3-pyridyl)phenyl] benzene (abbreviation: TmPyPB), a heteroaromatic compound including a heteroaromatic ring having a triazine ring, such as 2-{4-[3-(N-phenyl-9H-carbazol-3-yl)-9H-carbazol-9-yl]phenyl}-4,6-diphenyl-1,3,5-triazine (abbreviation: PCCzPTzn), 9-[3-(4,6-diphenyl-1,3,5-triazin-2-yl)phenyl]-9'-phenyl-2,3'-bi-9H-carbazole (abbreviation: mPCCzPTzn-02), 5-[3-(4,6-diphenyl-1,3,5-triazin-2-yl)phenyl]-7,7-dimethyl-5H,7H-indeno[2,1-b]carbazole (abbreviation: mINc(II)PTzn), 2-[3'-(triphenylen-2-yl)-1,1'-biphenyl-3-yl]-4,6-diphenyl-1,3,5-triazine (abbreviation: mTpBPTzn), 2-[(1,1'-biphenyl)-4-yl]-4-phenyl-6-[9,9'-spirobi(9H-fluoren)-2-yl]-1,3,5-triazine (abbreviation: BP-SFTzn), 2,6-bis(4-naphthalen-1-ylphenyl)-4-[4-(3-pyridyl)phenyl]pyrimidine (abbreviation: 2,4NP-6PyPPm), 9-[4-(4,6-diphenyl-1,3,5-triazin-2-yl)-2-dibenzothiophenyl]-2-phenyl-9H-carbazole (abbreviation: PCDBfTzn), 2-[1,1'-biphenyl]-3-yl-4-phenyl-6-(8-[1,1':4',1"-terphenyl]-4-yl-1-dibenzofuranyl)-1,3,5-triazine (abbreviation: mBP-TPDBfTzn), 2-{3-[3-(dibenzothiophen-4-yl)phenyl]phenyl}-4,6-diphenyl-1,3,5-triazine (abbreviation: mDBtBPTzn), or mFBPTzn, and a heteroaromatic compound including a heteroaromatic ring having a diazine (pyrimidine) ring, such as 4,6-bis[3-(phenanthren-9-yl)phenyl]pyrimidine (abbreviation: 4,6mPnP2Pm), 4,6-bis[3-(4-dibenzothienyl)phenyl]pyrimidine (abbreviation: 4,6mDBTP2Pm-II), 4,6-bis[3-(9H-carbazol-9-yl)phenyl]pyrimidine (abbreviation: 4,6mCzP2Pm), 4,6mCzBP2Pm, 6-(1,1'-biphenyl-3-yl)-4-[3,5-bis(9H-carbazol-9-yl)phenyl)-2-phenylpyrimidine (abbreviation: 6mBP-4Cz2PPm), 4-[3,5-bis(9H-carbazol-9-yl)phenyl]-2-phenyl-6-(1,1'-biphenyl-4-yl)pyrimidine (abbreviation: 6BP-4Cz2PPm), 4-[3-(dibenzothiophen-4-yl)phenyl]-8-(naphthalen-2-yl)-[1]benzofuro[3,2-d]pyrimidine (abbreviation: 8βN-4mDBtPBfpm), 8BP-4mDBtPBfpm, 9mDBtBPNfpr, 9pmDBtBPNfpr, 3,8-bis[3-(dibenzothiophen-4-yl)phenyl]benzofuro[2,3-b]pyrazine (abbreviation: 3,8mDBtP2Bfpr), 4,8-bis[3-(dibenzothiophen-4-yl)phenyl]-[1]benzofuro[3,2-d]pyrimidine (abbreviation: 4,8mDBtP2Bfpm), 8-[3'-(dibenzothiophen-4-yl)(1,1'-biphenyl-3-yl)]naphtho[1',2': 4,5]furo[3,2-d]pyrimidine (abbreviation: 8mDBtBPNfpm), or 8-[(2,2'-binaphthalen)-6-yl]-4-[3-(dibenzothiophen-4-yl)phenyl]-[1]benzofuro[3,2-d]pyrimidine (abbreviation: 8(μN2)-4mDBtPBfpm). Note that the above aromatic compounds including a heteroaromatic ring include a heteroaromatic compound having a fused heteroaromatic ring.

Other examples include a heteroaromatic compound including a heteroaromatic ring having a diazine (pyrimidine) ring, such as 2,2'-(pyridine-2,6-diyl)bis(4-phenylbenzo[h]quinazoline) (abbreviation: 2,6(P-Bqn)2Py), 2,2'-(2,2'-bipyridine-6,6'-diyl)bis(4-phenylbenzo[h]quinazoline) (abbreviation: 6,6'(P-Bqn)2BPy), 2,2'-(pyridine-2,6-diyl)bis {4-[4-(2-naphthyl)phenyl]-6-phenylpyrimidine} (abbreviation: 2,6(NP-PPm)2Py, or 6-(1,1'-biphenyl-3-yl)-4-[3,5-bis(9H-carbazol-9-yl)phenyl]-2-phenylpyrimidine (abbreviation: 6mBP-4Cz2PPm), and a heteroaromatic compound including a heteroaromatic ring having a triazine ring, such as 2,4,6-tris(3'-(pyridin-3-yl)biphenyl-3-yl)-1,3,5-triazine (abbreviation: TmPPPyTz), 2,4,6-tris(2-pyridyl)-1,3,5-triazine (abbreviation: 2Py3Tz), or 2-[3-(2,6-dimethyl-3-pyridyl)-5-(9-phenanthryl)phenyl]-4,6-diphenyl-1,3,5-triazine (abbreviation: mPn-mDMePyPTzn).

Specific examples of the above-described heteroaromatic compound having a fused ring structure including the above six-membered ring structure as a part (a heteroaromatic compound having a fused ring structure) include a heteroaromatic compound having a quinoxaline ring, such as bathophenanthroline (abbreviation: Bphen), bathocuproine (abbreviation: BCP), 2,9-di(naphthalen-2-yl)-4,7-diphenyl-1,10-phenanthroline (abbreviation: NBphen), 2,2-(1,3-phenylene)bis[9-phenyl-1,10-phenanthroline] (abbreviation: mPPhen2P), 2,2'-(pyridine-2,6-diyl)bis(4-phenylbenzo[h] quinazoline) (abbreviation: 2,6(P-Bqn)2Py), 2-[3-(dibenzothiophen-4-yl)phenyl]dibenzo[f,h]quinoxaline (abbreviation: 2mDBTPDBq-II), 2-[3'-(dibenzothiophen-4-yl) biphenyl-3-yl]dibenzo[f,h]quinoxaline (abbreviation: 2mDBTBPDBq-II), 2-[3'-(9H-carbazol-9-yl)biphenyl-3-yl] dibenzo[f,h]quinoxaline (abbreviation: 2mCzBPDBq), 2-[4-(3,6-diphenyl-9H-carbazol-9-yl)phenyl]dibenzo[f,h]quinoxaline (abbreviation: 2CzPDBq-III), 7-[3-(dibenzothiophen-4-yl)phenyl]dibenzo[f,h]quinoxaline (abbreviation: 7mDBTPDBq-II), 6-[3-(dibenzothiophen-4-yl)phenyl]dibenzo[f,h]quinoxaline (abbreviation: 6mDBTPDBq-II), or 2mpPCBPDBq.

For the electron-transport layers (114, 114a, and 114b), any of the metal complexes given below as well as the heteroaromatic compounds given above can be used. Examples of the metal complexes include a metal complex having a quinoline ring or a benzoquinoline ring, such as tris(8-quinolinolato)aluminum(III) (abbreviation: Alq$_3$), Almq$_3$, 8-quinolinolatolithium(I) (abbreviation: Liq), BeBq$_2$, bis(2-methyl-8-quinolinolato)(4-phenylphenolato) aluminum(III) (abbreviation: BAlq), or bis(8-quinolinolato) zinc(II) (abbreviation: Znq), and a metal complex having an oxazole ring or a thiazole ring, such as bis[2-(2-benzoxazolyl)phenolato]zinc(II) (abbreviation: ZnPBO) or bis[2-(2-benzothiazolyl)phenolato]zinc(II) (abbreviation: ZnBTZ). Furthermore, a high molecular compound such as poly(2,5-pyridinediyl) (abbreviation: PPy), poly[(9,9-dihexylfluorene-2,7-diyl)-co-(pyridine-3,5-diyl)] (abbreviation: PF-Py), or poly[(9,9-dioctylfluorene-2,7-diyl)-co-(2,2'-bipyridine-6,6'-diyl)] (abbreviation: PF-BPy) can be used as the electron-transport material.

Each of the electron-transport layers (114, 114a, or 114b) is not limited to a single layer, and may be a stack of two or more layers each made of any of the above substances.

<Electron-Injection Layer>

The electron-injection layers (115, 115a, and 115b) are each a layer containing a substance having a high electron-injection property. The electron-injection layers (115, 115a, and 115b) are each a layer for increasing the efficiency of electron injection from the second electrode 102 and is preferably formed using a material whose LUMO level value has a small difference (0.5 eV or less) from the work function value of the material used for the second electrode 102. Thus, the electron-injection layer 115 can be formed using an alkali metal, an alkaline earth metal, or a compound thereof, such as lithium, cesium, lithium fluoride (LiF), cesium fluoride (CsF), calcium fluoride (CaF$_2$), 8-(quinolinolato)lithium (abbreviation: Liq), 2-(2-pyridyl)phenolatolithium (abbreviation: LiPP), 2-(2-pyridyl)-3-pyridinolatolithium (abbreviation: LiPPy), 4-phenyl-2-(2-pyridyl)phenolatolithium (abbreviation: LiPPP), lithium oxide (LiO$_x$), or cesium carbonate. A rare earth metal compound like erbium fluoride (ErF$_3$) or ytterbium (Yb) can also be used. Note that to form the electron-injection layers (115, 115a, and 115b), a plurality of kinds of the above-described materials may be mixed or a plurality of kinds of the above-described materials may be stacked. Electride may also be used for the electron-injection layers (115, 115a, and 115b). Examples of the electride include a substance in which electrons are added at high concentration to a mixed oxide of calcium and aluminum. Note that any of the substances used in the electron-transport layers (114, 114a, and 114b), which are given above, can also be used.

A mixed material in which an organic compound and an electron donor (donor) are mixed may also be used in the electron-injection layers (115, 115a, and 115b). Such a mixed material is excellent in an electron-injection property and an electron-transport property because electrons are generated in the organic compound by the electron donor. In this case, the organic compound is preferably a material excellent in transporting the generated electrons; specifically, for example, the above-mentioned electron-transport materials (metal complexes, heteroaromatic compounds, or the like) used in the electron-transport layers (114, 114a, and 114b) can be used. As the electron donor, a substance showing an electron-donating property with respect to the organic compound may be used. Specifically, an alkali metal, an alkaline earth metal, and a rare earth metal are preferable, and lithium, cesium, magnesium, calcium, erbium, ytterbium, and the like are given as examples. In addition, an alkali metal oxide and an alkaline earth metal oxide are preferable, and lithium oxide, calcium oxide, barium oxide, and the like are given as examples. A Lewis base such as magnesium oxide can be used. Furthermore, an organic compound such as tetrathiafulvalene (abbreviation: TTF) can be used. Alternatively, a stack of these materials may be used.

Moreover, a mixed material in which an organic compound and a metal are mixed may also be used in the electron-injection layers (115, 115a, and 115b). The organic compound used here preferably has a LUMO level higher than or equal to −3.6 eV and lower than or equal to −2.3 eV. Moreover, a material having an unshared electron pair is preferable.

Thus, as the organic compound used in the above mixed material, a mixed material obtained by mixing a metal and the heteroaromatic compound given above as the material that can be used for the electron-transport layer may be used. Preferable examples of the heteroaromatic compound include materials having an unshared electron pair, such as a heteroaromatic compound having a five-membered ring structure (e.g., an imidazole ring, a triazole ring, an oxazole ring, an oxadiazole ring, a thiazole ring, or a benzimidazole ring), a heteroaromatic compound having a six-membered ring structure (e.g., a pyridine ring, a diazine ring (including a pyrimidine ring, a pyrazine ring, a pyridazine ring, and the like), a triazine ring, a bipyridine ring, or a terpyridine ring), and a heteroaromatic compound having a fused ring structure including a six-membered ring structure as a part (e.g., a quinoline ring, a benzoquinoline ring, a quinoxaline ring, a dibenzoquinoxaline ring, or a phenanthroline ring). Since the materials are specifically described above, description thereof is omitted here.

As the metal used for the above mixed material, a transition metal that belongs to Group 5, Group 7, Group 9, or Group 11 in the periodic table or a material that belongs to Group 13 is preferably used, and Ag, Cu, Al, In, and the like can be given as examples. In this case, the organic compound forms a singly occupied molecular orbital (SOMO) with the transition metal.

Note that in the case where light obtained from the light-emitting layer 113b is amplified, for example, formation is preferably performed such that the optical path length between the second electrode 102 and the light-emitting layer 113b is less than one fourth of the wavelength A of light emitted from the light-emitting layer 113b. In that case, the optical path length can be adjusted by changing the thickness of the electron-transport layer 114b or the electron-injection layer 115b.

When the charge-generation layer 106 is provided between two EL layers (103a and 103b) as in the light-emitting device illustrated in FIG. 5D, a structure in which a plurality of EL layers are stacked between the pair of electrodes (also referred to as a tandem structure) can be employed.

The charge-generation layer 106 has a function of injecting electrons into the EL layer 103a and injecting holes into the EL layer 103b when a voltage is applied between the first electrode (anode) 101 and the second electrode (cathode) 102. The charge-generation layer 106 may have either a structure in which an electron acceptor (acceptor) is added to a hole-transport material or a structure in which an electron donor (donor) is added to an electron-transport material. Alternatively, both of these structures may be stacked. Note that forming the charge-generation layer 106 with the use of any of the above materials can inhibit an increase in drive voltage in the case where the EL layers are stacked.

In the case where the charge-generation layer 106 has a structure in which an electron acceptor is added to a hole-transport material that is an organic compound, any of the materials described in this embodiment can be used as the hole-transport material. As examples of the electron acceptor, 7,7,8,8-tetracyano-2,3,5,6-tetrafluoroquinodimethane (abbreviation: F4-TCNQ), chloranil, and the like can be given. Other examples include oxides of metals belonging to Group 4 to Group 8 of the periodic table. Specific examples include vanadium oxide, niobium oxide, tantalum oxide, chromium oxide, molybdenum oxide, tungsten oxide, manganese oxide, and rhenium oxide.

In the case where the charge-generation layer 106 has a structure in which an electron donor is added to an electron-transport material, any of the materials described in this embodiment can be used as the electron-transport material. As the electron donor, it is possible to use an alkali metal, an alkaline earth metal, a rare earth metal, a metal belonging to Group 2 or Group 13 of the periodic table, or an oxide or a carbonate thereof. Specifically, lithium (Li), cesium (Cs), magnesium (Mg), calcium (Ca), ytterbium (Yb), indium (In), lithium oxide, cesium carbonate, or the like is preferably used. An organic compound such as tetrathianaphthacene may be used as the electron donor.

Although FIG. 5D illustrates the structure in which two of the EL layers 103 are stacked, three or more EL layers may be stacked with a charge-generation layer provided between different EL layers.

<Substrate>

The light-emitting device described in this embodiment can be formed over any of a variety of substrates. Note that the type of the substrate is not limited to a certain type. Examples of the substrate include semiconductor substrates (e.g., a single crystal substrate and a silicon substrate), an SOI substrate, a glass substrate, a quartz substrate, a plastic substrate, a metal substrate, a stainless steel substrate, a substrate including stainless steel foil, a tungsten substrate, a substrate including tungsten foil, a flexible substrate, an attachment film, or paper or a base material containing a fibrous material.

Note that examples of the glass substrate include barium borosilicate glass, aluminoborosilicate glass, and soda lime glass. Examples of the flexible substrate, the attachment film, and the base material film include plastics typified by polyethylene terephthalate (PET), polyethylene naphthalate (PEN), and polyether sulfone (PES); a synthetic resin such as acrylic; polypropylene; polyester; polyvinyl fluoride; polyvinyl chloride; polyamide; polyimide; aramid; an epoxy resin; an inorganic vapor deposition film; and paper.

For fabrication of the light-emitting device described in this embodiment, a vapor phase method such as an evaporation method or a liquid phase method such as a spin coating method or an ink-jet method can be used. In the case of using an evaporation method, a physical vapor deposition method (PVD method) such as a sputtering method, an ion plating method, an ion beam evaporation method, a molecular beam evaporation method, or a vacuum evaporation method, a chemical vapor deposition method (CVD method), or the like can be used. Specifically, layers having a variety of functions (the hole-injection layer 111, the hole-transport layer 112, the light-emitting layer 113, the electron-transport layer 114, and the electron-injection layer 115) included in the EL layer of the light-emitting device can be formed by an evaporation method (e.g., a vacuum evaporation method), a coating method (e.g., a dip coating method, a die coating method, a bar coating method, a spin coating method, or a spray coating method), a printing method (e.g., an ink-jet method, screen printing (stencil), offset printing (planography), flexography (relief printing), gravure printing, or micro-contact printing), or the like.

In the case where a film formation method such as the coating method or the printing method is employed, a high molecular compound (e.g., an oligomer, a dendrimer, or a polymer), a middle molecular compound (a compound between a low molecular compound and a high molecular compound, with a molecular weight greater than or equal to 400 and less than or equal to 4000), an inorganic compound (e.g., a quantum dot material), or the like can be used. Note that as the quantum dot material, a colloidal quantum dot material, an alloyed quantum dot material, a core-shell quantum dot material, a core quantum dot material, or the like can be used.

Materials that can be used for the layers (the hole-injection layer 111, the hole-transport layer 112, the light-emitting layer 113, the electron-transport layer 114, and the electron-injection layer 115) included in the EL layer 103 of the light-emitting device described in this embodiment are not limited to the materials described in this embodiment, and other materials can be used in combination as long as the functions of the layers are fulfilled.

Note that in this specification and the like, the term "layer" and the term "film" can be interchanged with each other as appropriate.

The structures described in this embodiment can be used in an appropriate combination with any of the structures described in the other embodiments.

Embodiment 3

Figure 6A:
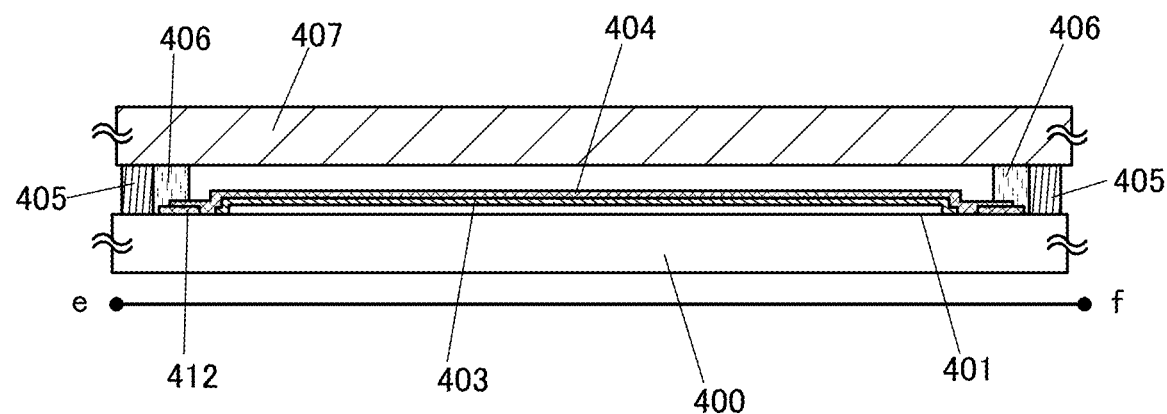
FIG. 6A and FIG. 6B are diagrams illustrating an electronic appliance according to an embodiment.
Figure 6B:
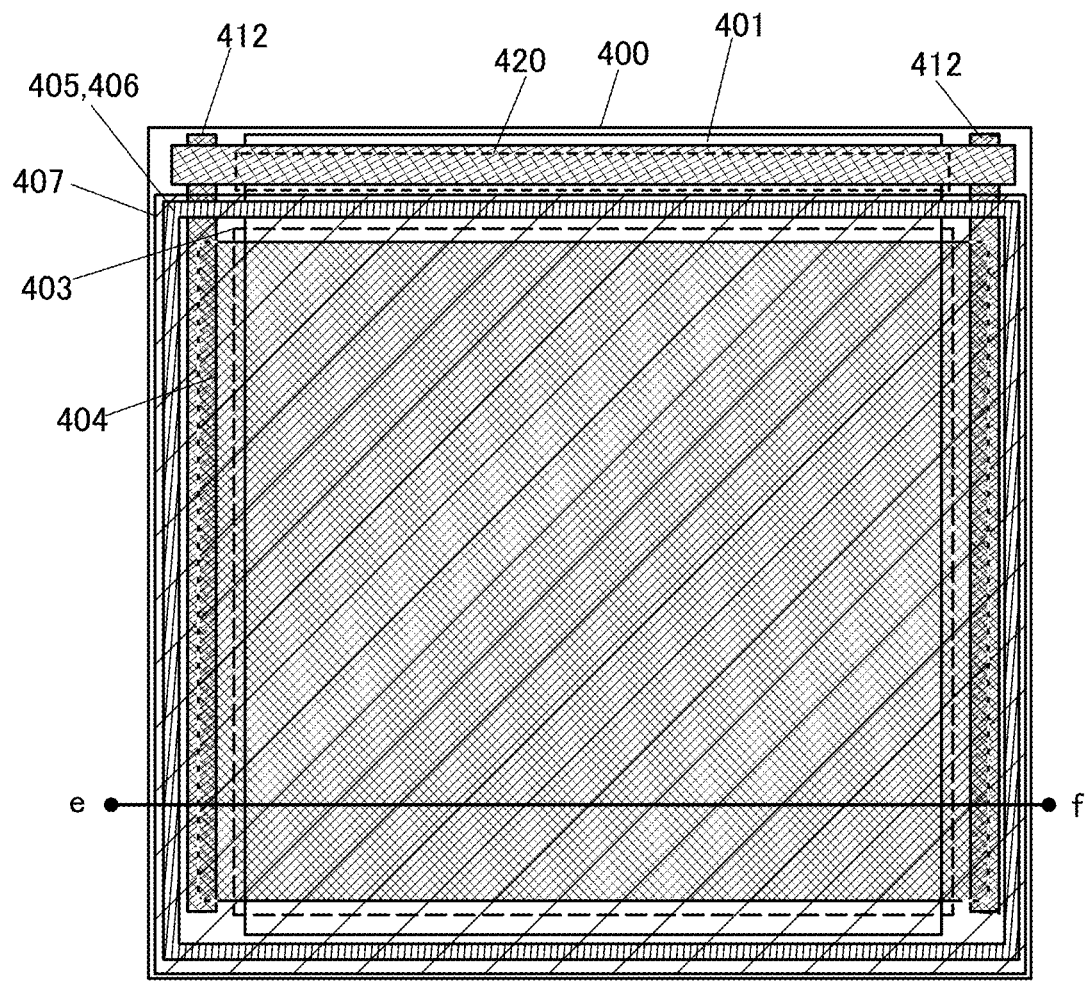

In this embodiment, a structure of a light-emitting apparatus in a lighting device of one embodiment of the present invention will be described with reference to FIG. 6. FIG. 6A is a cross-sectional view taken along Line e-f in FIG. 6B which is a top view of a lighting device.

In the light-emitting apparatus in this embodiment, a first electrode 401 is formed over a substrate 400 which is a support and has a light-transmitting property. The first electrode 401 corresponds to the first electrode 101 in Embodiment 2. In the case where light emission is extracted from the first electrode 401 side, the first electrode 401 is formed with a material having a light-transmitting property.

A pad 412 for supplying a voltage to a second electrode 404 is formed over the substrate 400.

An EL layer 403 is formed over the first electrode 401. The structure of the EL layer 403 corresponds to the structure of the EL layer 103 in Embodiment 2. Note that for these structures, the corresponding description can be referred to.

The second electrode 404 is formed to cover the EL layer 403. The second electrode 404 corresponds to the second electrode 102 in Embodiment 2. In the case where light-emission is extracted from the first electrode 401 side, the second electrode 404 is formed with a material having high reflectivity. The second electrode 404 is supplied with a voltage when connected to the pad 412.

As described above, the light-emitting apparatus described in this embodiment includes a light-emitting device including the first electrode 401, the EL layer 403, and the second electrode 404. Since the light-emitting device is a light-emitting device with high emission efficiency, the lighting device in this embodiment can be a lighting device with low power consumption.

The substrate 400 over which the light-emitting device having the above structure is formed is fixed to a sealing substrate 407 with sealants 405 and 406 and sealing is performed, whereby the lighting device is completed. It is possible to use only either the sealant 405 or 406. In addition, the inner sealant 406 (not illustrated in FIG. 6B) can be mixed with a desiccant, which enables moisture to be adsorbed, resulting in improved reliability.

When parts of the pad 412 and the first electrode 401 are provided to extend to the outside of the sealants 405 and 406, those can serve as external input terminals. An IC chip 420 mounted with a converter or the like may be provided over the external input terminals.

Embodiment 4

Figure 7:
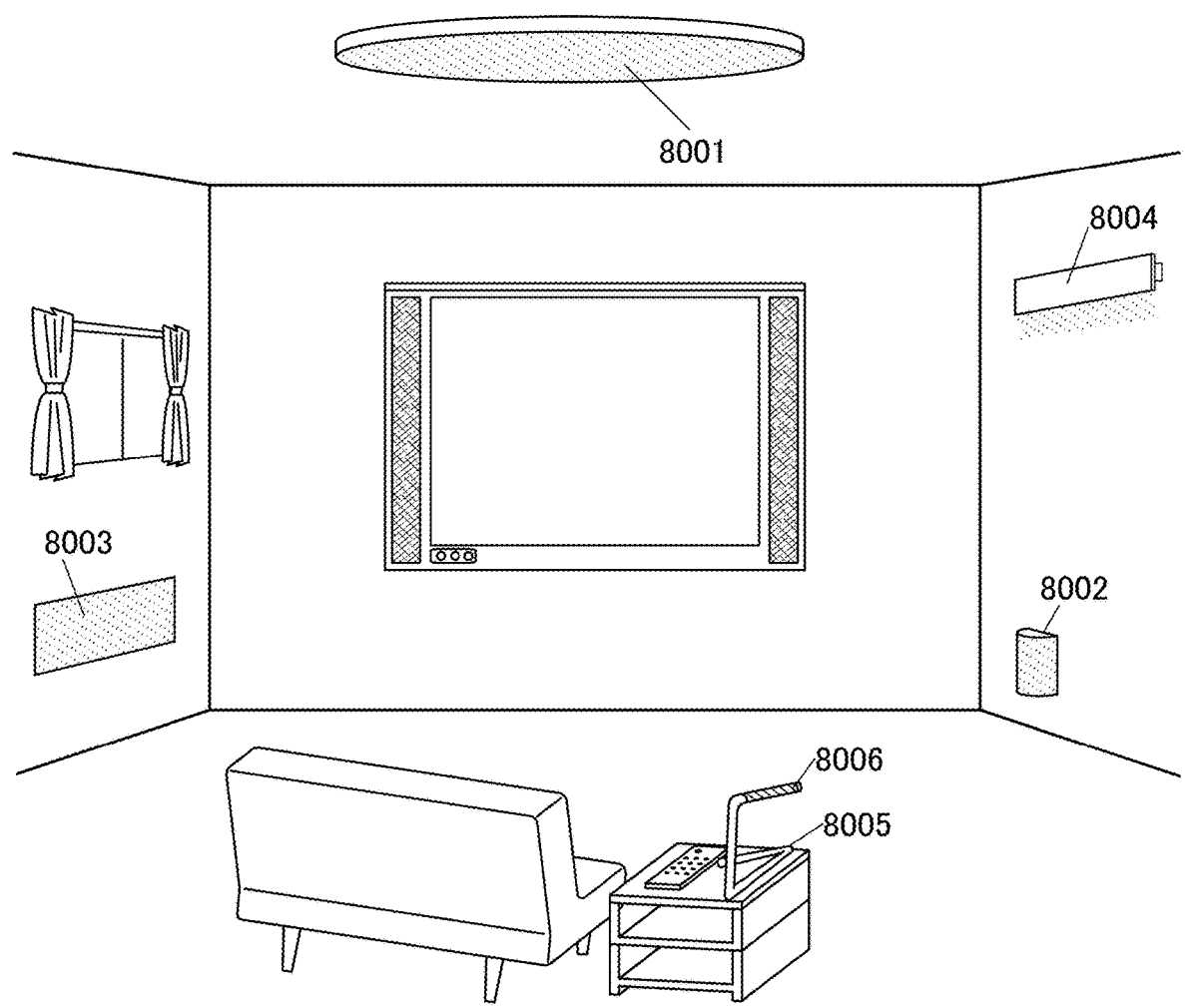
FIG. 7 is a diagram illustrating electronic appliances according to an embodiment.

In this embodiment, an application example of a light-emitting apparatus or a lighting device of one embodiment of the present invention will be described with reference to FIG. 7.

A ceiling light 8001 can be used as an indoor lighting device. Examples of the ceiling light 8001 include a direct-mount light, an embedded light, and the like. Such a lighting device is fabricated using the light-emitting apparatus and a shade, a housing, or a cover in combination. Other than that, application to a cord pendant light (light that is suspended from a ceiling by a cord) is also possible.

A foot light 8002 lights a floor so that safety on the floor can be improved. It can be effectively used in a bedroom, on a staircase, or in a passage, for example. In that case, the size and shape of the foot light can be changed in accordance with the area or structure of a room. The foot light can also be a stationary lighting device fabricated using the light-emitting apparatus and a support base in combination.

A sheet-like lighting 8003 is a thin sheet-like lighting device. The sheet-like lighting, which is attached to a wall when used, is space-saving and thus can be used for a wide variety of uses. The area of the sheet-like lighting can be easily increased. The sheet-like lighting can also be used on a wall that has a curved surface.

In addition, a lighting device 8004 in which the direction of light from a light source is controlled to be only a desired direction can be used.

A desk lamp 8005 includes a light source 8006. As the light source 8006, the light-emitting apparatus of one embodiment of the present invention or the light-emitting device, which is part of the light-emitting apparatus, can be used.

In addition to the above examples, when the light-emitting apparatus of one embodiment of the present invention or the light-emitting device which is a part thereof is used as part of furniture in a room, a lighting device that functions as the furniture can be obtained.

As described above, a variety of lighting devices that include the light-emitting apparatus or the lighting device of one embodiment of the present invention can be obtained. Note that these lighting devices are also embodiments of the present invention.

The structures described in this embodiment can be used in an appropriate combination with any of the structures described in the other embodiments.

Example 1

This example shows examination results of the operation characteristics of the actually fabricated light-emitting apparatus of one embodiment of the present invention described in Embodiment 1.

Figure 8:
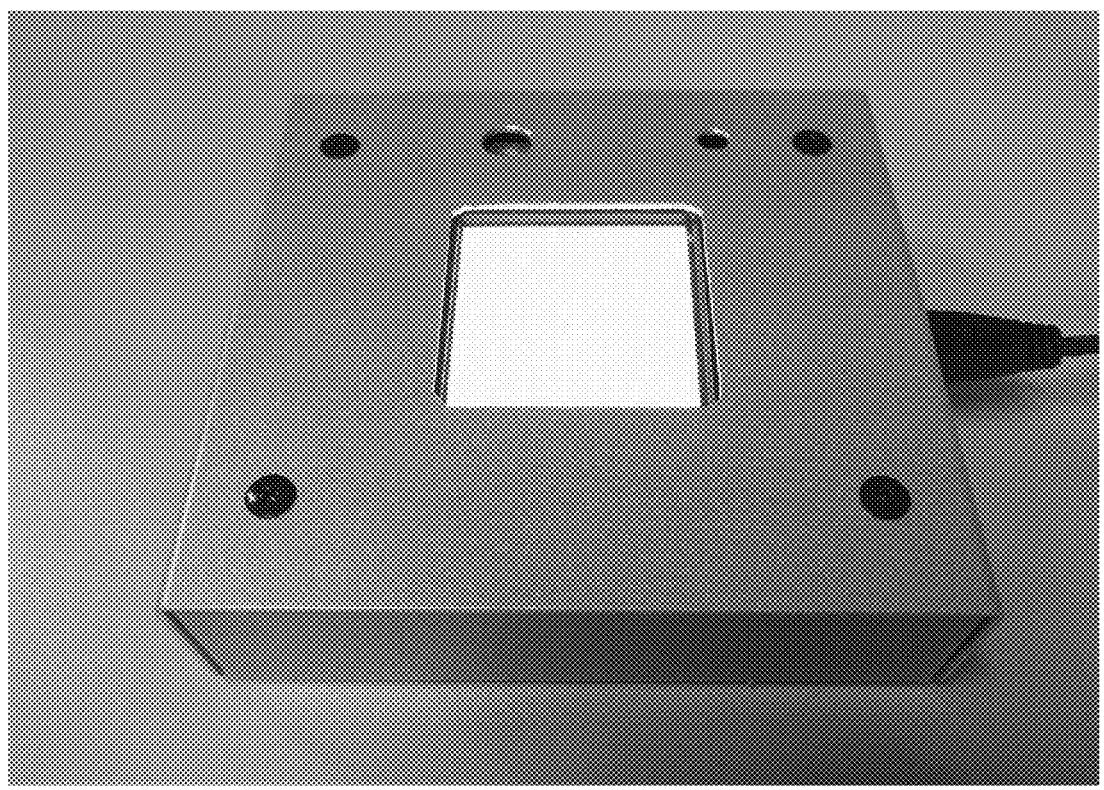
FIG. 8 is a photograph of the appearance of a light-emitting apparatus 1.
Figure 9:
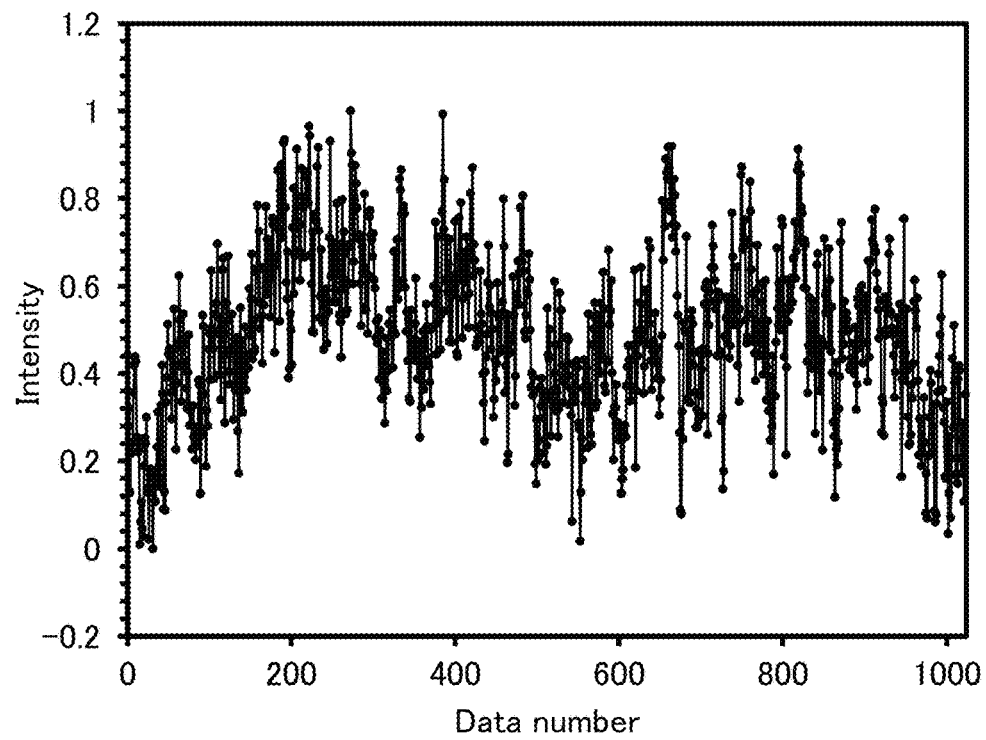
FIG. 9 is a graph of basic data having 1/f fluctuation characteristics in the light-emitting apparatus 1.
Figure 10:
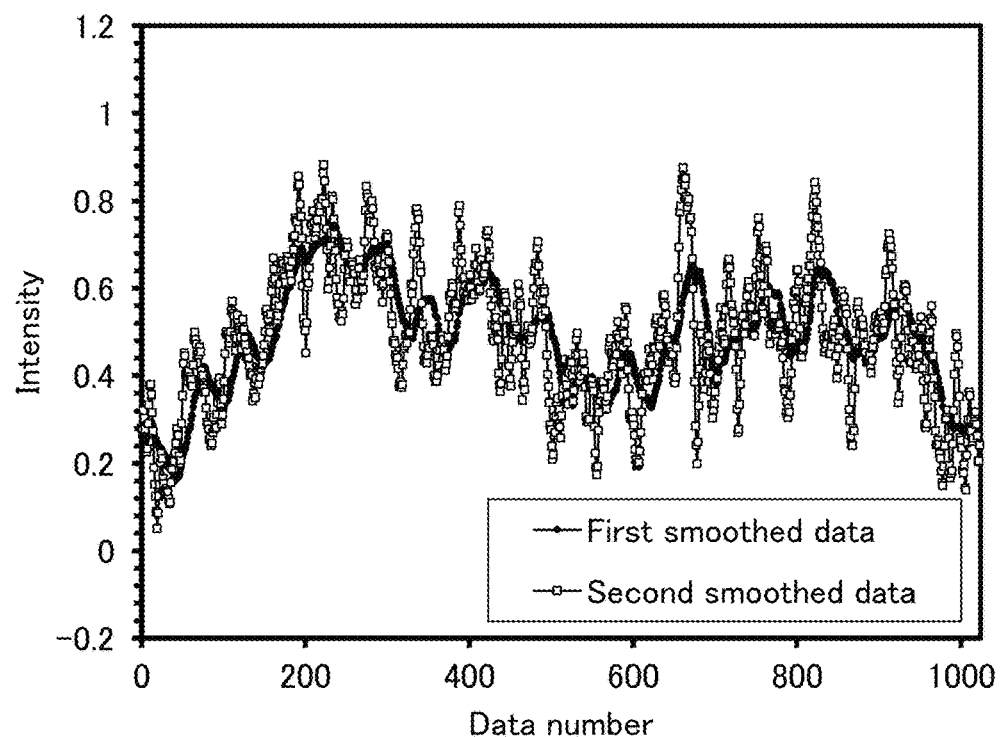
FIG. 10 is a graph of first smoothed data and second smoothed data in the light-emitting apparatus 1.
Figure 11:
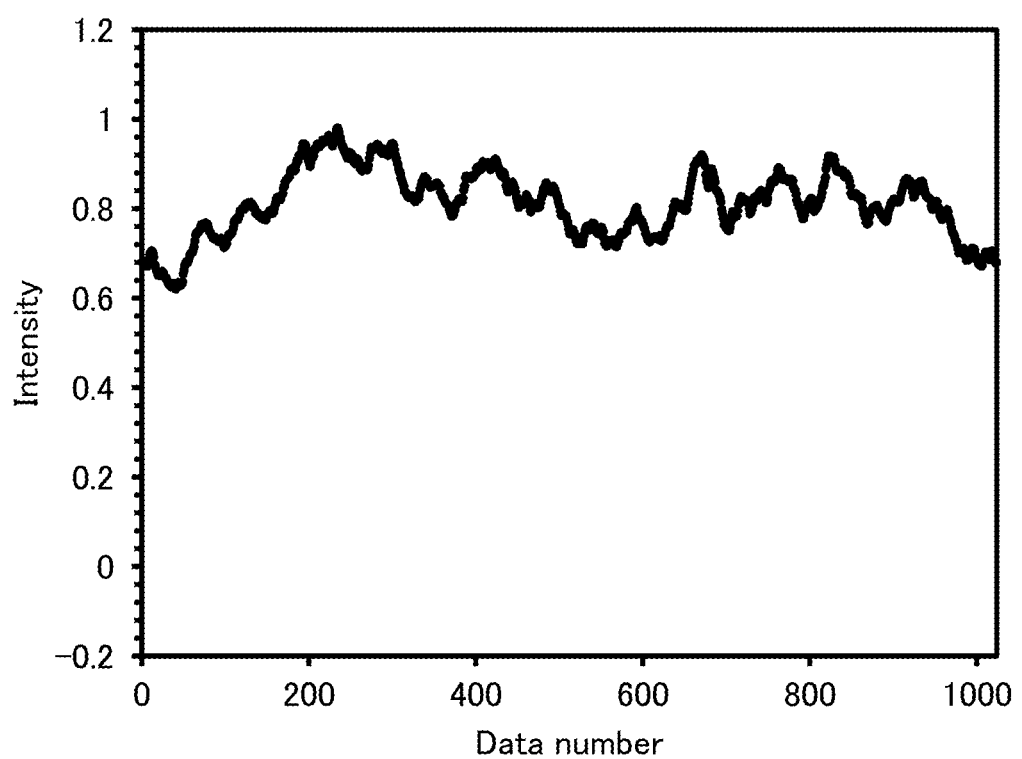
FIG. 11 is a graph of light adjustment data in the light-emitting apparatus 1.

FIG. 8 is a photograph showing the appearance of a light-emitting apparatus 1 that was actually fabricated. FIG. 9 is a graph showing the basic data f having 1/f fluctuation characteristics in the light-emitting apparatus 1. FIG. 10 is a graph showing the first smoothed data X and the second smoothed data x in the light-emitting apparatus 1. FIG. 11 is a graph showing the light adjustment data y in the light-emitting apparatus 1. In each of FIG. 9 to FIG. 11, the vertical axis represents the intensity of each data and the horizontal axis represents data number.

As shown in FIG. 8, the light-emitting apparatus 1 includes a light-emitting device and a housing. As the light-emitting device, an organic EL element having a light-emitting portion area of 1142.75 mm$^2$ (35 mm×32.65 mm) was used. Note that the structure of the light-emitting device used in this example will be described in Example 2.

A light adjustment method of the light-emitting apparatus 1 will be described with reference to FIG. 9 to FIG. 11.

First, the basic data f having 1/f fluctuation characteristics were created with use of a spreadsheet software (FIG. 9).

Next, the first smoothed data X and the second smoothed data x shown in FIG. 10 were generated by performing moving average processing (simple moving average) with different periods on the basic data f having 1/f fluctuation characteristics shown in FIG. 9. The moving average processing period $d_1$ that generates the first smoothed data X was 30, and the moving average period $d_2$ that generates the second smoothed data x was 5.

FIG. 10 reveals that by making $d_1$ larger than $d_2$, a waveform of the first smoothed data was smoother than a waveform of the second smoothed data.

Next, the light adjustment data y shown in FIG. 11 was generated by subjecting the first smoothed data X and the second smoothed data x shown in FIG. 10 to arithmetic processing. The arithmetic processing was performed in accordance with the formula below.

$$y_i = \left[\left(\frac{X_i - X_{min}}{X_{max} - X_{min}}\right) \times (UL - LL) + LL\right] \times (1 - A) + \left(\frac{x_i - x_{min}}{x_{max} - x_{min}}\right) \times A \quad \text{[Formula 8]}$$

Note that in the above formula, $y_i$ represents the i-th data of the light adjustment data y (greater than or equal to 0 and less than or equal to 1), $X_i$ represents the i-th data of the first smoothed data X, and $x_i$ represents the i-th data of the second smoothed data x. $X_{max}$ represents the maximum value of X, $X_{min}$ represents the minimum value of X, UL represents a predetermined upper limit of an X component, and LL represents a predetermined lower limit of the X component. Furthermore, $x_{max}$ represents the maximum value of x and $x_{min}$ represents the minimum value of x. In addition, A represents a predetermined contribution rate. In this example, arithmetic processing was performed with UL as 0.9, LL as 0.6, and A as 0.1.

FIG. 11 reveals that by performing arithmetic processing in accordance with the above formula, the first smoothed data X and the second smoothed data x were combined, whereby new light adjustment data y having 1/f fluctuation characteristics and also having sufficient smoothness was able to be generated.

In the light-emitting apparatus 1, a PWM control method (100 Hz) was employed and luminance of a light-emitting device 1 was changed in time series in accordance with the light adjustment data generated in this manner.

Example 2

This example will describe element structures and characteristics of the light-emitting device 1 to a light-emitting device 3, which are organic EL elements that can be used in the light-emitting apparatus described in Example 1. The table below shows specific components of the light-emitting device 1 to the light-emitting device 3. Chemical formulae of materials used in this example are shown below. Although the light-emitting device 1 to the light-emitting device 3 shown in this example each have a light-emitting portion area of 4 mm$^2$ (2 mm×2 mm), a light-emitting device having a light-emitting portion area of 1142.75 mm$^2$ (35 mm×32.65 mm) can be fabricated in a similar manner.

TABLE 1

| | Film thickness | Light-emitting device 1 | Light-emitting device 2 | Light-emitting device 3 |
|---|---|---|---|---|
| Second electrode | 200 nm | | Al | |
| Electron-injection layer | 1 nm | | Liq | |
| Electron-transport layer | 25 nm | | mPn-mDMePyPTzn:Liq (1:1) | |
| | 10 nm | | mFBPTzn | |
| Light-emitting layer | 50 nm | 2mDBTBPDBq-II:PCBBiF:Ir(pqn)$_2$(dppm) (0.8:0.2:0.15) | 2mDBTBPDBq-II:PCBBiF:Ir(pqn)$_2$(dppm) (0.8:0.2:0.2) | 2mDBTBPDBq-II:PCBBiF:Ir(5mdppm)$_2$(dibm) (0.8:0.2:0.1) |
| Hole-transport layer | 85 nm | | PCBFF | |
| | 140 nm | | PCBBiF | |
| Hole-injection layer | 10 nm | | PCBBiF:OCHD-003 (1:0.03) | |
| First electrode | 70 nm | | ITSO | |

[Chemical Formulae 3]

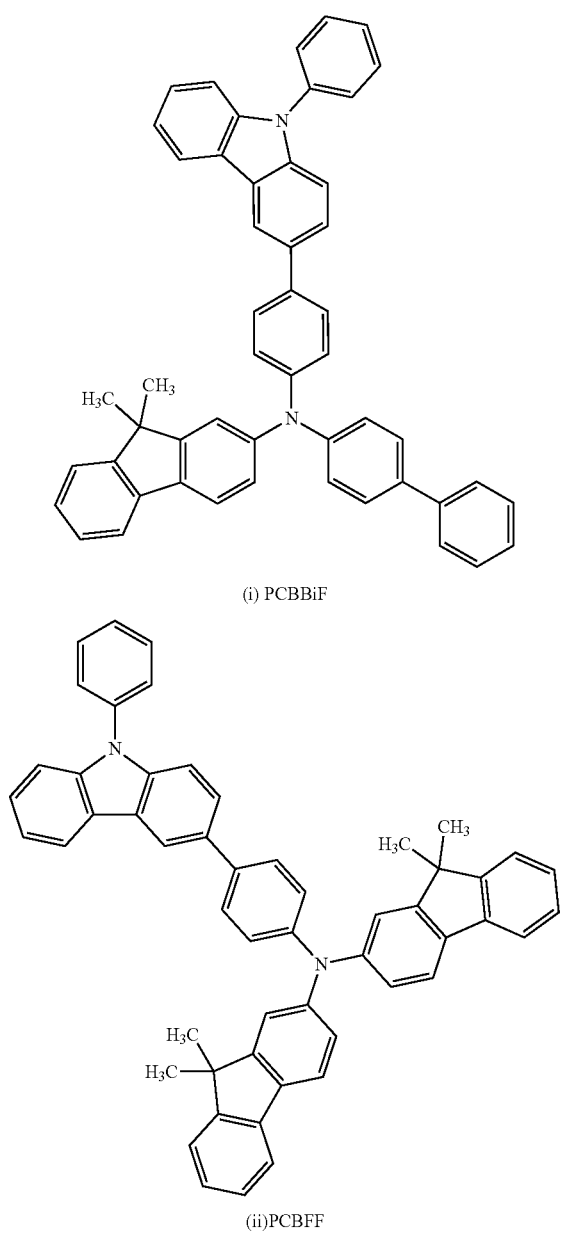

(i) PCBBiF (ii) PCBFF

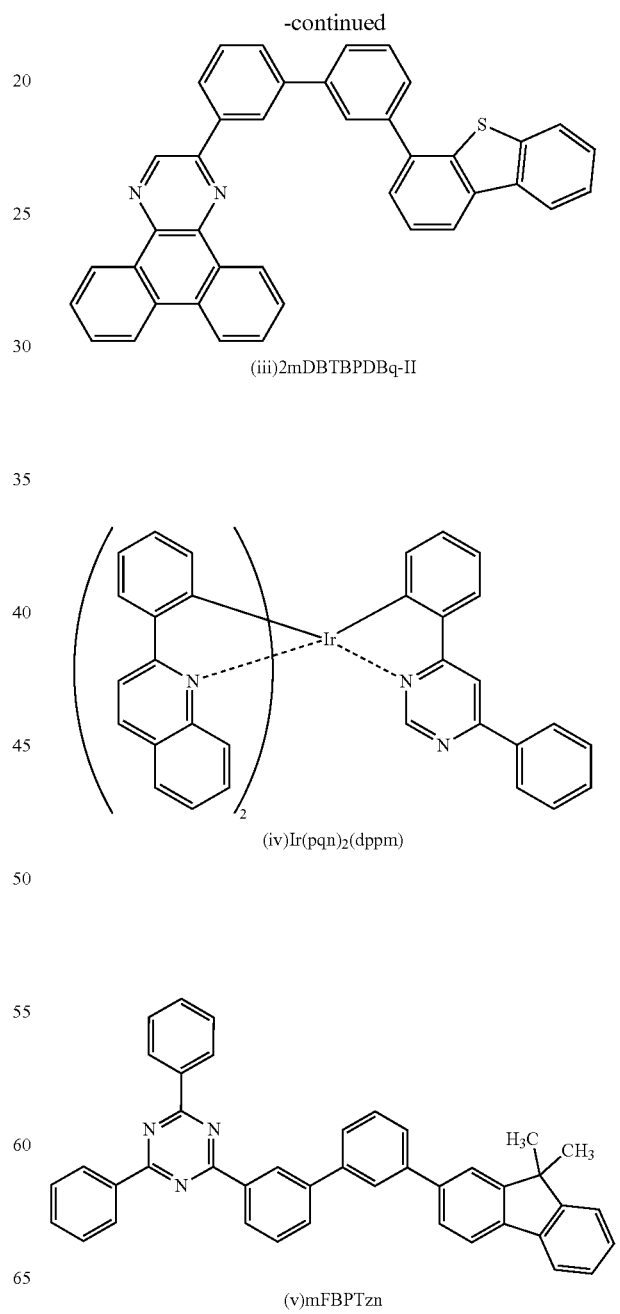

(iii) 2mDBTBPDBq-II (iv) Ir(pqn)$_2$(dppm)

(v) mFBPTzn

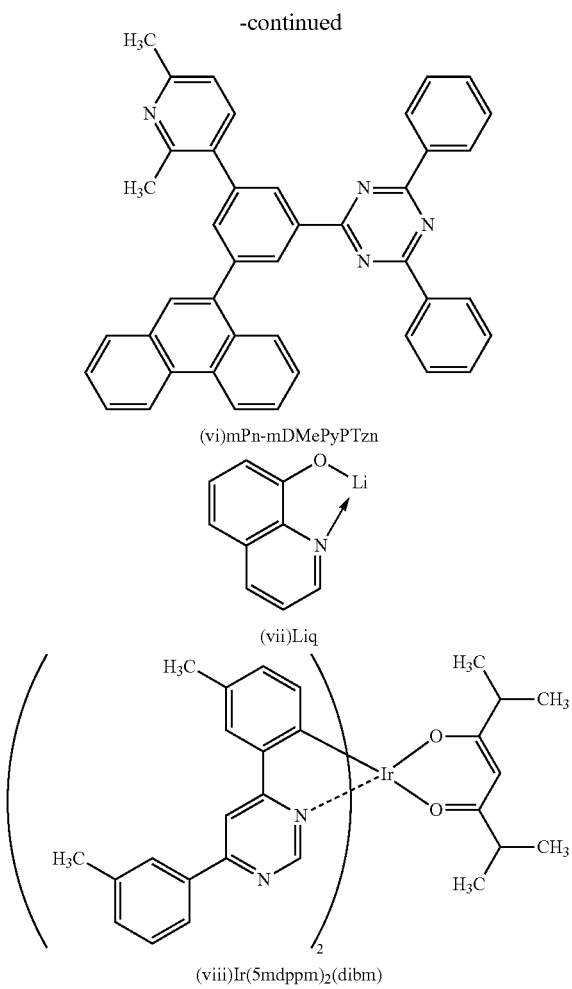

(vi)mPn-mDMePyPTzn (vii)Liq (viii)Ir(5mdppm)₂(dibm)

Fabrication of Light-Emitting Device 1

Figure 12:
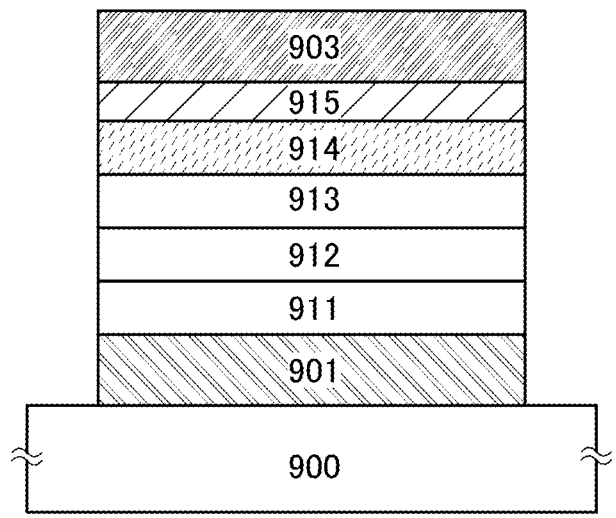
FIG. 12 is a diagram illustrating a structure of a light-emitting device according to an example.

The light-emitting device 1 described in this example has a structure, as illustrated in FIG. 12, in which a hole-injection layer 911, a hole-transport layer 912, a light-emitting layer 913, an electron-transport layer 914, and an electron-injection layer 915 are stacked in this order over a first electrode 901 formed over a substrate 900, and a second electrode 903 is stacked over the electron-injection layer 915.

First, the first electrode 901 was formed over the substrate 900. The electrode area was set to 4 mm² (2 mm×2 mm). A glass substrate was used as the substrate 900. The first electrode 901 was formed by deposition of indium tin oxide containing silicon oxide (ITSO) by a sputtering method to a film thickness of 70 nm.

As pretreatment, a surface of the substrate was washed with water, baking was performed at 200° C. for one hour, and then UV ozone treatment was performed for 370 seconds. After that, the substrate was transferred into a vacuum evaporation apparatus where the inside pressure had been reduced to approximately $10^{-4}$ Pa, and was subjected to vacuum baking at 170° C. for 60 minutes in a heating chamber of the vacuum evaporation apparatus, and then the substrate was cooled down for approximately 30 minutes.

Next, the hole-injection layer 911 was formed over the first electrode 901. After the pressure in the vacuum evaporation apparatus was reduced to $10^{-4}$ Pa, and the hole-injection layer 911 was formed by co-evaporation of N-(1,1'-biphenyl-4-yl)-N-[4-(9-phenyl-9H-carbazol-3-yl)phenyl]-9,9-dimethyl-9H-fluoren-2-amine (abbreviation: PCBBiF) represented by Structural Formula (i) above and an electron acceptor material (OCHD-003) containing fluorine and having a molecular weight of 672, to 10 nm, such that the weight ratio was 1:0.03 (=PCBBiF: OCHD-003).

Then, the hole-transport layer 912 was formed over the hole-injection layer 911. The hole-transport layer 912 was formed by evaporating PCBBiF to a film thickness of 140 nm, and then evaporating N-[4-(9-phenyl-9H-carbazol-3-yl)phenyl]-bis(9,9-dimethyl-9H-fluoren-2-yl)amine (abbreviation: PCBFF) represented by Structural Formula (ii) above to a film thickness of 85 nm.

Next, the light-emitting layer 913 was formed over the hole-transport layer 912. The light-emitting layer 913 was formed by co-evaporating 2-[3-(3'-dibenzothiophen-4-yl)biphenyl]dibenzo[f,h]quinoxaline (abbreviation: 2mDBTBPDBq-II) represented by Structural Formula (iii) above, PCBBiF, and bis[2-(2-quinolinyl-κN)phenyl-κC][2-(6-phenyl-4-pyrimidinyl-κN³)phenyl-κC]iridium(III) (abbreviation: Ir(pqn)₂(dppm)) such that 2mDBTBPDBq-II: PCBBiF: Ir(pqn)₂(dppm) was 0.8:0.2:0.15 and the film thickness was 50 nm.

Next, the electron-transport layer 914 was formed over the light-emitting layer 913. The electron-transport layer 914 was formed by evaporating 2-[3'-(9,9-dimethyl-9H-fluoren-2-yl)-1,1'-biphenyl-3-yl]-4,6-diphenyl-1,3,5-triazine (abbreviation: mFBPTzn) represented by Structural Formula (v) above to a film thickness of 10 nm, and then co-evaporating 2-[3-(2,6-dimethyl-3-pyridinyl)-5-(9-phenanthrenyl)phenyl]-4,6-diphenyl-1,3,5-triazine (abbreviation: mPn-mDMePyPTzn) represented by Structural Formula (vi) above and 8-quinolinato-lithium (abbreviation: Liq) represented by Structural Formula (vii) above such that mPn-mDMePyPTzn:Liq=1:1 and the film thickness was 25 nm.

Then, the electron-injection layer 915 was formed over the electron-transport layer 914. The electron-injection layer 915 was formed by evaporation of Liq to a film thickness of 1 nm.

Next, the second electrode 903 was formed over the electron-injection layer 915. The second electrode 903 was formed using aluminum by an evaporation method such that the film thickness was 200 nm. In this example, the second electrode 903 functions as a cathode.

Through the above steps, the light-emitting device 1 in which an EL layer was provided between the pair of electrodes over the substrate 900 was formed. The hole-injection layer 911, the hole-transport layer 912, the light-emitting layer 913, the electron-transport layer 914, and the electron-injection layer 915 described in the above steps are functional layers forming the EL layer in one embodiment of the present invention. Furthermore, in all the evaporation steps in the above fabrication method, an evaporation method by a resistance-heating method was used.

The fabricated light-emitting device 1 was sealed in a glove box containing a nitrogen atmosphere so as not to be exposed to the air (a sealant was applied to surround the element, and at the time of sealing, UV treatment was performed and then heat treatment was performed at 80° C. for one hour).

Fabrication of Light-Emitting Device 2

A light-emitting device 2 is a light-emitting device different from the light-emitting device 1 in the mixture ratio of materials in the light-emitting layer 913. That is, the light-emitting device 2 was fabricated in a manner similar to that of the light-emitting device 1 except that as the light-emitting layer 913, 2mDBTBPDBq-II, PCBBiF, and Ir(pqn)$_2$(dppm) were co-evaporated such that 2mDBTBPDBq-II: PCBBiF: Ir(pqn)$_2$(dppm)=0.8:0.2:0.2.

Fabrication of Light-Emitting Device 3

The light-emitting device 2 is a light-emitting device different from the light-emitting device 1 in light-emitting materials that were used in the light-emitting layer 913 and the mixture ratio of materials. That is, the light-emitting device 3 was fabricated in a manner similar to that of the light-emitting device 1 except that as the light-emitting layer 913, instead of co-evaporating 2mDBTBPDBq-II, PCBBiF, and Ir(pqn)$_2$(dppm), 2mDBTBPDBq-II, PCBBiF, and (di-isobutyrylmethano)bis(4,6-(di-5-methylphenylpyrimidinato)iridium(III) (abbreviation: Ir(5mdppm)$_2$(dibm)) were co-evaporated such 2mDBTBPDBq-II: PCBBiF: that Ir(5mdppm)$_2$(dibm)=0.8:0.2:0.1.

Operation Characteristics of Light-Emitting Device 1 to Light-Emitting Device 3

Figure 13:
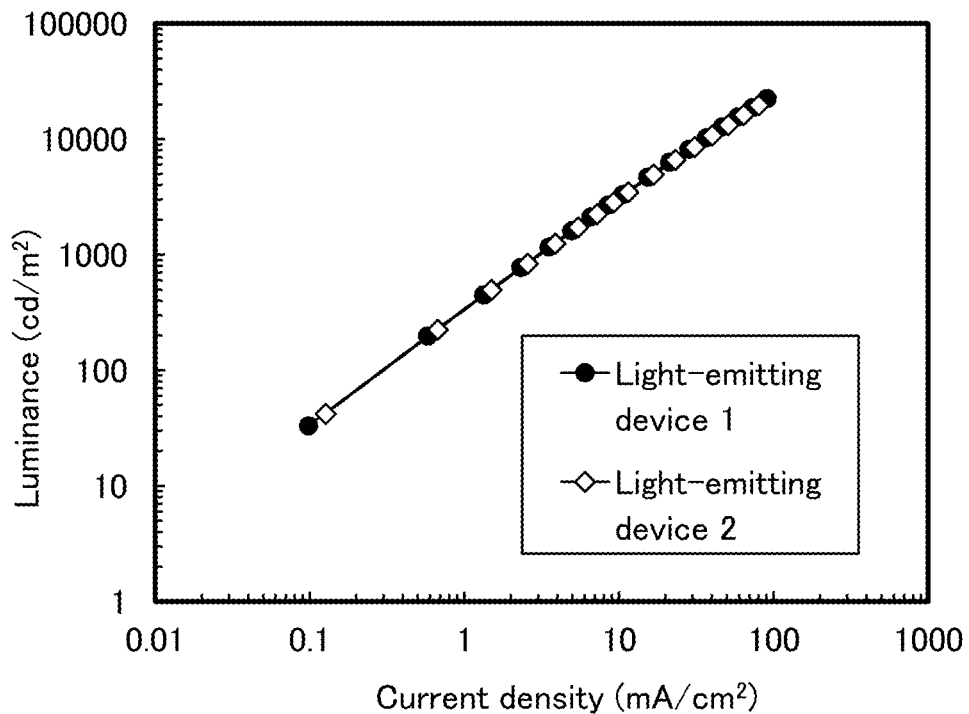
FIG. 13 is a diagram showing luminance-current density characteristics of a light-emitting device 1 and a light-emitting device 2.
Figure 14:
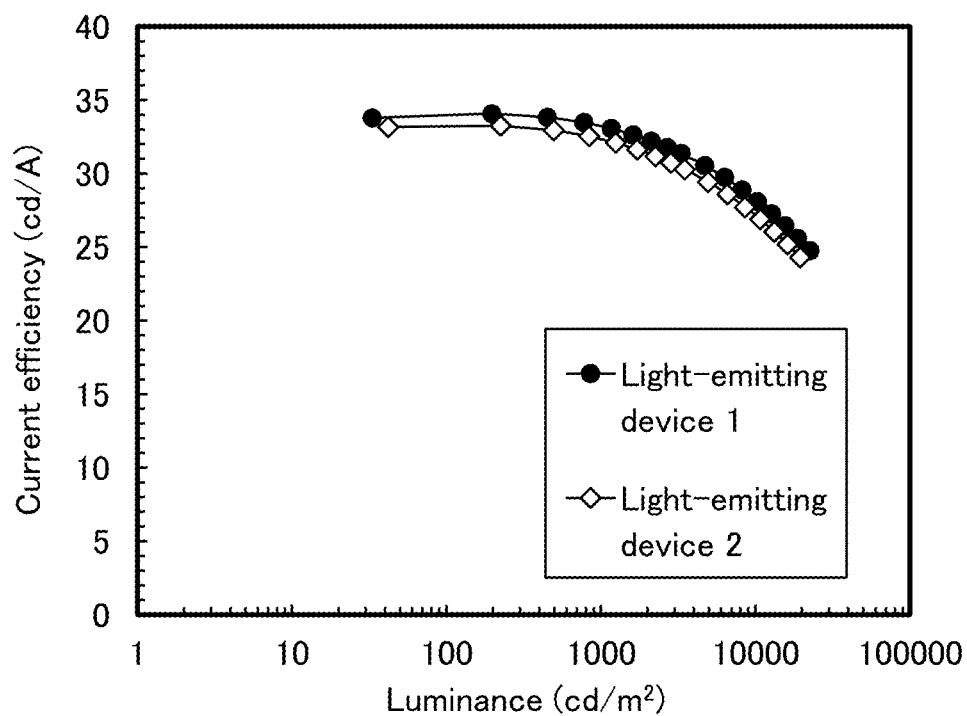
FIG. 14 is a diagram showing current efficiency-luminance characteristics of the light-emitting device 1 and the light-emitting device 2.
Figure 15:
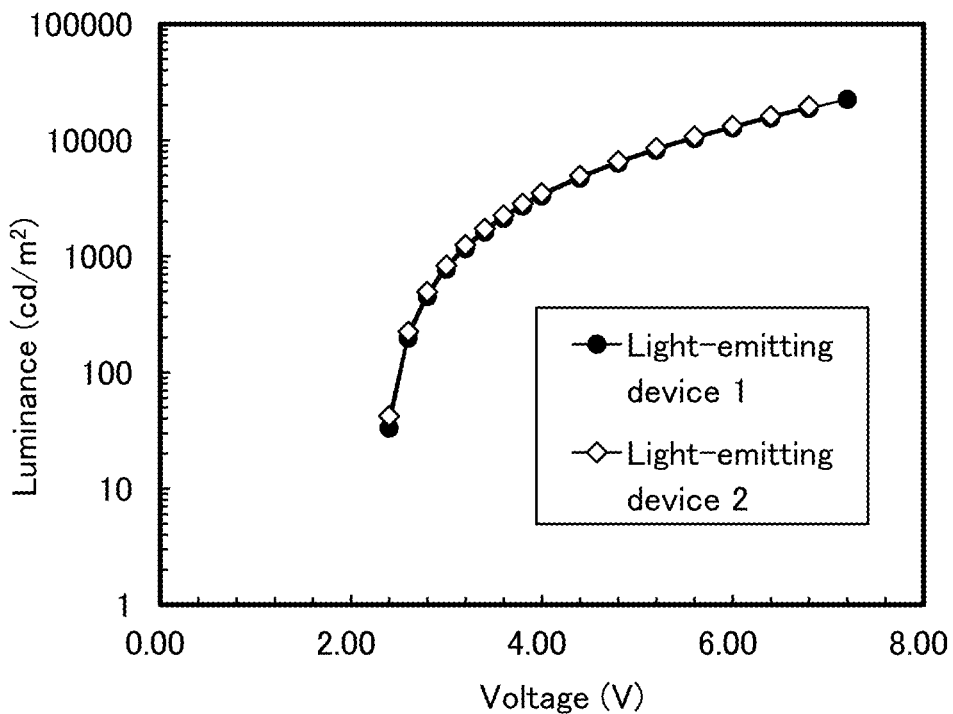
FIG. 15 is a diagram showing luminance-voltage characteristics of the light-emitting device 1 and the light-emitting device 2.
Figure 16:
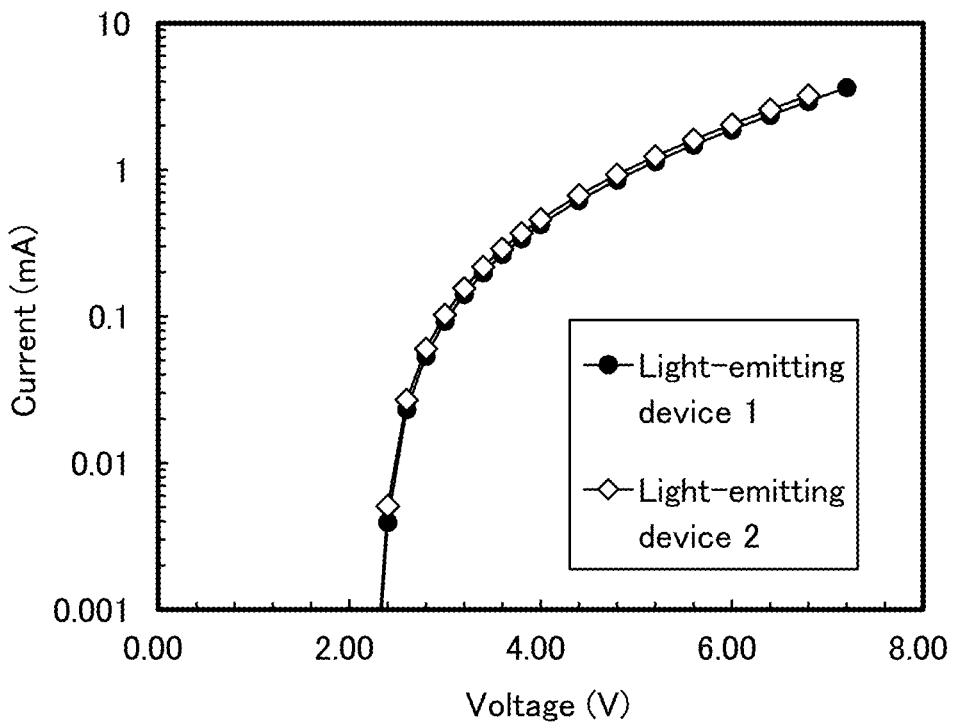
FIG. 16 is a diagram showing current-voltage characteristics of the light-emitting device 1 and the light-emitting device 2.
Figure 17:
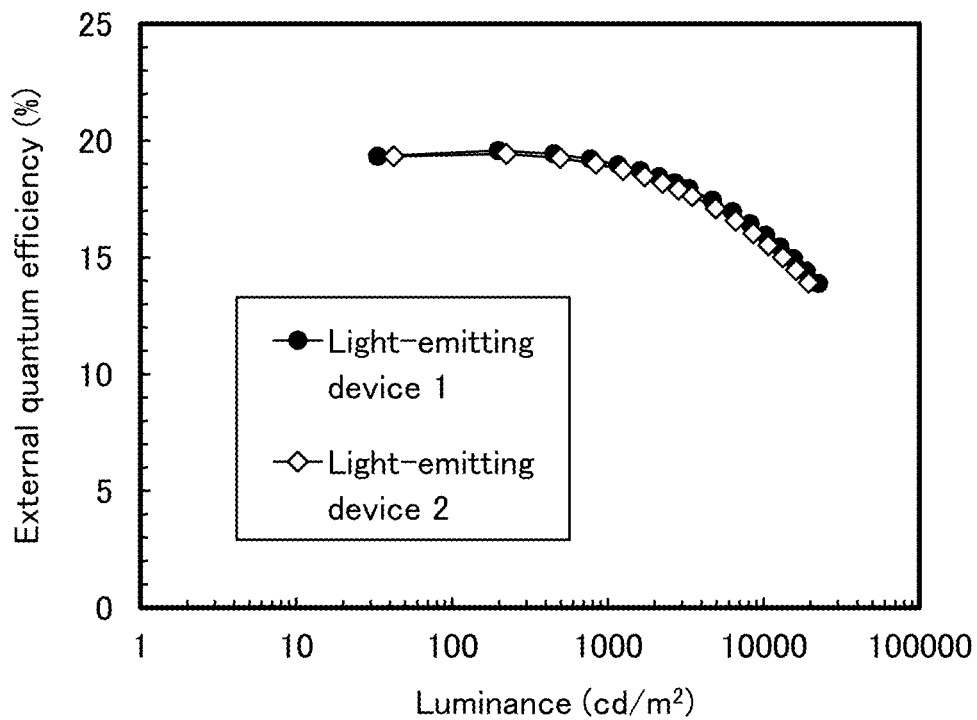
FIG. 17 is a diagram showing external quantum efficiency-luminance characteristics of the light-emitting device 1 and the light-emitting device 2.
Figure 18:
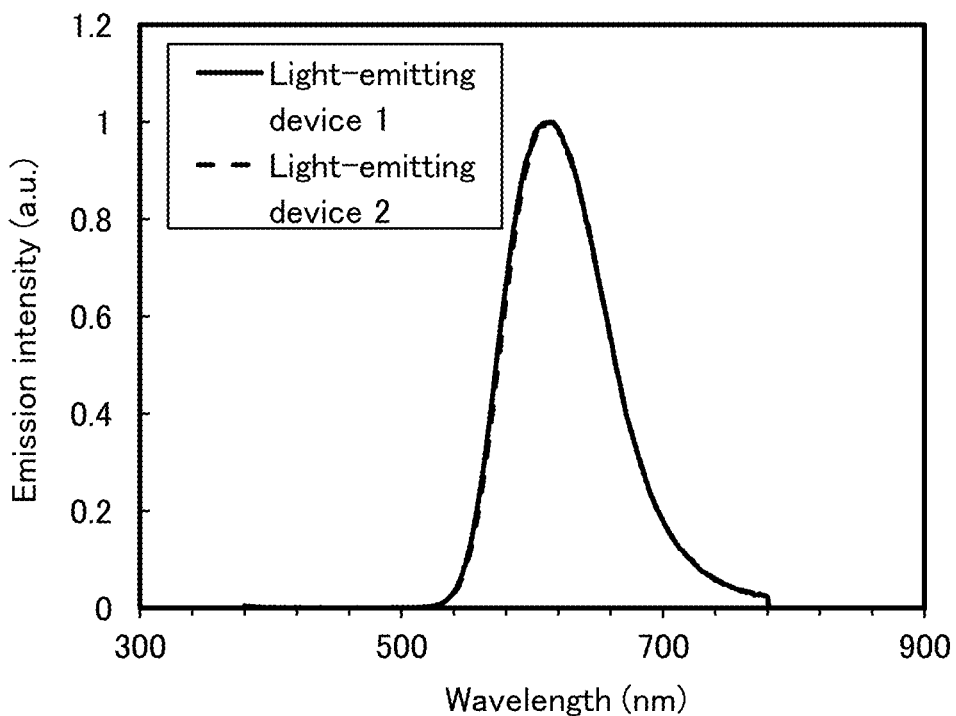
FIG. 18 is a diagram showing emission spectra of the light-emitting device 1 and the light-emitting device 2.
Figure 19:
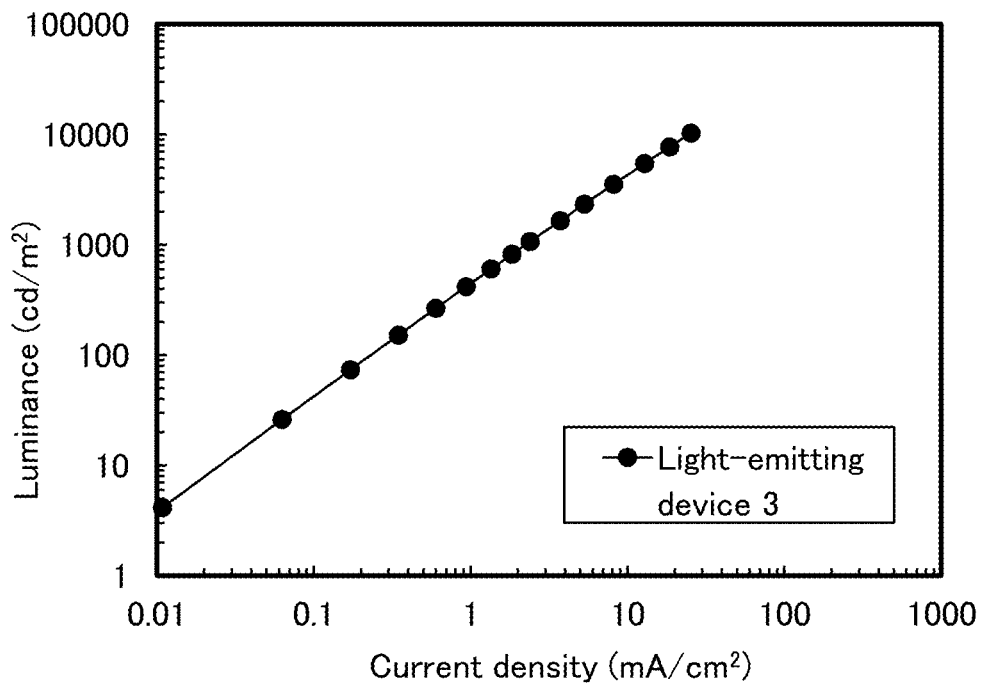
FIG. 19 is a diagram showing luminance-current density characteristics of a light-emitting device 3.
Figure 20:
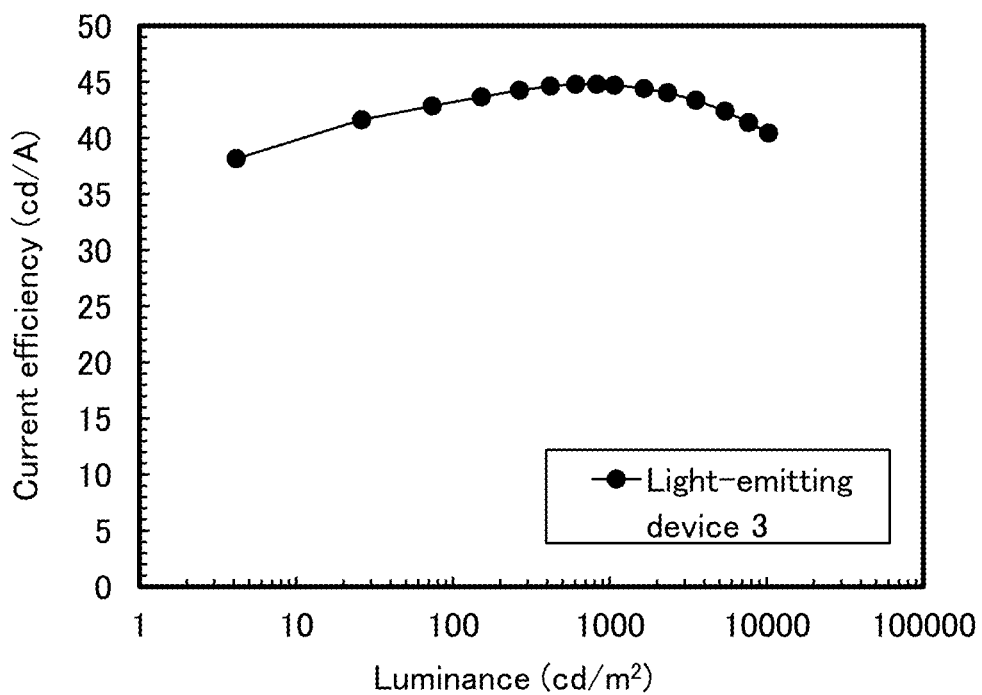
FIG. 20 is a diagram showing current efficiency-luminance characteristics of the light-emitting device 3.
Figure 21:
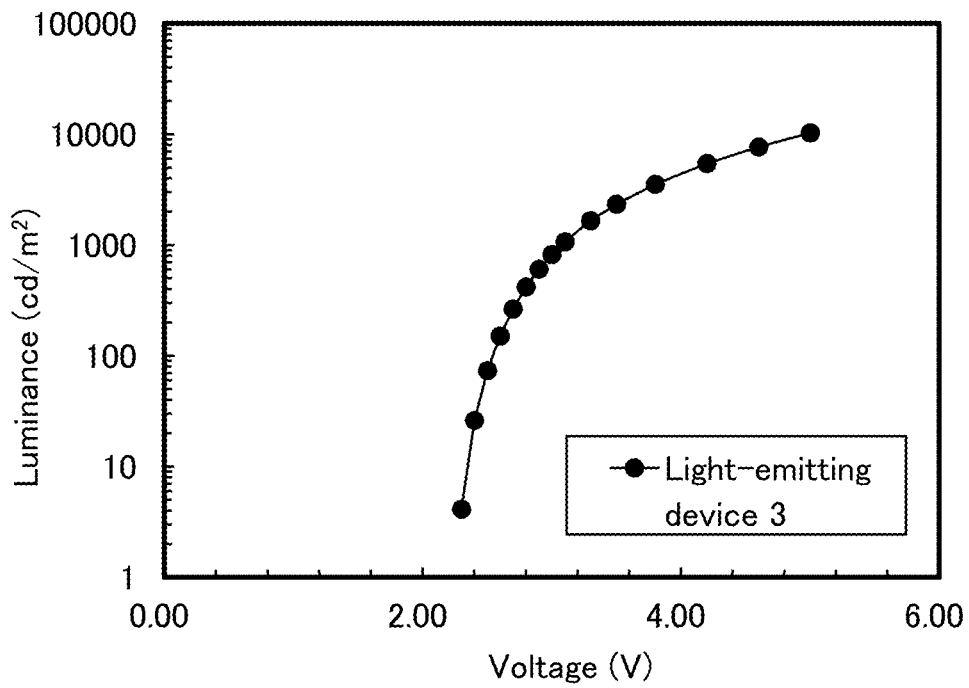
FIG. 21 is a diagram showing luminance-voltage characteristics of the light-emitting device 3.
Figure 22:
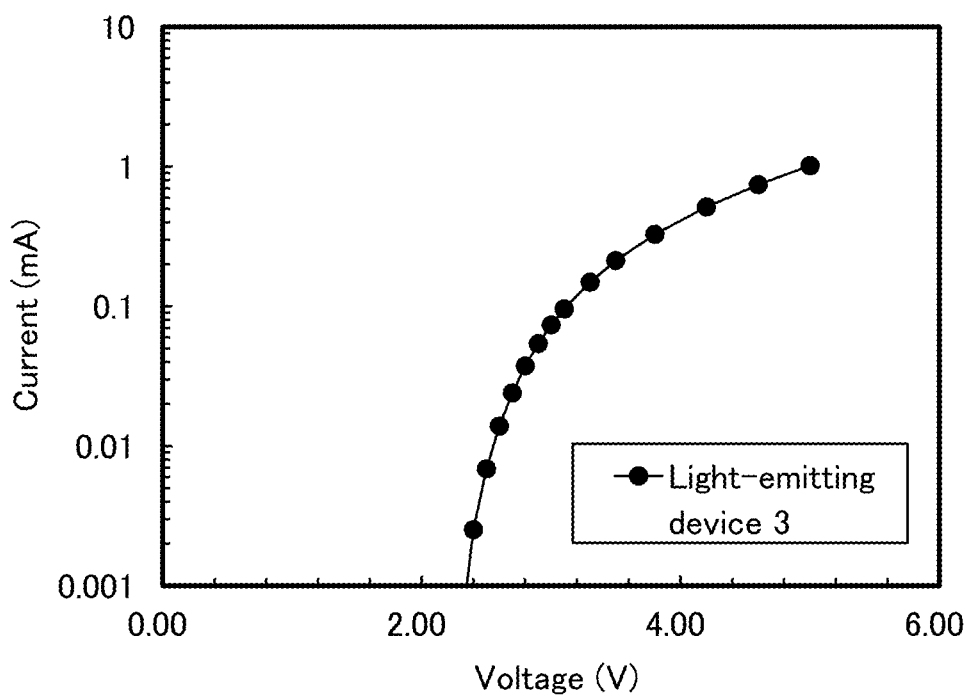
FIG. 22 is a diagram showing current-voltage characteristics of the light-emitting device 3.
Figure 23:
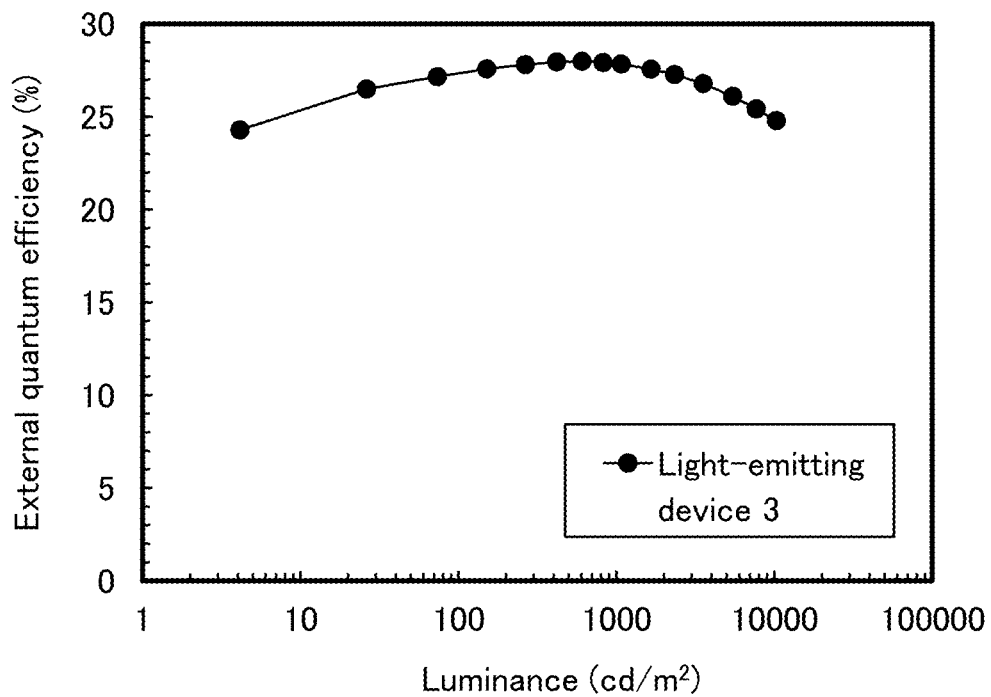
FIG. 23 is a diagram showing external quantum efficiency-luminance characteristics of the light-emitting device 3.
Figure 24:
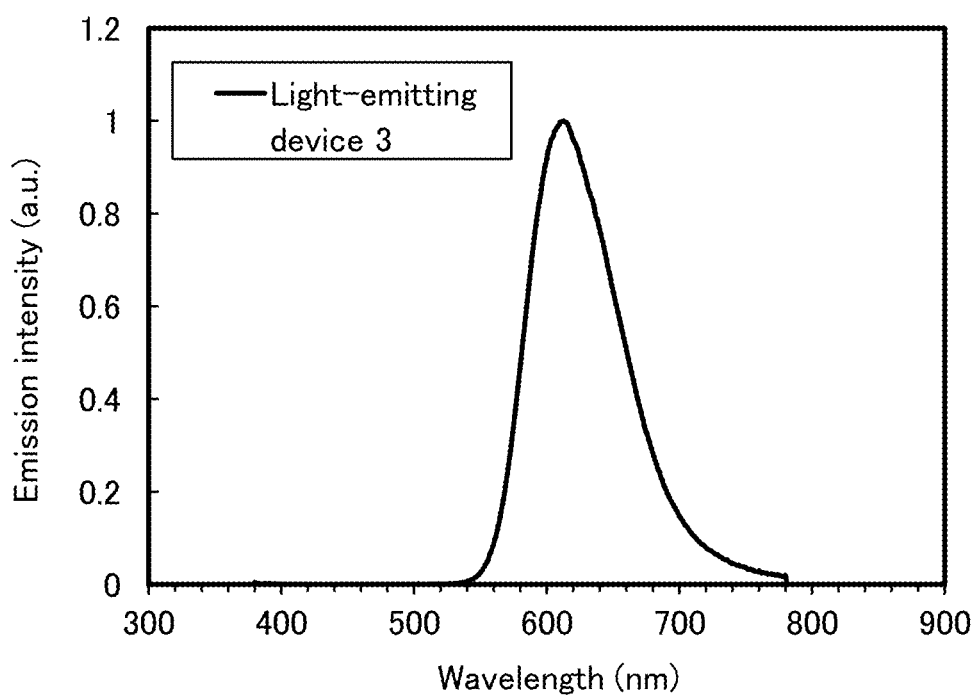
FIG. 24 is a diagram showing emission spectrum of the light-emitting device 3.

FIG. 13 shows the luminance-current density characteristics of the light-emitting device 1 and the light-emitting device 2; FIG. 14 shows the current efficiency-luminance characteristics thereof; FIG. 15 shows the luminance-voltage characteristics thereof; FIG. 16 shows the current-voltage characteristics thereof; FIG. 17 shows the external quantum efficiency-luminance characteristics thereof; and FIG. 18 shows the emission spectra thereof. FIG. 19 shows the luminance-current density characteristics of the light-emitting device 3; FIG. 20 shows the current efficiency-luminance characteristics thereof; FIG. 21 shows the luminance-voltage characteristics thereof; FIG. 22 shows the current-voltage characteristics thereof; FIG. 23 shows the external quantum efficiency-luminance characteristics thereof; and FIG. 24 shows the emission spectra thereof. The table below shows the main characteristics of the light-emitting device 1 to the light-emitting device 3 at around 1000 cd/m$^2$. The luminance, CIE chromaticity, and emission spectra were measured at normal temperature with a spectroradiometer (SR-UL1R manufactured by TOPCON TECHNOHOUSE CORPORATION).

device 3 of one embodiment of the present invention exhibit favorable operation characteristics.

According to FIG. 18, the maximum peak wavelength of the emission spectrum of the light-emitting device 1 and the maximum peak wavelength of the emission spectrum of the light-emitting device 2 were each 614 nm. The emission intensity of the light-emitting device 1 at less than or equal to 495 nm in an emission spectrum was less than or equal to 1% of the emission intensity at the maximum peak wavelength. The emission intensity of the light-emitting device 2 at less than or equal to 495 nm in an emission spectrum was less than or equal to 1% of the emission intensity at the maximum peak wavelength. The half width of the emission spectrum of the light-emitting device 1 and the half width of the emission spectrum of the light-emitting device 2 were 91 nm and 90 nm, respectively.

According to FIG. 24, the maximum peak wavelength of the emission spectrum of the light-emitting device 3 was 612 nm. The emission intensity of the light-emitting device 3 at less than or equal to 495 nm in an emission spectrum was less than or equal to 1% of the emission intensity at the maximum peak wavelength. The half width of the emission spectrum of the light-emitting device 3 was 79 nm.

That is, the light-emitting device 1 to the light-emitting device 3 each had light emission closer to natural light and inhibited blue light, which can bring about a relaxation effect for a user. Accordingly, it was revealed that with use of the light-emitting device 1 to the light-emitting device 3 as the light-emitting apparatus of one embodiment of the present invention, the relaxation effect of the light-emitting apparatus of one embodiment of the present invention can be enhanced.

Example 3

This example will describe element structures and characteristics of a light-emitting device 4 to a light-emitting device 6, which are organic EL elements that can be used in the light-emitting apparatus described in Example 1. The table below shows specific components of the light-emitting device 4 to the light-emitting device 6. Chemical formulae of materials used in this example are shown below. Although the light-emitting device 4 to the light-emitting device 6 shown in this example each have a light-emitting portion area of 4 mm$^2$ (2 mm×2 mm), a light-emitting device having

TABLE 2

|  | Voltage (V) | Current (mA) | Current density (mA/cm$^2$) | Chromaticity x | Chromaticity y | Current efficiency (cd/A) | External quantum efficiency (%) |
|---|---|---|---|---|---|---|---|
| Light-emitting device 1 | 3.2 | 0.14 | 3.5 | 0.605 | 0.394 | 33.1 | 19.0 |
| Light-emitting device 2 | 3.0 | 0.10 | 2.6 | 0.608 | 0.391 | 32.5 | 19.0 |
| Light-emitting device 3 | 3.1 | 0.10 | 2.4 | 0.627 | 0.373 | 44.7 | 27.8 |

The results in FIG. 13 to FIG. 24 and the table above reveals that the light-emitting device 1 to the light-emitting a light-emitting portion area of 1142.75 mm$^2$ (35 mm×32.65 mm) can be fabricated in a similar manner.

TABLE 3

|  | Film thickness | Light-emitting device 4 | Light-emitting device 5 | Light-emitting device 6 |
|---|---|---|---|---|
| Second electrodei | 200 nm | | Al | |
| Electron-injection layer | 1 nm | | Liq | |

TABLE 3-continued

| | Film thickness | Light-emitting device 4 | Light-emitting device 5 | Light-emitting device 6 |
|---|---|---|---|---|
| Electron-transport layer | 25 nm | mPn-mDMePyPTzn:Liq (1:1) | NBPhen | |
| | 10 nm | mFBPTzn | 2mDBTBPDBq-II | |
| Light-emitting layer | 50 nm | 2mDBTBPDBq-II:PCBBiF:Ir(dppm)$_2$(acac) (0.8:0.2:0.2) | 2mDBTBPDBq-II:PCBBiF:Ir(dppm)$_2$(dpm) (0.8:0.2:0.1) | (0.8:0.2:0.3) |
| Hole-transport layer | 85 nm | PCBFF | | |
| | 140 nm | PCBBiF | | |
| Hole-injection layer | 10 nm | PCBBiF:OCHD-003 (1:0.03) | | |
| First electrode | 70 nm | ITSO | | |

[Chemical Formulae 4]

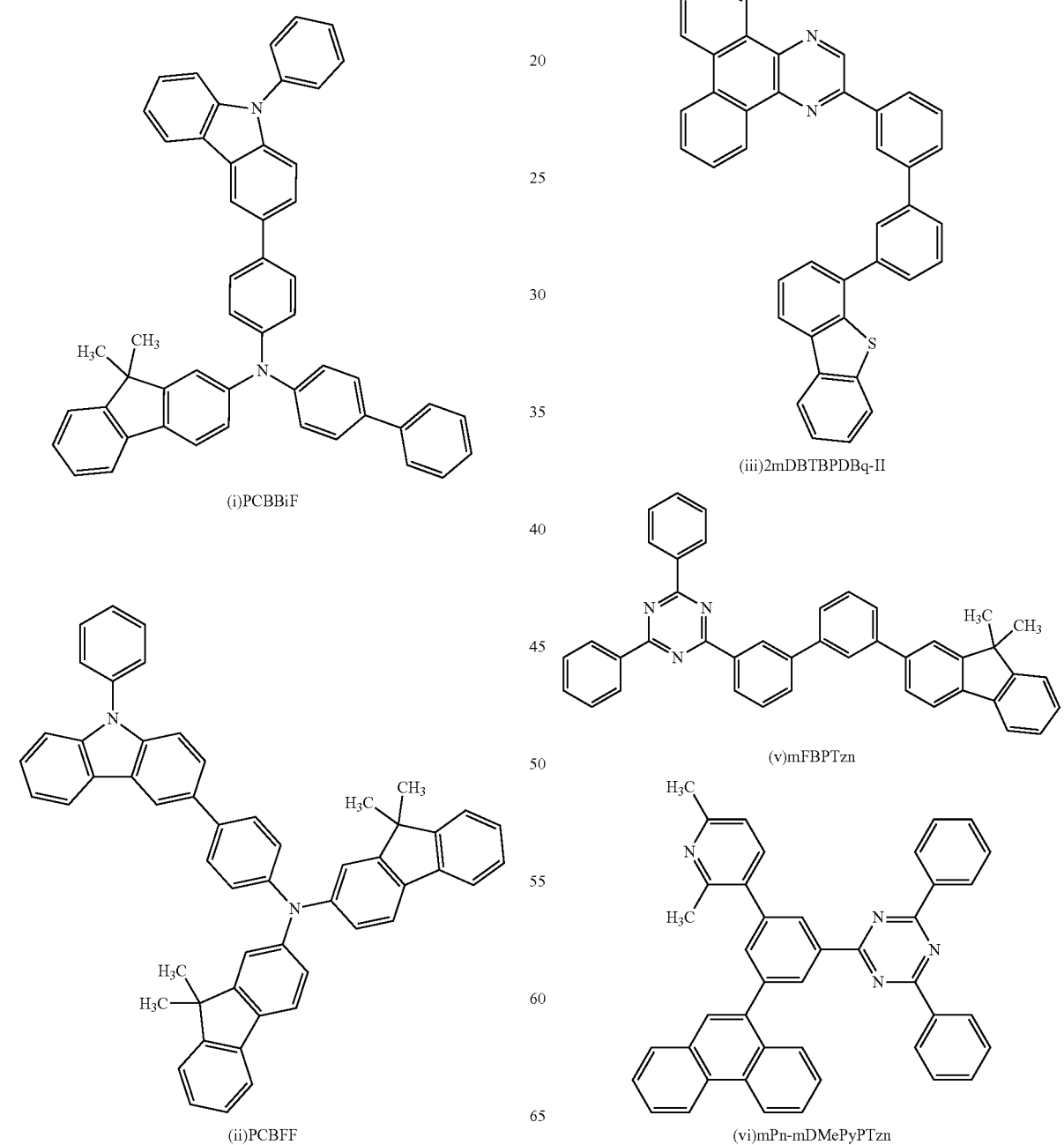

(i) PCBBiF (ii) PCBFF (iii) 2mDBTBPDBq-II (v) mFBPTzn (vi) mPn-mDMePyPTzn

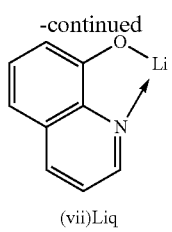

(vii)Liq

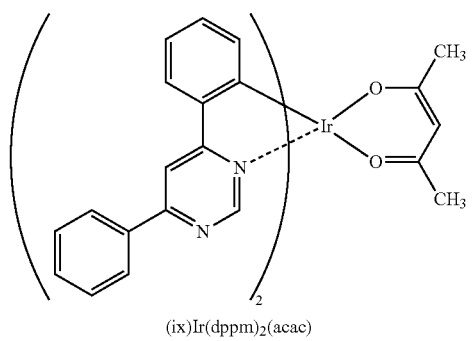

(ix)Ir(dppm)₂(acac)

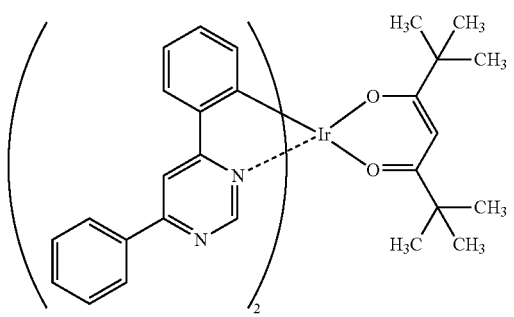

(x)Ir(dppm)₂(dpm)

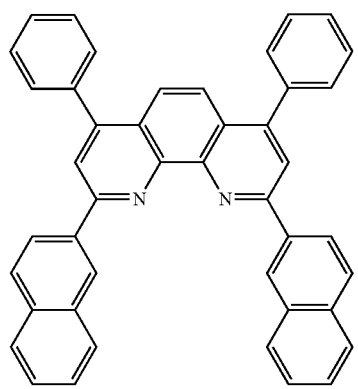

(xi)NBPhen

<<Fabrication of Light-Emitting Device 4>>

The light-emitting device 4 shown in Example 2 is a light-emitting device different from the light-emitting device 1 in light-emitting materials that were used in the light-emitting layer 913 and the mixture ratio of materials. That is, the light-emitting device 4 was fabricated in a manner similar to that of the light-emitting device 1 shown in Example 2 except that as the light-emitting layer 913, instead of co-evaporating 2mDBTBPDBq-II, PCBBiF, and Ir(pqn)₂(dppm), 2mDBTBPDBq-II, PCBBiF, and (acetylacetonato)bis(4,6-diphenylpyrimidinato)iridium(III) 10 (abbreviation: Ir(dppm)₂(acac)) represented by Structural Formula (ix) above were co-evaporated such that 2mDBTBPDBq-II: PCBBiF: Ir(dppm)₂(acac)=0.8:0.2:0.2.

<<Fabrication of Light-Emitting Device 5>>

A light-emitting device 5 is a light-emitting device different from the light-emitting device 1 shown in Example 2 in light-emitting materials that were used in the light-emitting layer 913 and the mixture ratio of materials and materials used for the electron-transport layer 914. That is, as the light-emitting layer 913 of the light-emitting device 5, instead of co-evaporating 2mDBTBPDBq-II, PCBBiF, and Ir(pqn)₂(dppm), 2mDBTBPDBq-II, PCBBiF, and (dipivaloylmethano)bis(4,6-diphenylpyrimidinato)iridium(III) (abbreviation: Ir(dppm)₂(dpm)) represented by Structural Formula (x) above were co-evaporated such that 2mDBTBPDBq-II: PCBBiF: Ir(dppm)₂(dpm)=0.8:0.2:0.1. For the electron-transport layer 914, 2mDBTBPDBq-II was used instead of mFBPTzn. Furthermore, for the electron-transport layer 914, instead of co-evaporating mPn-mD-MePyPTzn and Liq, 2,9-di(2-naphthalen-2-yl)-4,7-diphenyl-1,10-phenanthroline (abbreviation: NBPhen) represented by Structural Formula (xi) above were co-evaporated. The other components were fabricated in a manner similar to that of the light-emitting device 1 shown in Example 2.

<<Fabrication of Light-Emitting Device 6>>

The light-emitting device 6 is a light-emitting device different from the light-emitting device 5 in the mixture ratio of materials in the light-emitting layer 913. That is, the light-emitting device 6 was fabricated in a manner similar to that of the light-emitting device 5 except that as the light-emitting layer 913, 2mDBTBPDBq-II, PCBBiF, and Ir(dppm)₂(dpm) were co-evaporated such that 2mDBTBPDBq-II: PCBBiF: Ir(dppm)₂(dpm)=0.8:0.2:0.3.

<<Operation Characteristics of Light-Emitting Device 4 to Light-Emitting Device 6>>

Figure 25:
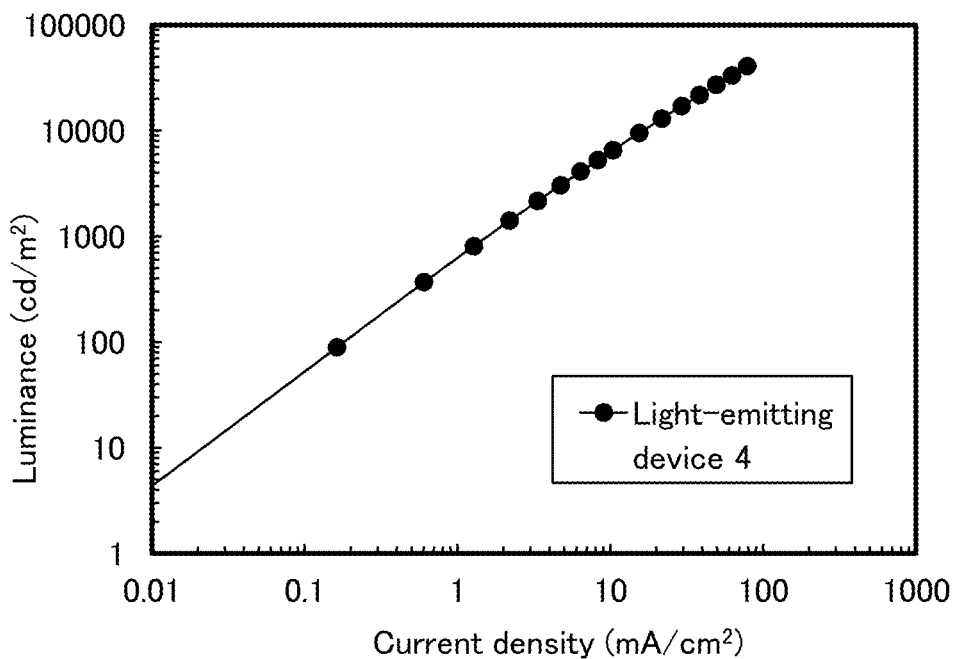
FIG. 25 is a diagram showing luminance-current density characteristics of a light-emitting device 4.
Figure 26:
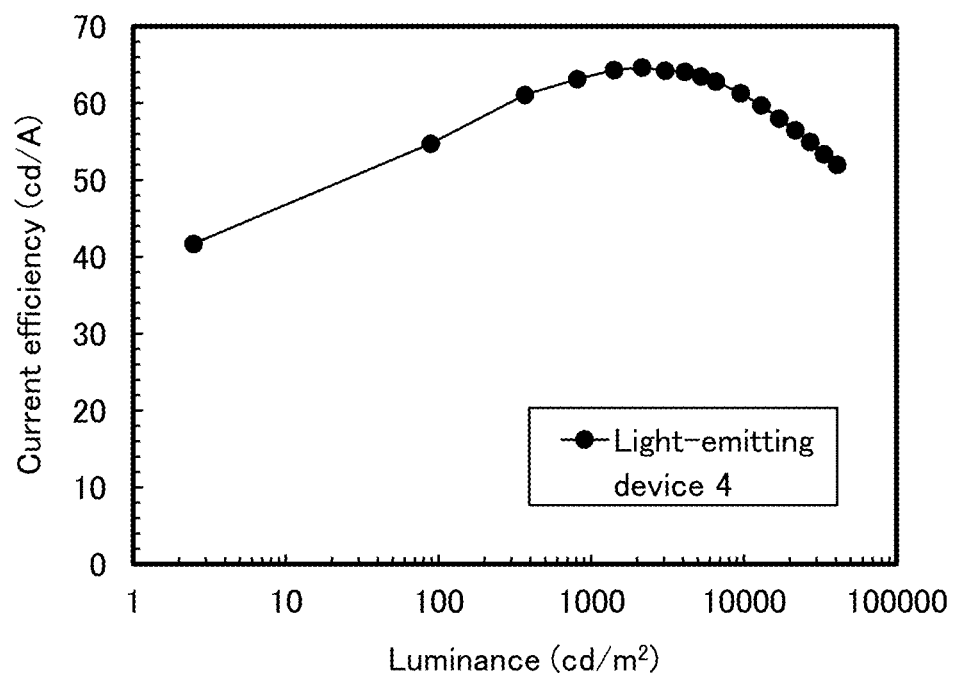
FIG. 26 is a diagram showing current efficiency-luminance characteristics of the light-emitting device 4.
Figure 27:
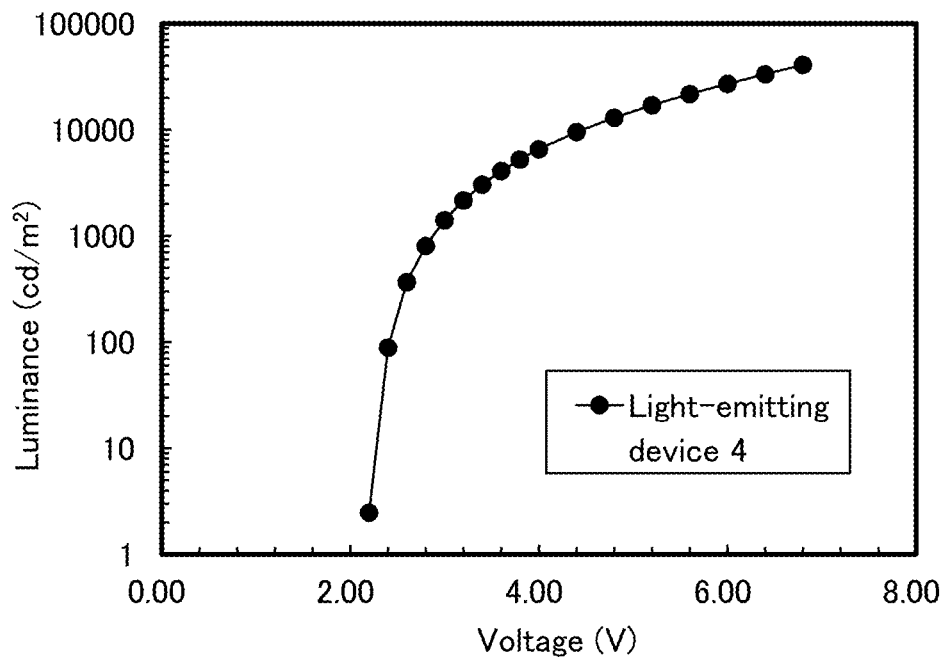
FIG. 27 is a diagram showing luminance-voltage characteristics of the light-emitting device 4.
Figure 28:
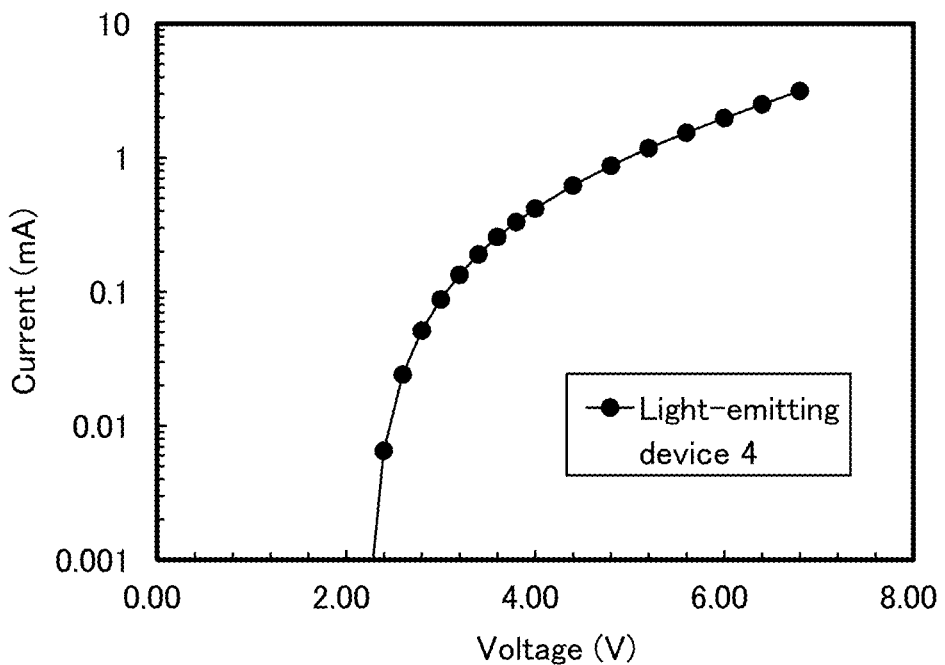
FIG. 28 is a diagram showing current-voltage characteristics of the light-emitting device 4.
Figure 29:
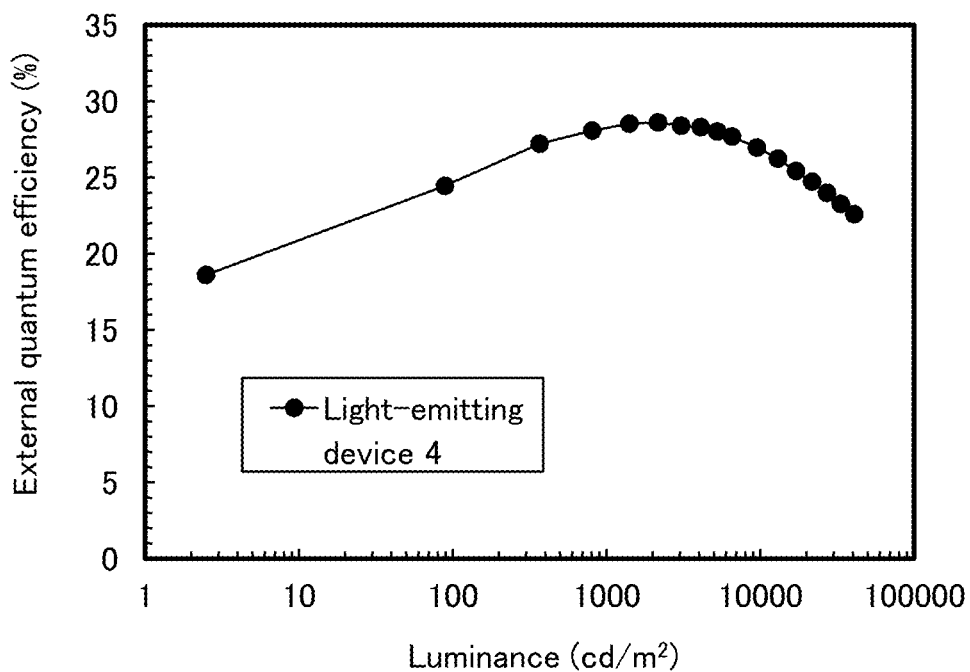
FIG. 29 is a diagram showing external quantum efficiency-luminance characteristics of the light-emitting device 4.
Figure 30:
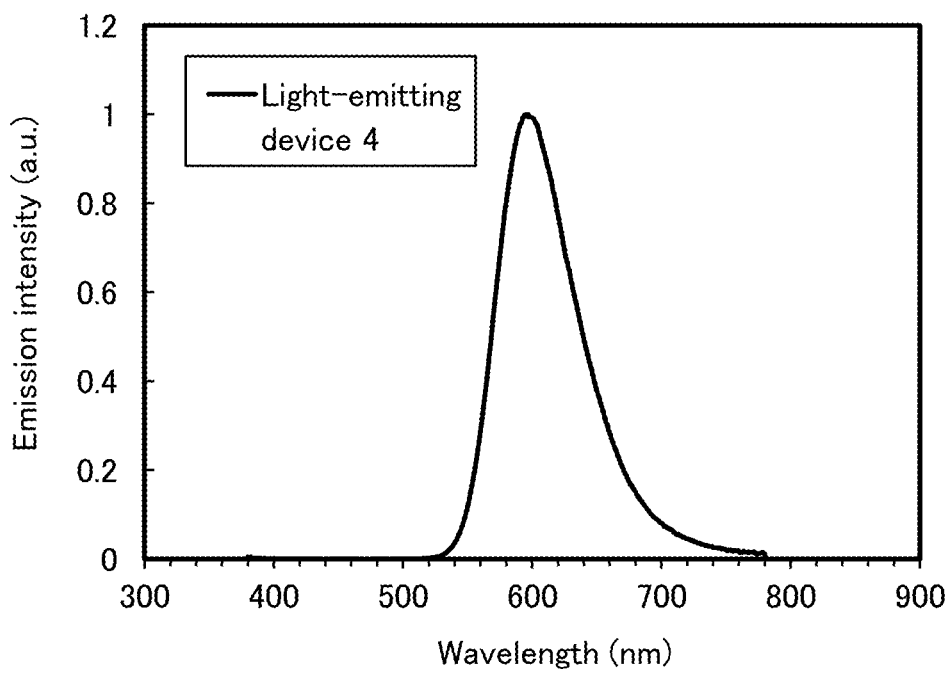
FIG. 30 is a diagram showing emission spectrum of the light-emitting device 4.
Figure 31:
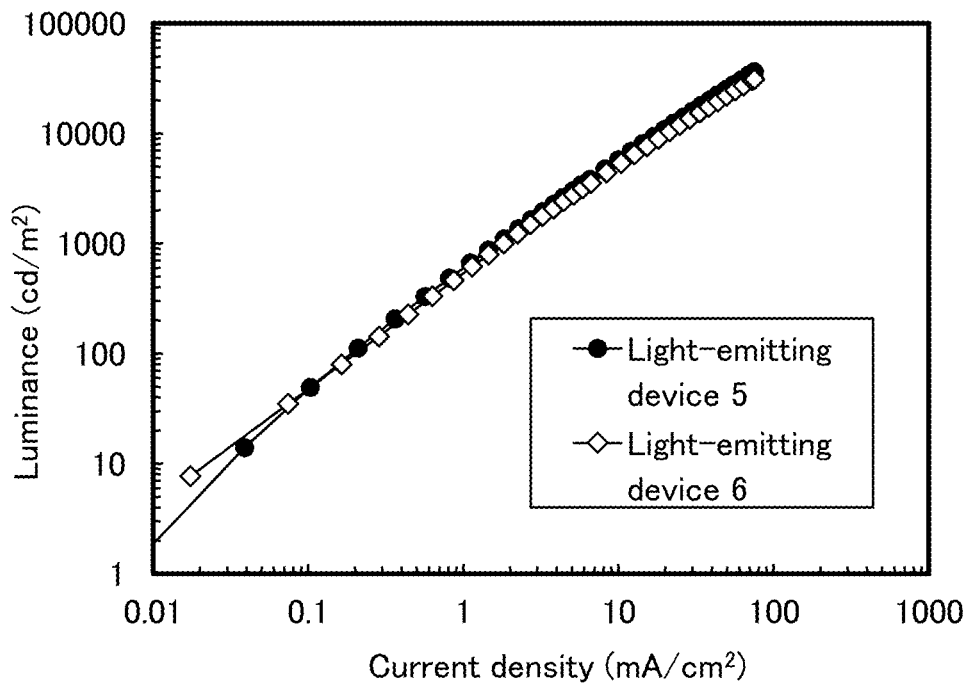
FIG. 31 is a diagram showing luminance-current density characteristics of a light-emitting device 5 and a light-emitting device 6.
Figure 32:
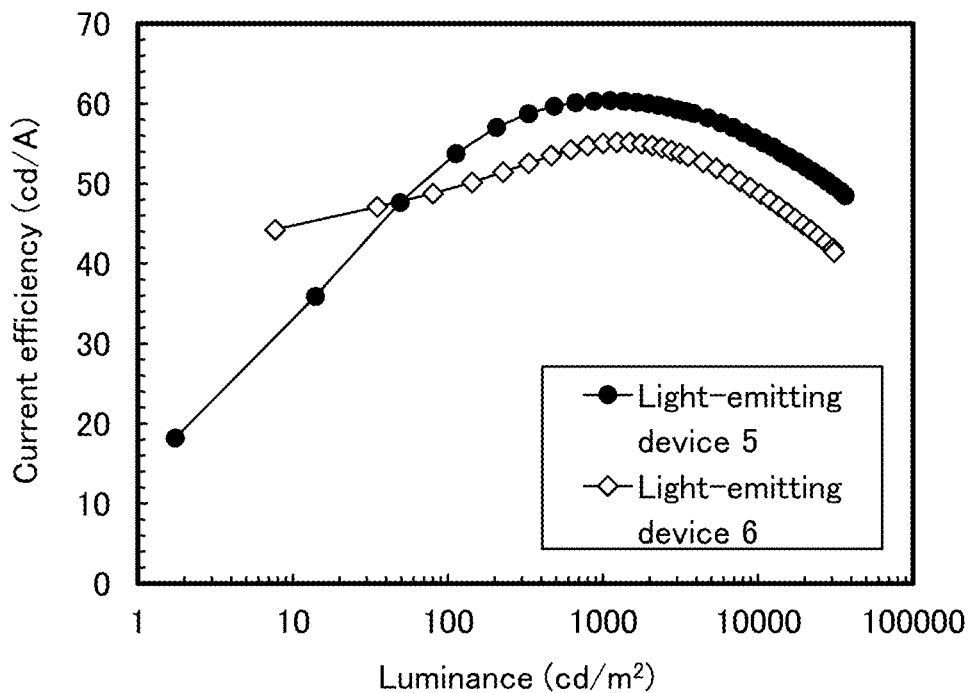
FIG. 32 is a diagram showing current efficiency-luminance characteristics of the light-emitting device 5 and the light-emitting device 6.
Figure 33:
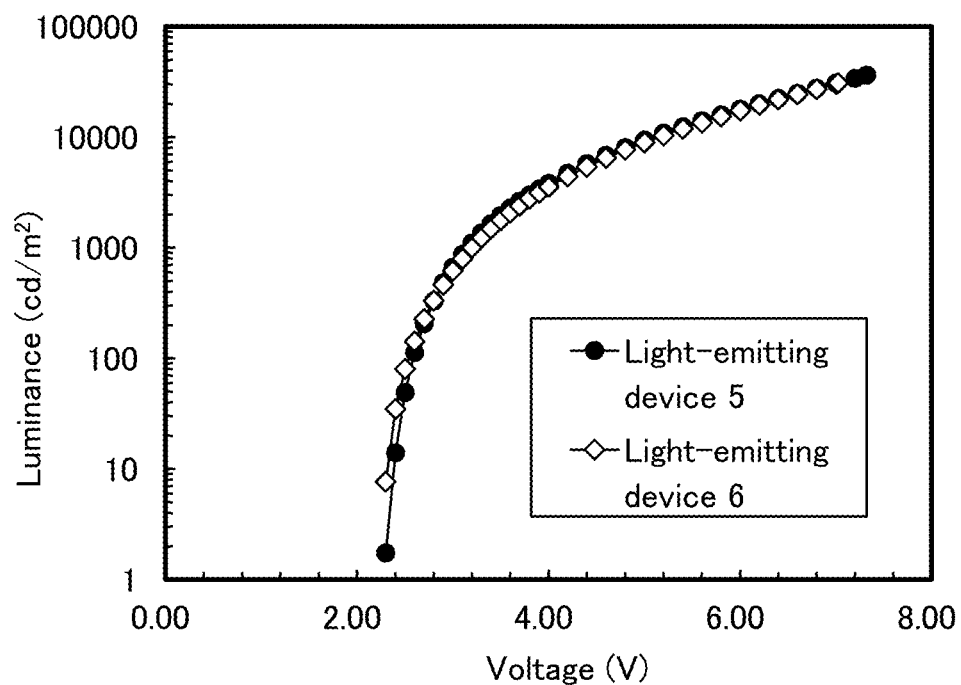
FIG. 33 is a diagram showing luminance-voltage characteristics of the light-emitting device 5 and the light-emitting device 6.
Figure 34:
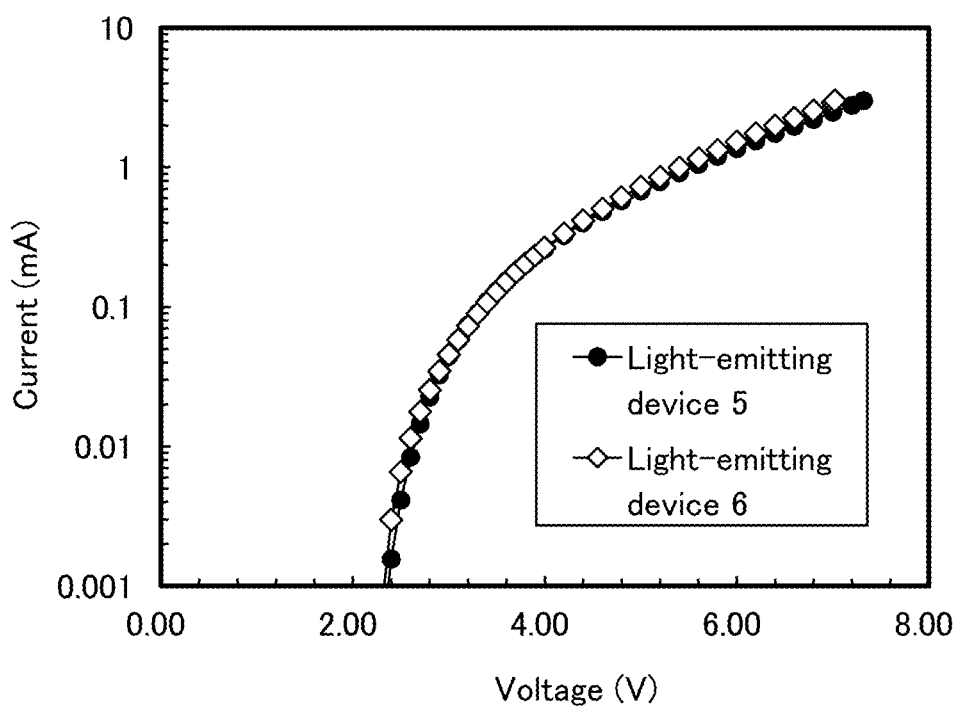
FIG. 34 is a diagram showing current-voltage characteristics of the light-emitting device 5 and the light-emitting device 6.
Figure 35:
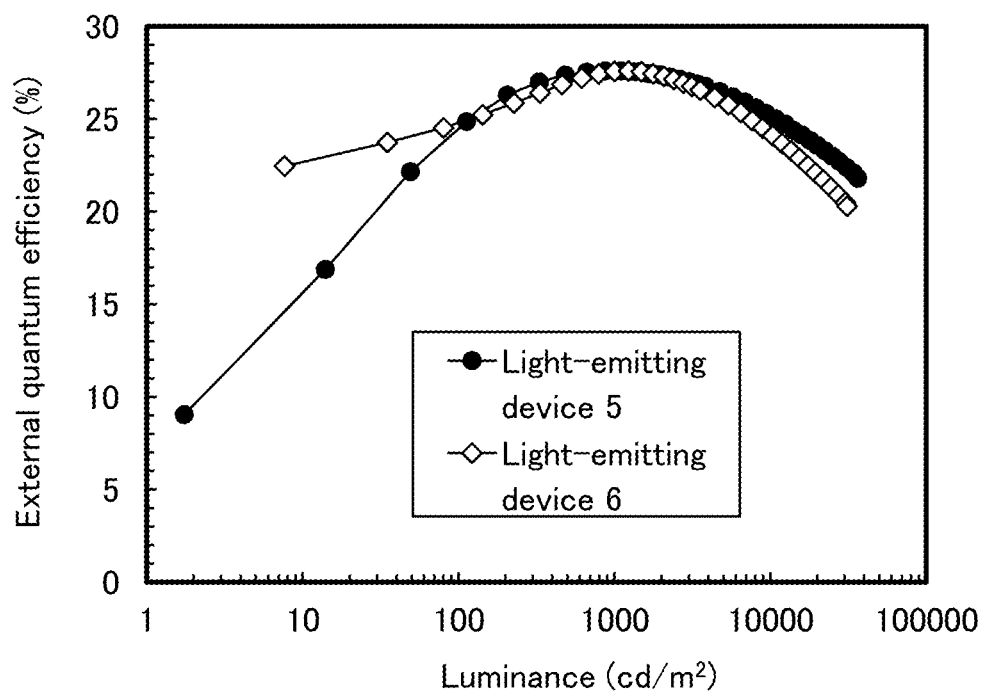
FIG. 35 is a diagram showing external quantum efficiency-luminance characteristics of the light-emitting device 5 and the light-emitting device 6.
Figure 36:
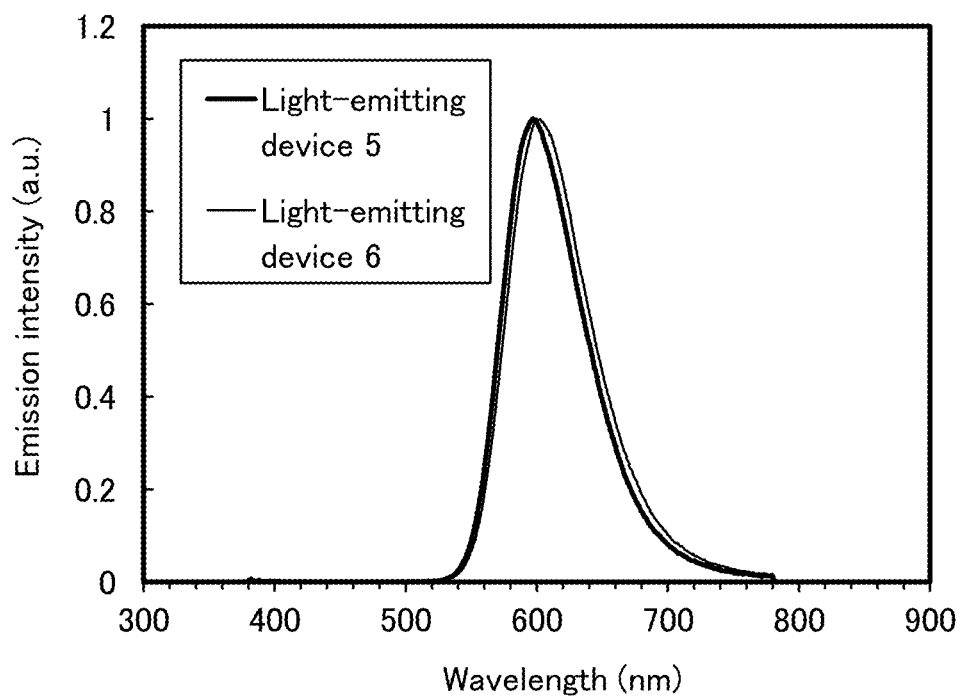
FIG. 36 is a diagram showing emission spectra of the light-emitting device 5 and the light-emitting device 6.

FIG. 25 shows the luminance-current density characteristics of the light-emitting device 4; FIG. 26 shows the current efficiency-luminance characteristics thereof; FIG. 27 shows the luminance-voltage characteristics thereof; FIG. 28 shows the current-voltage characteristics thereof; FIG. 29 shows the external quantum efficiency-luminance characteristics thereof; and FIG. 30 shows the emission spectra thereof. FIG. 31 shows the luminance-current density characteristics of the light-emitting device 5 and light-emitting device 6; FIG. 32 shows the current efficiency-luminance characteristics thereof; FIG. 33 shows the luminance-voltage characteristics thereof; FIG. 34 shows the current-voltage characteristics thereof; FIG. 35 shows the external quantum efficiency-luminance characteristics thereof; and FIG. 36 shows the emission spectra thereof. The table below shows the main characteristics of the light-emitting device 4 to the light-emitting device 6 at around 1000 cd/m². The luminance, CIE chromaticity, and emission spectra were measured at normal temperature with a spectroradiometer (SR-ULIR manufactured by TOPCON TECHNOHOUSE CORPORATION).

TABLE 4

|  | Voltage (V) | Current (mA) | Current density (mA/cm$^2$) | Chromaticity x | Chromaticity y | Current efficiency (cd/A) | External quantum efficiency (%) |
|---|---|---|---|---|---|---|---|
| Light-emitting device 4 | 2.8 | 0.05 | 1.3 | 0.586 | 0.413 | 63.1 | 28.1 |
| Light-emitting device 5 | 3.2 | 0.07 | 1.8 | 0.592 | 0.407 | 60.4 | 27.6 |
| Light-emitting device 6 | 3.2 | 0.07 | 1.8 | 0.603 | 0.396 | 55.1 | 27.6 |

The results in FIG. 25 to FIG. 36 and the table above reveals that the light-emitting device 4 to the light-emitting device 6 of one embodiment of the present invention exhibit favorable operation characteristics.

According to FIG. 30, the maximum peak wavelength of the emission spectrum of the light-emitting device 4 was 597 nm. The emission intensity of the light-emitting device 4 at less than or equal to 495 nm in an emission spectrum was less than or equal to 1% of the emission intensity at the maximum peak wavelength. The half width of the emission spectrum of the light-emitting device 4 was 71 nm.

According to FIG. 36, the maximum peak wavelength of the emission spectrum of the light-emitting device 5 and the maximum peak wavelength of the emission spectrum of the light-emitting device 6 were 597 nm and 600 nm, respectively. The emission intensity of each of the light-emitting device 5 and light-emitting device 6 at less than or equal to 495 nm in an emission spectrum was less than or equal to 1% of the emission intensity at the maximum peak wavelength. The half width of the emission spectrum of the light-emitting device 5 and the half width of the emission spectrum of the light-emitting device 6 were 72 nm and 73 nm, respectively.

That is, the light-emitting device 4 to the light-emitting device 6 each had light emission closer to natural light and inhibited blue light, which can bring about a relaxation effect for a user. Accordingly, it was revealed that with use of the light-emitting device 4 to the light-emitting device 6 as the light-emitting apparatus of one embodiment of the present invention, the relaxation effect of the light-emitting apparatus of one embodiment of the present invention can be enhanced.

Example 4

This example will describe element structures and characteristics of a light-emitting device 7, which are organic EL elements that can be used in the light-emitting apparatus described in Example 1. Table 3 shows specific components of the light-emitting device 7. Chemical formulae of materials used in this example are shown below. Note that the structure of the light-emitting device 7 is similar to that of the light-emitting device 3 described in Example 2. The light-emitting device 7 has a light-emitting portion area of 1142.75 mm$^2$ (35 mm×32.65 mm).

TABLE 5

|  | Film thickness (nm) | Light-emitting device 7 |
|---|---|---|
| Second electrode | 200 | Al |
| Electron-injection layer | 1 | Liq |
| Electron-transport layer | 25 | mPn-mDMePyPTzn:Liq (1:1) |
|  | 10 | mFBPTzn |
| Light-emitting layer | 50 | 2mDBTBPDBq-II:PCBBiF:Ir(5mdppm)$_2$(dibm) (0.8:0.2:0.1) |
| Hole-transport layer | 85 | PCBFF |
|  | 140 | PCBBiF |
| Hole-injection layer | 10 | PCBBiF:OCHD-003 (1:0.03) |
| First electrode | 70 | ITSO |

[Chemical Formulae 5]

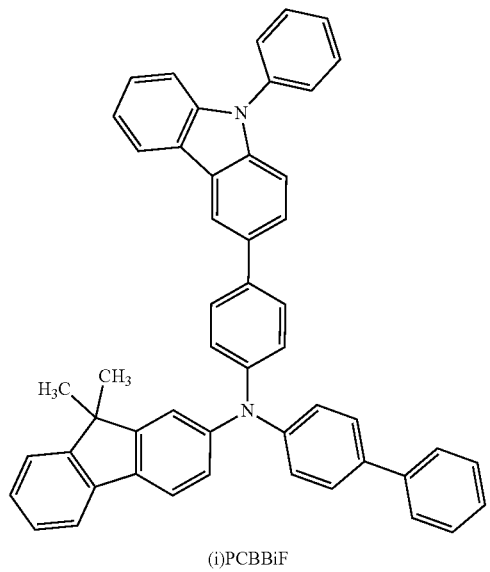

(i)PCBBiF

-continued

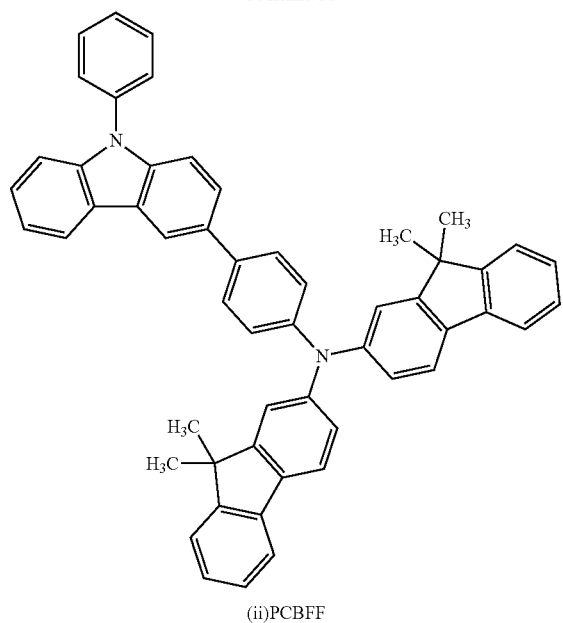
(ii)PCBFF

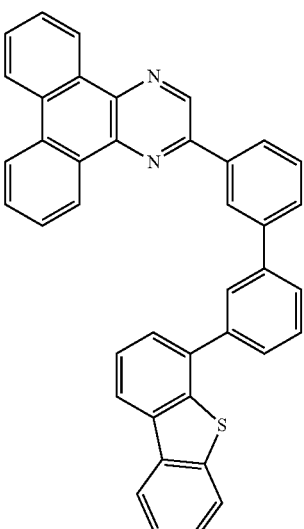
(iii)2mDBTBPDBq-II

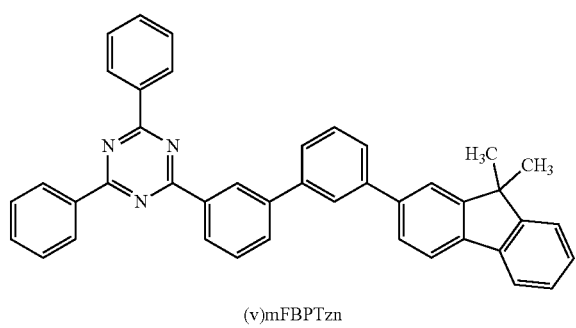
(v)mFBPTzn

-continued

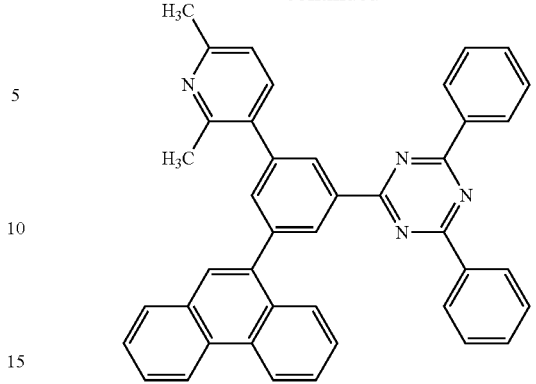
(vi)mPn-mDMePyPTzn

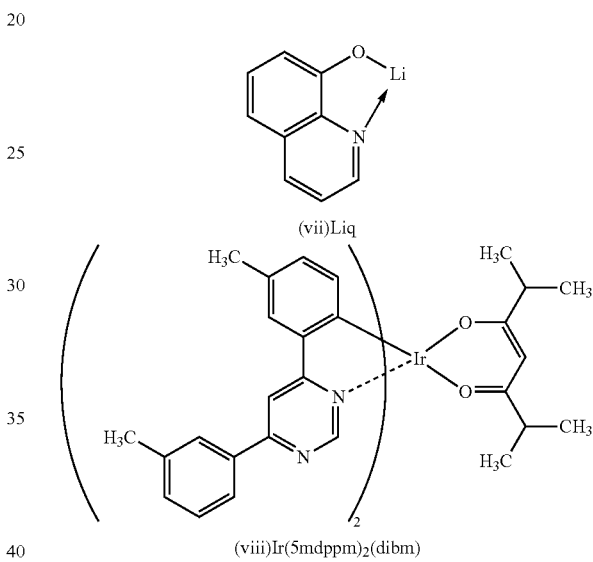
(vii)Liq (viii)Ir(5mdppm)$_2$(dibm)

<<Fabrication of Light-Emitting Device 7>>

As described above, the light-emitting device 7 shown in this example is a light-emitting device having a similar stacked-layer structure to that of the light-emitting device 3 described in Example 2 and a different light-emitting portion area. In other words, the light-emitting device 7 was fabricated in a manner similar to that of the light-emitting device 3 except that the first electrode 901 with an area of 1142.75 mm$^2$ (35 mm×32.65 mm) was formed over the substrate 900.

<<Operation Characteristics of Light-Emitting Device 7>>

Figure 37:
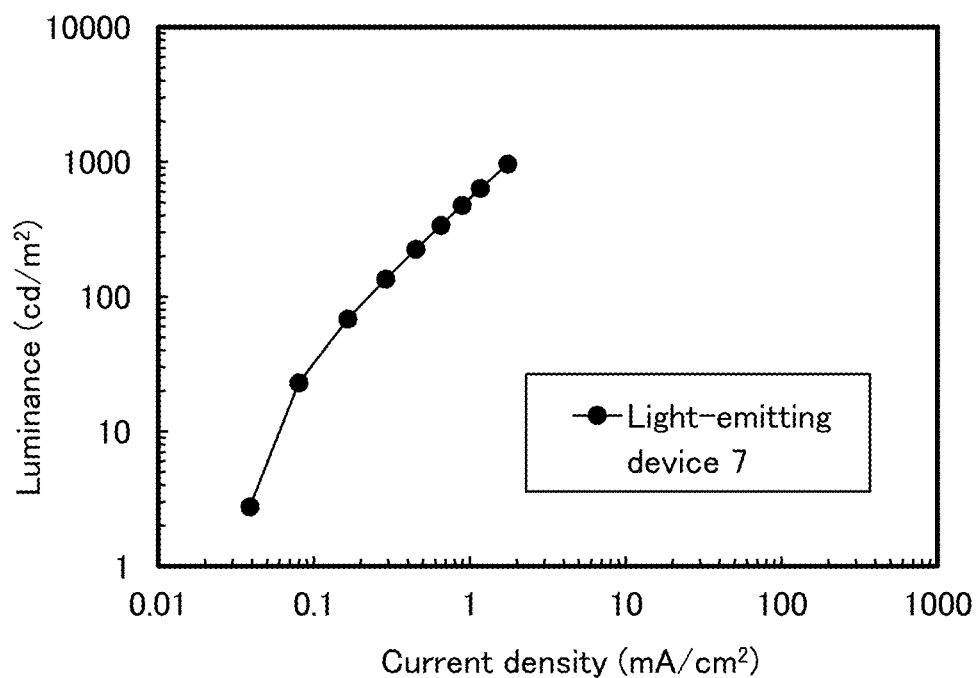
FIG. 37 is a diagram showing luminance-current density characteristics of a light-emitting device 7.
Figure 38:
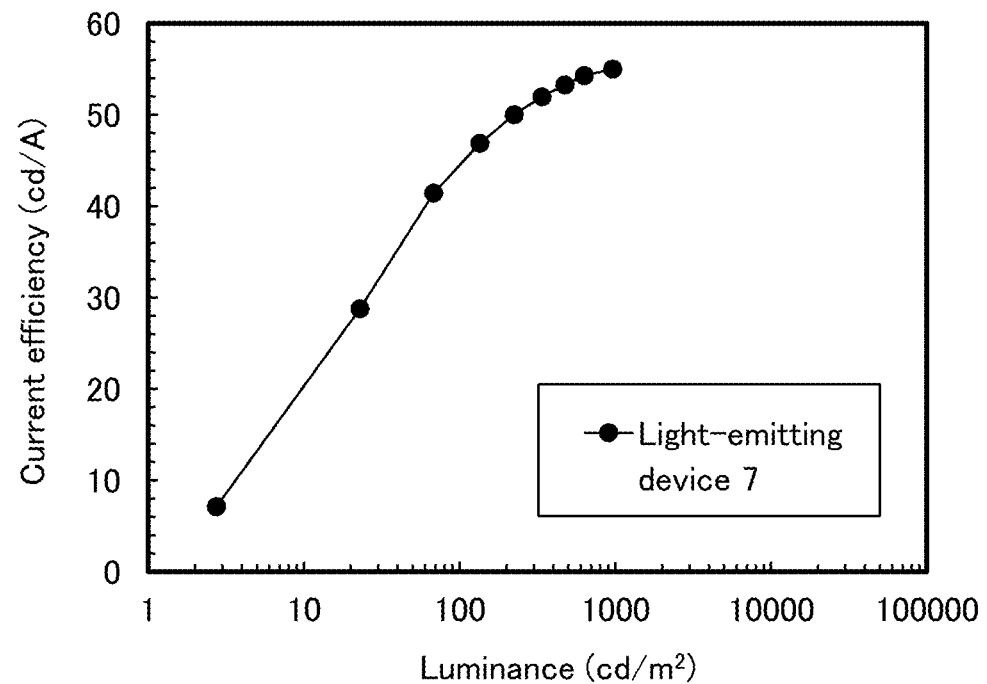
FIG. 38 is a diagram showing current efficiency-luminance characteristics of the light-emitting device 7.
Figure 39:
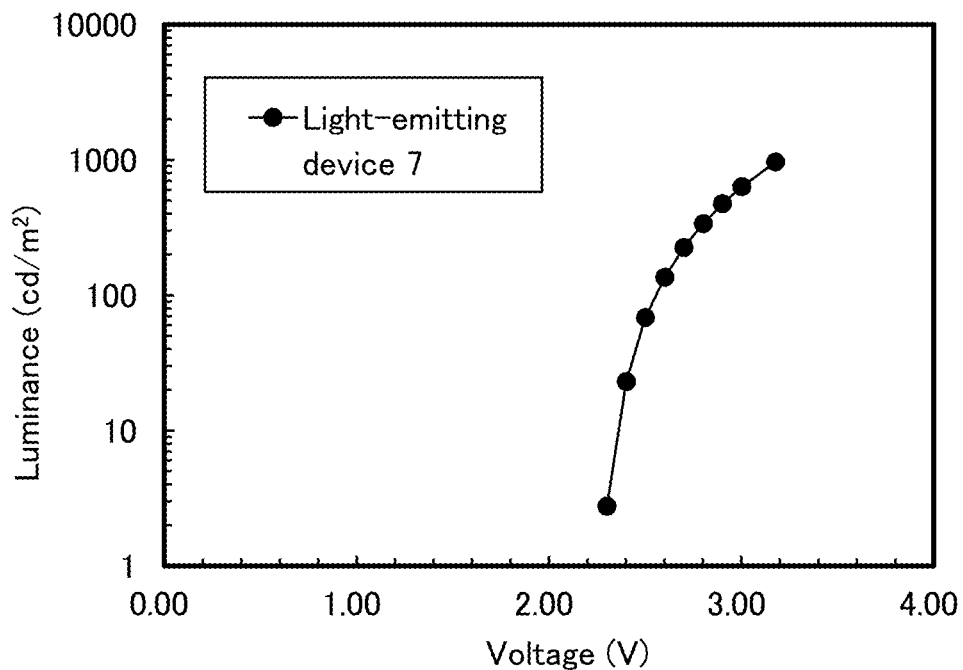
FIG. 39 is a diagram showing luminance-voltage characteristics of the light-emitting device 7.
Figure 40:
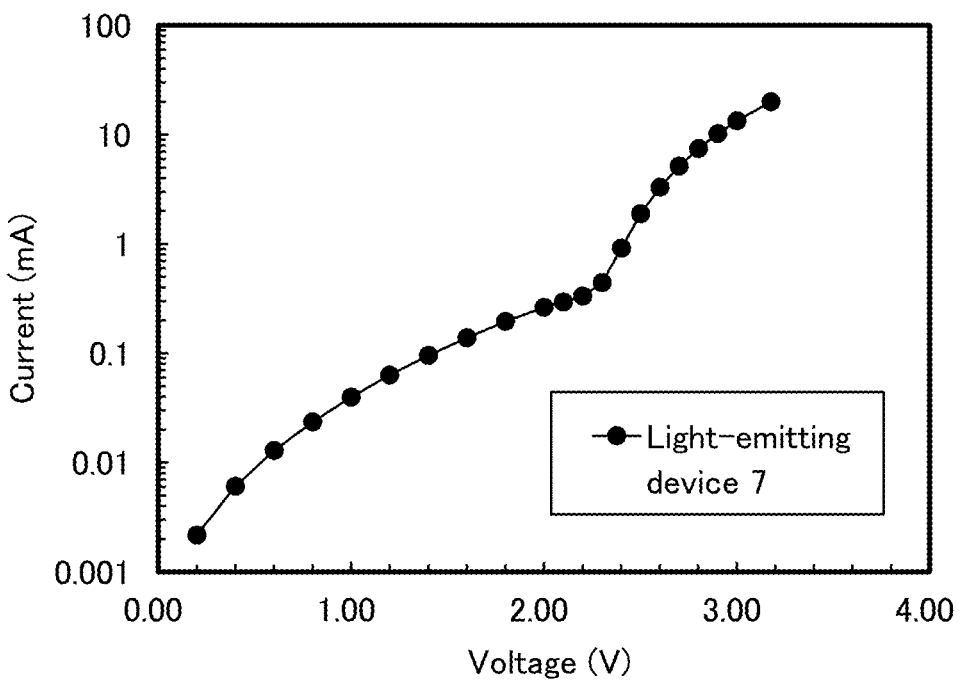
FIG. 40 is a diagram showing current-voltage characteristics of the light-emitting device 7.
Figure 41:
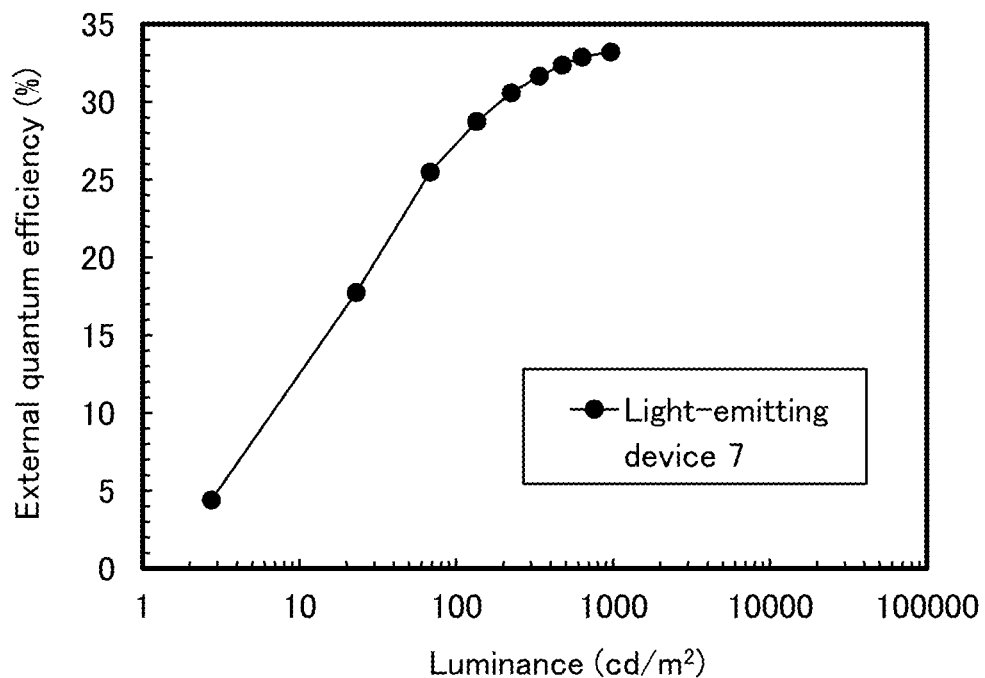
FIG. 41 is a diagram showing external quantum efficiency-luminance characteristics of the light-emitting device 7.
Figure 42:
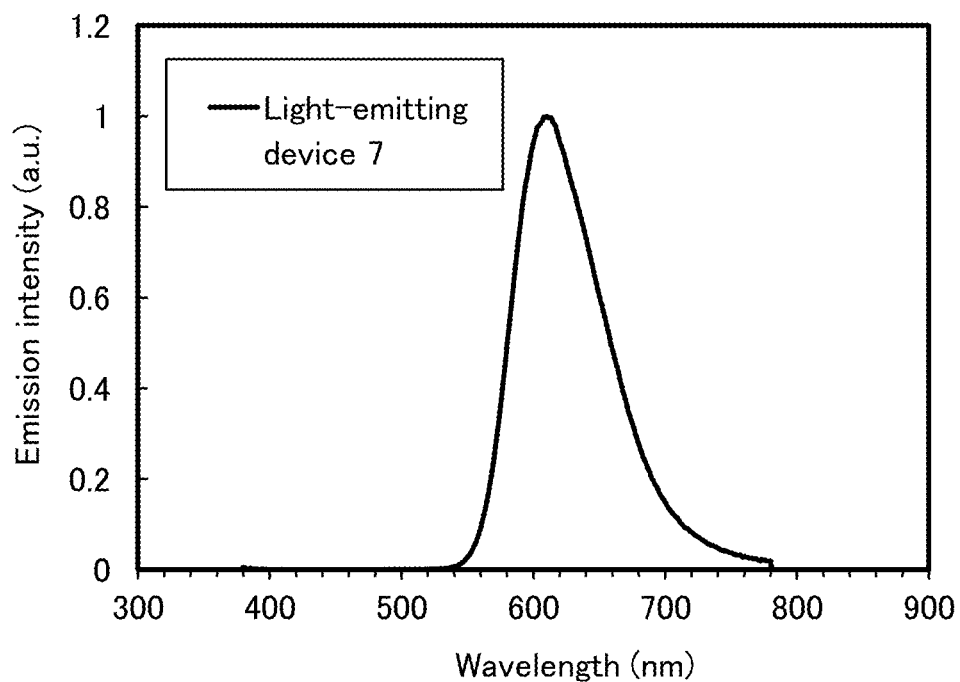
FIG. 42 is a diagram showing emission spectrum of the light-emitting device 7.

FIG. 37 shows the luminance-current density characteristics of the light-emitting device 7; FIG. 38 shows the current efficiency-luminance characteristics thereof; FIG. 39 shows the luminance-voltage characteristics thereof; FIG. 40 shows the current-voltage characteristics thereof; FIG. 41 shows the external quantum efficiency-luminance characteristics thereof; and FIG. 42 shows the emission spectra thereof. The table below shows the main characteristics of the light-emitting device 7 at around 1000 cd/m$^2$. The luminance, CIE chromaticity, and emission spectra were measured at normal temperature with a spectroradiometer (SR-UL1R manufactured by TOPCON TECHNOHOUSE CORPORATION).

TABLE 6

|  | Voltage (V) | Current (mA) | Current density (mA/cm$^2$) | Chromaticity x | Chromaticity y | Current efficiency (cd/A) | External quantum efficiency (%) |
| --- | --- | --- | --- | --- | --- | --- | --- |
| Light-emitting device 7 | 2.8 | 7.43 | 0.7 | 0.624 | 0.375 | 52.0 | 31.7 |

The results in FIG. 37 to FIG. 42 and the table above reveals that the light-emitting device 7 of one embodiment of the present invention exhibits favorable operation characteristics.

According to FIG. 42, the maximum peak wavelength of the emission spectrum of the light-emitting device 7 was 610 nm. The emission intensity of the light-emitting device 7 at less than or equal to 495 nm in an emission spectrum was less than or equal to 1% of the emission intensity at the maximum peak wavelength. The half width of the emission spectrum of the light-emitting device 7 was 78 nm.

That is, the light-emitting device 7 had light emission closer to natural light and inhibited blue light, which can bring about a relaxation effect for a user. Since the light-emitting device 7 has a large area of surface light emission with a light-emitting portion area of 1142.75 mm$^2$ (35 mm×32.65 mm), softer light can be emitted. Accordingly, further enhancement of a relaxation effect can be expected.

Reference Synthesis Example

Described in this synthesis example is a method for synthesizing bis[2-(2-quinolinyl-κN)phenyl-κC][2-(6-phenyl-4-pyrimidinyl-κN$^3$)phenyl-κC]iridium(III) (abbreviation: [Ir(pqn)$_2$(dppm)]) which is an organometallic complex used in part of the light-emitting apparatus in Example 2. The structural formula of [Ir(pqn)$_2$(dppm)] is shown below.

[Chemical Formula 6]

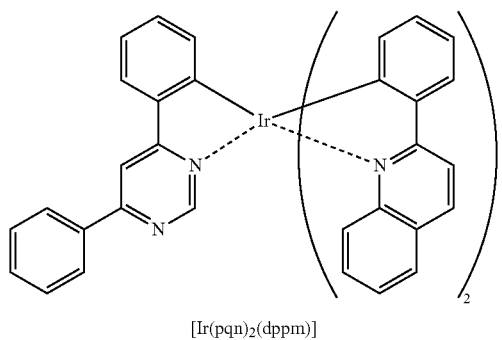

[Ir(pqn)$_2$(dppm)]

Step 1: Synthesis of 2-phenylquinoline (Abbreviation: Hpqn)

7.8 g (38 mmol) of 2-bromoquinoline, 5.5 g (45 mmol) of phenylboronic acid, 113 mL of a 2M aqueous solution of potassium carbonate, and 125 mL of 1,2-dimethoxyethane (DME) were put into a 300 mL three-neck flask and the air in the flask was replaced with nitrogen. 1.2 g (1.0 mmol) of tetrakis(triphenylphosphine)palladium was added to this mixture, and the mixture was heated and refluxed at 90° C. for 3.5 hours. Water was added to the obtained reaction solution, and extraction with ethyl acetate was performed. The obtained solution of the extract was washed with saturated saline, and anhydrous magnesium sulfate was added to the organic layer for drying. The obtained mixture was gravity-filtered to give a filtrate. The filtrate was concentrated to give a solid. The solid was dissolved in toluene, followed by suction filtration through a medium in which Celite, alumina, and Celite were stacked in this order. The filtrate was concentrated to give a solid. This solid was generated by silica gel column chromatography. Toluene was used as the developing solvent. The obtained fraction was concentrated to give 7.3 g of a white solid in a yield of 95%. The synthesis scheme in Step 1 is shown in Formula (a-1) below.

[Chemical Formulae 7]

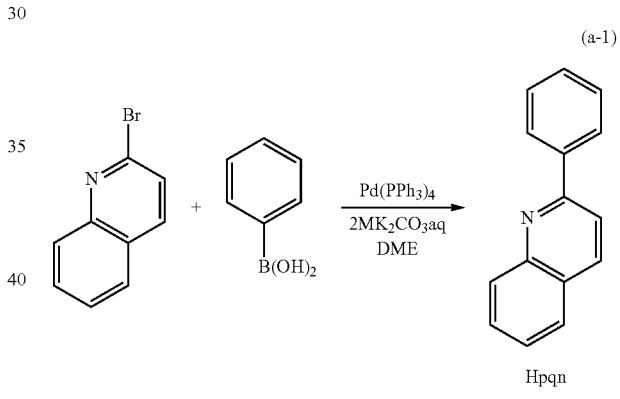

(a-1)

Step 2: Synthesis of di-u-chloro-tetrakis[2-(2-quinolinyl-κN)phenyl-κC]diiridium(III) (abbreviation: [Ir(pqn)$_2$Cl]$_2$])

3 g (15 mmol) of Hpqn obtained by the synthesis method in Step 1 above, 1.97 g (6.6 mmol) of IrCl$_3$·H$_2$O, 81 mL of 2-ethoxyethanol, and 27 mL of water were put into a three-neck flask and the air in the flask was replaced with argon. This mixture was heated by irradiation with microwaves under conditions of 400 W and 100° C. for one hour to promote a reaction. After a predetermined time elapsed, the obtained mixture was subjected to suction filtration, and the solid was washed with water and ethanol. The obtained filtrate was concentrated and washed with water and then with ethanol to give a solid. The solids obtained after the suction filtration performed twice were combined and washed with toluene, so that 2.2 g of an orange solid was obtained in a yield of 53%. The synthesis scheme in Step 2 is shown in Formula (a-2) below.

[Chemical Formulae 8]

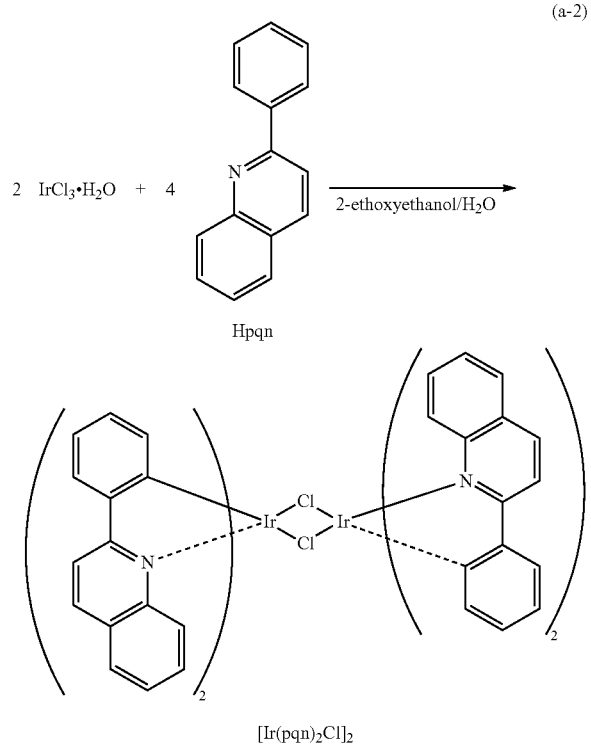

Step 3: Synthesis of bis[2-(2-quinolinyl-κN)phenyl-κC][2-(6-phenyl-4-pyrimidinyl-κN³)phenyl-κC] iridium(III) (abbreviation: [Ir(pqn)₂(dppm)])

2.2 g (1.73 mmol) of [Ir(pqn)₂Cl]2 obtained in Step 2 above and 200 mL of dichloromethane were put into a three-neck flask. A mixed solution of 0.89 g (3.5 mmol) of silver trifluoromethanesulfonate and 15 mL of methanol was dripped, followed by stirring at room temperature for 16 hours. After a predetermined time elapsed, the obtained mixture was filtered through Celite, and the filtrate was concentrated to give 2.32 g of a deep red solid. The obtained solid, 1.2 g (5.19 mmol) of 2,6-diphenylpyrimidine (abbreviation: Hdppm), and 130 mL of ethanol were put into a three-neck flask and were heated and refluxed for 25 hours. The obtained mixture was concentrated, 3 mL of ethanol was added, and the mixture was suction-filtered. The obtained solid was purified by silica gel column chromatography. Dichloromethane was used as the developing solvent. Moreover, 0.79 g of the obtained solid was purified by high performance liquid chromatography. Chloroform was used as the solvent of a mobile phase. The obtained solid was washed with hexane, so that 0.680 g of a red solid was obtained in a yield of 24%. By a train sublimation method, 0.59 g of the obtained red solid was purified twice by sublimation. The solid was heated under the sublimation purification conditions where the pressure was 1.5 to 1.7× $10^{-3}$ Pa and the argon flow rate was 0 mL/min at 285 to 295° C. After the sublimation purification, a red solid which was the object was obtained in a yield of 24%. The synthesis scheme in Step 3 is shown in Formula (a-3) below.

[Chemical Formulae 9]

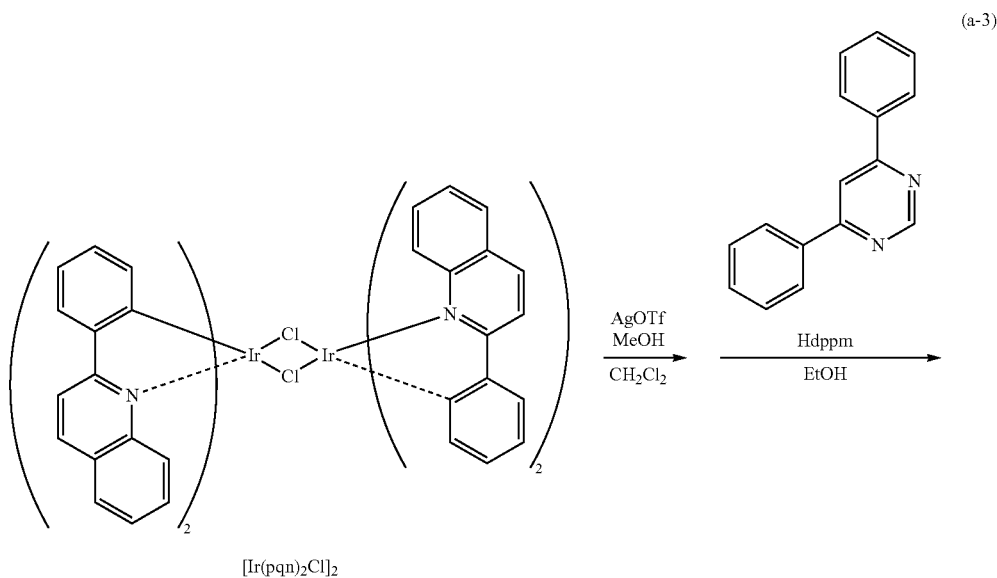

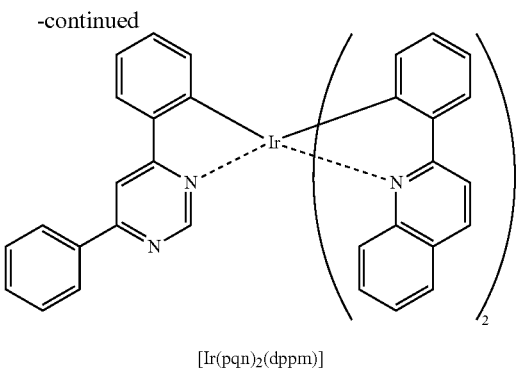

[Ir(pqn)₂(dppm)]

Figure 43:
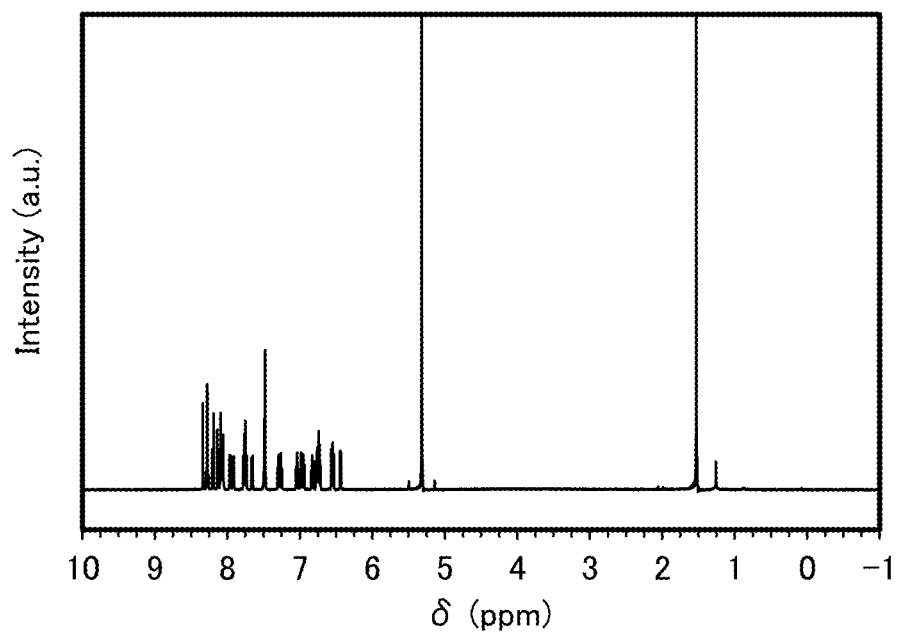
FIG. 43 is a $^1$H NMR chart of [Ir(pqn)$_2$(dppm)].

Protons ($^1$H) of the red solid obtained in Step 3 above were measured by nuclear magnetic resonance (NMR) spectroscopy. The obtained values are shown below. FIG. 43 shows $^1$H-NMR charts. These reveal that [Ir(pqn)₂(dppm)] was obtained in this synthesis example.

$^1$H-NMR. δ (CD₂Cl₂): 6.44 (d, 1H), 6.55 (t, 2H), 6.72-6.77 (m, 4H), 6.83 (t, 1H), 6.94-6.99 (m, 2H), 7.04 (t, 1H), 7.25-7.31 (m, 2H), 7.48-7.49 (m, 3H), 7.66 (d, 1H), 7.33-7.78 (m, 3H), 7.92 (d, 1H), 7.96 (d, 1H), 8.05-8.10 (m, 4H), 8.13 (d, 1H), 8.20 (d, 1H), 8.25-8.29 (m, 2H), 8.34 (s, 1H).

Next, an ultraviolet-visible absorption spectrum (hereinafter simply referred to as an "absorption spectrum") and an emission spectrum of [Ir(pqn)₂(dppm)] in a dichloromethane solution were measured. The absorption spectrum was measured with an ultraviolet-visible spectrophotometer (V550 manufactured by JASCO Corporation). The measurement was conducted at room temperature, for which the dichloromethane solution (0.0123 mmol/L) was put into a quartz cell. The absorption spectrum is obtained in such a way that the absorption spectrum measured by putting only dichloromethane in a quartz cell was subtracted from the absorption spectrum measured by putting the dichloromethane solution (0.0123 mmol/L) in a quartz cell. The emission spectrum was measured with an absolute PL quantum yield measurement system (C11347-01 manufactured by Hamamatsu Photonics K.K.). The measurement was conducted at room temperature, for which the deoxidized dichloromethane solution (0.0123 mmol/L) was put and sealed in a quartz cell under a nitrogen atmosphere in a glove box (LABstar M13 (1250/780) manufactured by Bright Co., Ltd.).

Figure 44:
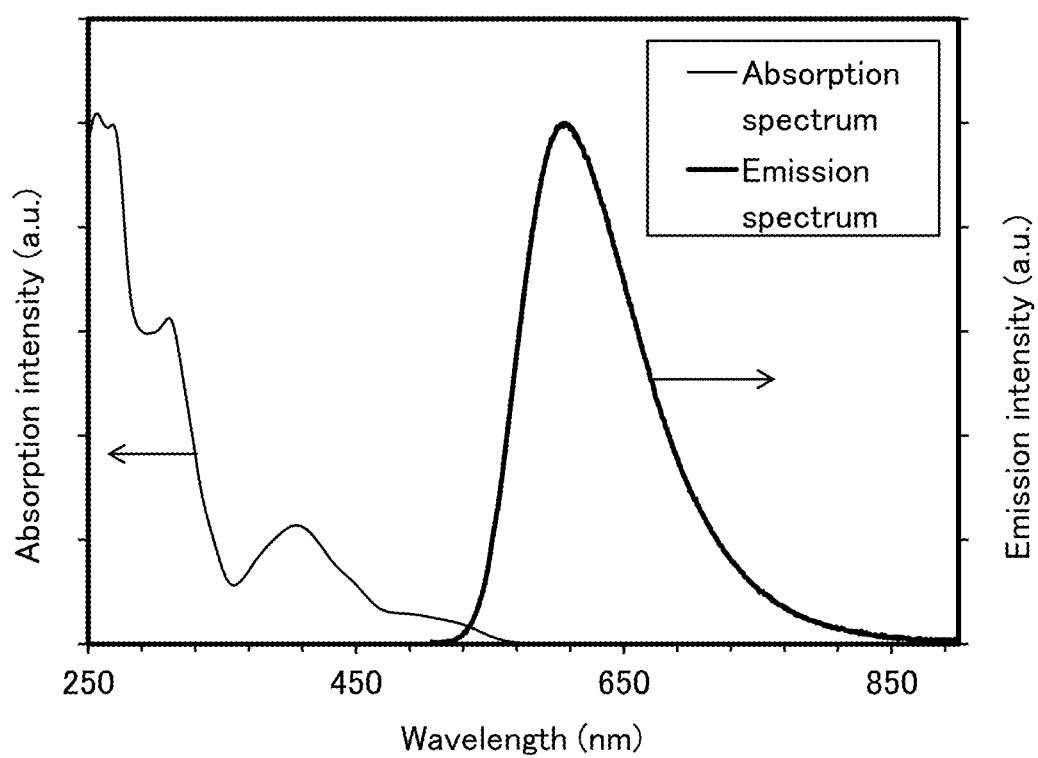
FIG. 44 shows an absorption spectrum and an emission spectrum of [Ir(pqn)$_2$(dppm)] in a dichloromethane solution.

FIG. 44 shows measurement results of the absorption spectrum and the emission spectrum. The horizontal axis represents a wavelength and the vertical axes represent absorption intensity and emission intensity.

As shown in FIG. 44, [Ir(pqn)₂(dppm)] had an emission peak at 606 nm, and reddish-orange light emission from the dichloromethane solution was observed. The half width of the emission spectrum of [Ir(pqn)₂(dppm)] was 104 nm.

Reference Numerals

101: first electrode, 102: second electrode, 103: EL layer, 103a: EL layer, 103b: EL layer, 103c: EL layer, 106: charge-generation layer, 106a: charge-generation layer, 106b: charge-generation layer, 111: hole-injection layer, 111a: hole-injection layer, 111b: hole-injection layer, 112: hole-transport layer, 112a: hole-transport layer, 112b: hole-transport layer, 113: light-emitting layer, 113a: light-emitting layer, 113b: light-emitting layer, 113c: light-emitting layer, 114: electron-transport layer, 114a: electron-transport layer, 114b: electron-transport layer, 115: electron-injection layer, 115a: electron-injection layer, 115b: electron-injection layer, 300: light-emitting apparatus, 301: power source, 302: light adjustment portion, 303: light-emitting device, 310: lighting device, 310A: lighting device, 310B: lighting device, 311: shade, 311a: shade, 311b: shade, 312: base, 313: operation button, 320: light, 321: light, 330: remote controller, 400: substrate, 401: first electrode, 403: EL layer, 404: second electrode, 405: sealant, 406: sealant, 407: sealing substrate, 412: pad, 420: IC chip, 900: substrate, 901: first electrode, 903: second electrode, 911: hole-injection layer, 912: hole-transport layer, 913: light-emitting layer, 914: electron-transport layer, 915: electron-injection layer, 8001: ceiling light, 8002: foot light, 8003: sheet-like lighting, 8004: lighting device, 8005: desk lamp, 8006: light source

The invention claimed is:

1. A light-emitting apparatus comprising:
a light-emitting device; and
a light adjustment portion,
wherein the light adjustment portion is configured to generate first smoothed data and second smoothed data by performing moving average processing with different periods on basic data having 1/f fluctuation characteristics, generate light adjustment data by subjecting the first smoothed data and the second smoothed data to arithmetic processing, and change luminance of the light-emitting device in time series in accordance with the light adjustment data.

2. The light-emitting apparatus according to claim 1, wherein the light-emitting device comprises a first electrode, a second electrode, and an EL layer.

3. The light-emitting apparatus according to claim 1, wherein an emission intensity of the light-emitting device at less than or equal to 495 nm in an electroluminescence spectrum is less than or equal to 1% of an emission intensity of the light-emitting device at a maximum peak wavelength.

4. The light-emitting apparatus according to claim 1, wherein a peak wavelength of an electroluminescence spectrum of the light-emitting device is at greater than or equal to 590 nm and less than or equal to 625 nm.

5. The light-emitting apparatus according to claim 1, wherein a maximum peak wavelength of an electroluminescence spectrum of the light-emitting device is greater than or equal to 590 nm and less than or equal to 620 nm.

6. The light-emitting apparatus according to claim 1, wherein a half width of an electroluminescence spectrum of the light-emitting device is greater than or equal to 75 nm and less than or equal to 120 nm.

7. The light-emitting apparatus according to claim 1, wherein the light-emitting device has CIE chromaticity (x, y) where x is greater than or equal to 0.59 and less than or equal to 0.63 and y is greater than or equal to 0.37 and less than or equal to 0.41.

8. A lighting device comprising:
the light-emitting apparatus according to claim 1; and
a shade,
wherein the shade comprises a light-transmitting material.

9. A light-emitting apparatus comprising:
a light-emitting device; and
a light adjustment portion,
wherein the light adjustment portion is configured to generate first smoothed data X and second smoothed data x by performing moving average processing with different periods on basic data having 1/f fluctuation characteristics, generate light adjustment data y by subjecting the first smoothed data X and the second smoothed data x to arithmetic processing in accordance with a formula below, and $$y_i = \left[\left(\frac{X_i - X_{min}}{X_{max} - X_{min}}\right) \times (UL - LL) + LL\right] \times (1 - A) + \left(\frac{x_i - x_{min}}{x_{max} - x_{min}}\right) \times A$$

change luminance of the light-emitting device in time series in accordance with the light adjustment data y,
wherein in the formula;
$y_i$ represents i-th data of the light adjustment data y;
$X_i$ represents i-th data of the first smoothed data X;
$x_i$ represents i-th data of the second smoothed data x;
$X_{max}$ represents a maximum value of X;
$X_{min}$ represents a minimum value of X;
UL represents a predetermined upper limit of an X component;
LL represents a predetermined lower limit of the X component;
$x_{max}$ represents a maximum value of x;
$x_{min}$ represents a minimum value of x; and
A represents a predetermined contribution rate.

10. The light-emitting apparatus according to claim 9, wherein a period of the moving average processing for generating the first smoothed data X is longer than a period of the moving average processing for generating the second smoothed data x.

11. The light-emitting apparatus according to claim 9, wherein the light-emitting device comprises a first electrode, a second electrode, and an EL layer.

12. The light-emitting apparatus according to claim 9, wherein an emission intensity of the light-emitting device at less than or equal to 495 nm in an electroluminescence spectrum is less than or equal to 1% of an emission intensity of the light-emitting device at a maximum peak wavelength.

13. The light-emitting apparatus according to claim 9, wherein a peak wavelength of an electroluminescence spectrum of the light-emitting device is at greater than or equal to 590 nm and less than or equal to 625 nm.

14. The light-emitting apparatus according to claim 9, wherein a maximum peak wavelength of an electroluminescence spectrum of the light-emitting device is greater than or equal to 590 nm and less than or equal to 620 nm.

15. The light-emitting apparatus according to claim 9, wherein a half width of an electroluminescence spectrum of the light-emitting device is greater than or equal to 75 nm and less than or equal to 120 nm.

16. The light-emitting apparatus according to claim 9, wherein the light-emitting device has CIE chromaticity (x, y) where x is greater than or equal to 0.59 and less than or equal to 0.63 and y is greater than or equal to 0.37 and less than or equal to 0.41.

17. A lighting device comprising:
the light-emitting apparatus according to claim 9; and
a shade,
wherein the shade comprises a light-transmitting material.

\* \* \* \* \*